United States Patent
Yang et al.

(10) Patent No.: US 12,213,101 B2
(45) Date of Patent: Jan. 28, 2025

(54) PAGING METHOD AND APPARATUS

(71) Applicant: HUAWEI TECHNOLOGIES CO., LTD., Guangdong (CN)

(72) Inventors: Chenchen Yang, Ottawa (CA); Yinghao Jin, Boulogne Billancourt (FR); Feng Han, Shanghai (CN); Huan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 284 days.

(21) Appl. No.: 17/706,411

(22) Filed: Mar. 28, 2022

(65) Prior Publication Data
US 2022/0225272 A1 Jul. 14, 2022

Related U.S. Application Data

(63) Continuation of application No. PCT/CN2019/109255, filed on Sep. 29, 2019.

(51) Int. Cl.
*H04W 68/02* (2009.01)
*H04W 48/10* (2009.01)
*H04W 48/18* (2009.01)
*H04W 84/04* (2009.01)

(52) U.S. Cl.
CPC .......... *H04W 68/02* (2013.01); *H04W 48/10* (2013.01); *H04W 48/18* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2016/0073441 A1 | 3/2016 | Faccin et al. | |
| 2017/0150502 A1 | 5/2017 | Chirala et al. | |
| 2019/0013842 A1 | 1/2019 | Xiong et al. | |
| 2019/0059048 A1* | 2/2019 | Yeoh | H04W 48/18 |

(Continued)

FOREIGN PATENT DOCUMENTS

| | | |
|---|---|---|
| CN | 105684474 A | 6/2016 |
| CN | 106165466 A | 11/2016 |
| CN | 108933992 A | 12/2018 |

(Continued)

OTHER PUBLICATIONS

3GPP TS 23.501 V16.2.0 (Sep. 2019), "3rd Generation Partnership Project; Technical Specification Group Services and System Aspects; System Architecture for the 5G System (5GS); Stage 2," Sep. 2019, 389 pages.

(Continued)

*Primary Examiner* — Frantz Bataille
(74) *Attorney, Agent, or Firm* — Fish & Richardson P.C.

(57) ABSTRACT

The present disclosure relates to paging methods and apparatus. One example method is applied to a first access network device. The first access network device belongs to a first network, a second access network device belongs to a second network, and the first network may be different from the second network. When UE accesses the first network and downlink data of the second network arrives, the UE may receive the data of the second network. The first access network device receives downlink data of a terminal from a first core network device, where the first core network device belongs to the first network.

20 Claims, 17 Drawing Sheets

(56) References Cited

U.S. PATENT DOCUMENTS

| | | | |
|---|---|---|---|
| 2019/0110244 A1 | 4/2019 | Shih et al. | |
| 2019/0230503 A1* | 7/2019 | Circosta | H04W 12/50 |

FOREIGN PATENT DOCUMENTS

| | | |
|---|---|---|
| CN | 110099416 A | 8/2019 |
| CN | 111601364 A | 8/2020 |
| EP | 1701560 A2 | 9/2006 |
| EP | 2302972 A2 | 3/2011 |
| WO | 2018058437 A1 | 4/2018 |

OTHER PUBLICATIONS

3GPP TS 23.502 V16.2.0 (Sep. 2019), "3rd Generation Partnership Project; Technical Specification Group Services and System Aspects; Procedures for the 5G System (5GS)," Sep. 2019, 478 pages.

3GPP TS 36.304 V15.4.0 (Jun. 2019), "3rd Generation Partnership Project; Technical Specification Group Radio Access Network; Evolved Universal Terrestrial Radio Access (E-UTRA); User Equipment (UE) procedures in idle mode," Jun. 2019, 55 pages.

3GPP TS 36.331 V15.7.0 (Sep. 2019), "3rd Generation Partnership Project; Technical Specification Group Radio Access Network; Evolved Universal Terrestrial Radio Access (E-UTRA); Radio Resource Control (RRC); Protocol specification(Release 9)," Sep. 2019, 962 pages.

3GPP TS 38.304 V15.5.0 (Sep. 2019), "3rd Generation Partnership Project; Technical Specification Group Radio Access Network; NR; User Equipment (UE) procedures in Idle mode and RRC Inactive state," Sep. 2019, 29 pages.

3GPP TS 38.300 V15.7.0 (Sep. 2019), "3rd Generation Partnership Project; Technical Specification Group Radio Access Network; NR; NR and NG-RAN Overall Description; Stage 2," Sep. 2019, 99 pages.

3GPP TS 38.331 V15.7.0 (Sep. 2019), "3rd Generation Partnership Project; Technical Specification Group Radio Access Network; NR; Radio Resource Control (RRC) protocol specification (Release 15)," Sep. 2019, 527 pages.

3GPP TS 38.401 V15.6.0 (Jul. 2019), "3rd Generation Partnership Project; Technical Specification Group Radio Access Network; NG-RAN; Architecture description," Jul. 2019, 46 pages.

3GPP TS 38.413 V15.4.0 (Jul. 2019), "3rd Generation Partnership Project; Technical Specification Group Radio Access Network; NG-RAN; NG Application Protocol (NGAP)," Jul. 2019, 328 pages.

3GPP TS 38.423 V15.4.0 (Jul. 2019), "3rd Generation Partnership Project; Technical Specification Group Radio Access Network; NG-RAN; Xn application protocol (XnAP)," Jul. 2019, 309 pages.

China Telecom, Huawei, HiSilicon, "Discussion on human-readable name of NPN," 3GPP TSG-RAN WG2 Meeting #107, R2-1911157, Prague, Czech Republic, Aug. 26-30, 2019, 2 pages.

Ericsson, "Discussion on the need for Human Readable Network Name (HRNN) in broadcast," 3GPP TSG-RAN WG2 #107, Tdoc R2-1908981, Prague, Czech Republic, Aug. 26-30, 2019, 4 pages.

Ericsson, "Draft LS on the need for Human Readable Network Name (HRNN) in broadcast," 3GPP TSG RAN WG2 #107, R2-1908982, Prague, Czech Republic, Aug. 26-30, 2019, 1 page.

Ericsson, "Overview of Public network integrated NPN (PNI-NPN)," 3GPP TSG-RAN WG2 #107, Tdoc R2-1908978, Prague, Czech Republic, Aug. 26-30, 2019, 11 pages.

Ericsson, "Overview of Stand-alone NPN (SNPN)," 3GPP TSG-RAN WG2 #107, R2-1908977, Prague, Czech Republic, Aug. 26-30, 2019, 10 pages.

Nokia, Nokia Shanghai Bell, "Adding Human-Readable network names for NPNs to SIB," 3GPP TSG-RAN WG2 Meeting #107, R2-1909309, Prague, Czech Republic, Aug. 26-30, 2019, 2 pages.

Nokia, Nokia Shanghai Bell, "Adding NIDs and CAG Identifiers to SIB," 3GPP TSG-RAN WG2 Meeting #107, R2-1909308, Prague, Czech Republic, Aug. 26-30, 2019, 2 pages.

Nokia, Nokia Shanghai Bell, "Charter Communications, Overview of Non-Public Networks," 3GPP TSG-RAN WG2 Meeting #107, R2-1909305, Prague, Czech Republic, Aug. 26-30, 2019, 5 pages.

Office Action issued in Chinese Application No. 202011630975.4 on Dec. 6, 2021, 14 pages (with English translation).

Office Action issued in Chinese Application No. 202011630975.4 on Sep. 22, 2021, 21 pages (with English translation).

PCT International Search Report and Written Opinion issued in International Application No. PCT/CN2019/109255 on Jun. 28, 2020, 14 pages (with English translation).

Vivo, "Discussion on SNPN/CAG related parameters broadcast by RAN," 3GPP TSG-RAN WG2 Meeting #107, R2-1910011, Prague, Czech Republic, Aug. 26-30, 2019, 3 pages.

ZTE Corporation, Sanechips, "Consideration on the System Information of the Private Network," 3GPP TSG-RAN WG2 Meeting #107, R2-1909267, Prague, Czech Republic, Aug. 26-30, 2019, 7 pages.

Office Action in Singaporean Appln. No. 11202302170V, mailed on May 17, 2024, 2 pages.

Notice of Allowance in Singaporean Appln. No. 11202302170V, mailed on May 21, 2024, 2 pages.

Extended European Search Report issued in European Application No. 19947289.5 on Sep. 1, 2022, 8 pages.

Intel Corporation "RAN2 impact on Non-Public Network Deployment using SNPN," 3GPP TSG RAN WG2 Meeting #105, R2-1900760, Athens, Greece, Feb. 25-Mar. 1, 2019, 5 pages.

\* cited by examiner

PAGING METHOD AND APPARATUS

CROSS-REFERENCE TO RELATED APPLICATIONS

This application is a continuation of International Application No. PCT/CN2019/109255, filed on Sep. 29, 2019, the disclosure of which is hereby incorporated by reference in its entirety.

TECHNICAL FIELD

This application relates to the field of communications technologies, and in particular, to a paging method and an apparatus.

BACKGROUND

With development of communications technologies, user equipment (user equipment, UE) may register with a plurality of networks. For example, the user equipment may alternatively access different networks through dual radio (dual radio) or by using a plurality of subscriber identity modules (subscriber identity module, SIM). User equipment with a dual radio capability may access different networks through two Uu interfaces, and user equipment with a plurality of SIM cards may access different networks by using different SIM cards. The different networks may be identified by using different public land mobile communications network (public land mobile network, PLMN) identifiers (identify, ID).

How to page the UE in a plurality of networks is a problem that needs to be resolved.

SUMMARY

This application provides a paging method and an apparatus, to page UE in a plurality of networks.

According to a first aspect, a paging method is provided. The method is implemented by using two access network devices, and specifically includes the following steps: receiving, by a first access network device, downlink data of a terminal from a first core network device, where the first access network device and the first core network device belong to a first network; and sending, by the first access network device, a first message to a second access network device, and receiving, by the second access network device, the first message from the first access network device. The second access network device belongs to a second network, and the first message is used to indicate the second access network device to assist in paging the terminal. It is assumed that the UE is in RRC-inactive states of different networks. When the different networks page the UE at the same time, the UE first accesses the first access network device of the first network, and the second access network device of the second network cannot receive a paging response. The accessed first access network device may assist the second access network device in paging the UE through an Xn interface, to ensure that the second network can successfully page the UE. In addition, paging information on the second access network device side can be reduced, and time for the UE to monitor the paging information can be shortened, thereby saving energy on the second access network device side and the UE side.

In a possible design, the first message includes at least one of the following: network identification information of the first network, an identifier of the terminal in the first network, or identification information of one or more cells of the first network.

In a possible design, the first message further includes first indication information, and the first indication information is used to indicate the second access network device to page the terminal in a cell of the second network. In this way, overheads of paging the UE are reduced, and efficiency of paging the UE is improved.

In a possible design, the second access network device further belongs to the first network.

In a possible design, the first message further includes second indication information, the second indication information is used to indicate a paging policy for the second access network device to page the terminal, and the paging policy includes: performing paging in the cell of the first network, performing paging in the cell of the second network, or performing paging in both the cell of the first network and the cell of the second network. In this way, overheads of paging the UE are reduced, and efficiency of paging the UE is improved.

In a possible design, the first message includes at least one of the following: network identification information of the second network, an identifier of the terminal in the second network, or identification information of one or more cells of the second network.

In a possible design, the network identification information includes one or more of the following: a public land mobile network identifier PLMN ID, a network identifier NID, a closed access group identifier CAG ID, a human readable network name HRNN corresponding to the NID, or an HRNN corresponding to the CAG ID. In this way, overheads of paging the UE are reduced, and efficiency of paging the UE is improved.

In a possible design, the method further includes: sending, by the first access network device, context information of the terminal in the first network to the second access network device.

In a possible design, the first message further includes one or more of the following information: a cause for sending the first message, an identifier of the second access network device, a tracking area code corresponding to one or more cells of the second access network device, a radio network area code corresponding to the one or more cells of the second access network device, or timer information used to indicate the terminal device to access the first network within a specified time. In this way, overheads of paging the UE are reduced, and efficiency of paging the UE is improved.

In a possible design, the first message is an access network paging message.

In a possible design, the identification information of the terminal in the second network includes at least one of the following: a 5G S-temporary mobile subscriber identity 5G-S-TMSI, an inactive radio network temporary identifier I-RNTI, a globally unique temporary identity GUTI, a subscription concealed identifier SUCI, or a temporary mobile subscriber identity TMSI.

In a possible design, the identification information of the cell includes at least one of the following: a cell identity cell identity, a cell global identifier CGI, or a cell physical identifier PCI.

According to a second aspect, a paging method is provided. The method is applied to an access network device, the access network belongs to a first network and a second network, the access network device includes a central unit CU and a distributed unit DU, and the method includes:

receiving, by the CU, downlink data of a terminal from each of a first core network device and a second core network device, where the first core network device belongs to the first network, and the second core network device belongs to the second network; and sending, by the CU, a first message to the DU, where the first message is used to indicate a paging policy for paging the terminal, and the paging policy includes: performing paging in a cell of the first network, performing paging in a cell of the second network, or performing paging in both a cell of the first network and a cell of the second network. In a CU-DU RAN architecture, when the UE is in RRC-inactive states of different networks, and when the different networks page the UE, the UE responds to one network, accesses a cell of a corresponding network of a shared-DU, and notifies a shared-DU of related information of a paging cell of another network. The shared-DU and the shared-CU preconfigure bearer resources for the another network. Alternatively, an accessed cell is additionally configured with a bearer resource of a cell in which the UE is located, to carry a PDU session of the another network. In this way, the UE does not need to contact the different networks to configure bearer resources, and a RAN may perform control plane signaling offloading and user plane data offloading, thereby balancing inter-cell load.

In a possible design, the first message includes at least one of the following: network identification information of the first network, an identifier of the terminal in the first network, or identification information of one or more cells of the first network.

In a possible design, the first message includes at least one of the following: network identification information of the second network, an identifier of the terminal in the second network, or identification information of one or more cells of the second network.

In a possible design, the network identification information includes at least one of the following: a public land mobile network identifier PLMN ID, a network identifier NID, a closed access group identifier CAG ID, a human readable network name HRNN corresponding to the NID, or an HRNN corresponding to the CAG ID. In this way, overheads of paging the UE are reduced, and efficiency of paging the UE is improved.

In a possible design, the first message includes one or more of the following information: a cause for sending the first message, information about the first network, or information about the second network, where the information about the first network includes one or more of the following: a tracking area code corresponding to the one or more cells of the first network, a radio network area code corresponding to the one or more cells of the first network, and timer information used to indicate the terminal device to access the first network within a specified time; and the information about the second network includes one or more of the following: a tracking area code corresponding to the one or more cells of the second network, a radio network area code corresponding to the one or more cells of the second network, and timer information used to indicate the terminal to access the second network within a specified time. In this way, overheads of paging the UE are reduced, and efficiency of paging the UE is improved.

In a possible design, the first message is an F1 paging message.

In a possible design, the identification information of the terminal in the first network or the identification information of the terminal in the second network includes at least one of the following: a 5G S-temporary mobile subscriber identity 5G-S-TMSI, an inactive radio network temporary identifier I-RNTI, a globally unique temporary identity GUTI, a subscription concealed identifier SUCI, or a temporary mobile subscriber identity TMSI.

In a possible design, the identification information of the cell includes at least one of the following: a cell identity cell identity, a cell global identifier CGI, or a cell physical identifier PCI.

According to a third aspect, a multi-network cell access method is provided. The method is performed by a terminal, and the terminal sets up a connection to a first cell of a first network. The terminal receives a first message from the first cell, and the first message is used to indicate that downlink data of a second network arrives. UE may be in RRC-inactive states of different networks. When the different networks page the UE at the same time, a shared-RAN may first page the UE in a cell of one of the networks. After the UE accesses a cell, the shared-RAN pages the UE for another network by using the accessed cell, to ensure that the another network can successfully page the required UE. Paging information on a RAN side can be reduced, and time for the UE to monitor paging information can be shortened, thereby saving energy on the RAN side and the UE side.

In a possible design, the first message includes at least one of the following: network identification information of the second network, an identifier of the terminal in the second network, or identification information of one or more cells of the second network.

In a possible design, the terminal sets up a connection to a second cell of the second network, where the second cell may be one of the one or more cells of the second network, or the second cell is a cell in the second network other than the one or more cells.

In a possible design, the setting up, by the terminal, a connection to a second cell of the second network includes: sending, by the terminal, identification information of the second cell to the first cell; receiving, by the terminal, a resource configuration parameter of the second cell from the first cell; and setting up, by the terminal, a connection to the second cell based on the resource configuration parameter of the second cell. A parameter is preconfigured for the second cell by using an accessed cell, so as to implement control plane signaling offloading and user plane data offloading, thereby balancing inter-cell load.

In a possible design, the resource configuration parameter information of the second cell includes at least one of the following: a configuration parameter of a random access resource, a configuration parameter of a DRB, a configuration parameter of an SRB, context information of the terminal, and security and integrity protection information of the terminal. The UE may be in RRC-inactive states of different networks. When the different networks page the UE at the same time, a shared-RAN may first page the UE in a cell of one of the networks. After the UE accesses a cell, the shared-RAN continues to page the UE for another network by using a setup SRB and preconfigures SRB, DRB, and PDU session resources and the like, to ensure that the another network can successfully page the required UE. The paging information on the RAN side can be reduced, and time for the UE to monitor the paging information can be shortened, thereby saving energy on the RAN side and the UE side. In this way, control plane signaling offloading and user plane data offloading can be implemented, thereby balancing inter-cell load.

In a possible design, the setting up, by the terminal, a connection to a second cell of the second network includes: determining, by the terminal based on the first message, the second cell to be accessed; and setting up, by the terminal, a connection to the second cell of the second network.

For example, the terminal sets up a connection to the second cell of the second network through the following steps: sending, by the terminal, a first RRC resume request message to the second cell; receiving, by the terminal, the first RRC resume message or an RRC setup message from the second cell; and sending, by the terminal, a first RRC resume complete message or an RRC setup complete message to the second cell.

In a possible design, the first RRC resume complete message or the RRC setup complete message carries the identification information of the second cell and the network identification information of the second network.

In a possible design, the first message further includes a resource configuration parameter of the first cell, where the resource configuration parameter of the first cell is used to configure a resource of the first cell, and the resource of the first cell is used to transmit, in the first cell of the first network, the downlink data of the second network. The first cell accesses the second network, to implement control plane signaling offloading and user plane data offloading, thereby balancing inter-cell load.

In a possible design, the first message further includes: a network identifier NID of the first network, an identifier of the first cell, or a cause value, and the cause value is assistance.

In a possible design, the resource configuration parameter of the first cell includes at least one of the following: a configuration parameter of a random access resource, a configuration parameter of a DRB, a configuration parameter of an SRB, context information of the terminal, and security and integrity protection information of the terminal.

In a possible design, the first message further includes one or more of the following information: a cause for sending the first message, a tracking area code corresponding to the one or more cells of the second network, an identifier of a network device to which the one or more cells of the second network belong, a radio network area code corresponding to the one or more cells of the second network, timer information used to indicate the terminal to access the second network within a specified time, or following parameters of each of the one or more cells of the second network: a configuration parameter of a random access resource, a configuration parameter of a second DRB, a configuration parameter of a second SRB, context information of the terminal, or security and integrity protection information of the terminal. In this way, overheads of paging the UE are reduced, and efficiency of paging the UE is improved.

In a possible design, the first cell of the first network and the cell of the second network belong to a same network device; or the first cell of the first network belongs to a first network device, and the cell of the second network belongs to a second network device; the first cell of the first network belongs to a first network device, and a first part of cells of the second network belong to a second network device; or a second part of cells of the second network belong to a third network device.

In a possible design, the first cell of the first network and the cell of the second network belong to a same network device, and the network device includes a central unit CU and a distributed unit DU; and receiving, by the terminal, a first message from the first cell includes: receiving, by the terminal by using the DU, the first message sent by the CU; or receiving, by the terminal, the first message sent by the DU.

In a possible design, the network identification information includes at least one of the following: a public land mobile network identifier PLMN ID, a network identifier NID, a closed access group identifier CAG ID, a human readable network name HRNN corresponding to the NID, or an HRNN corresponding to the CAG ID; the identification information of the terminal in the second network includes at least one of the following: a 5G S-temporary mobile subscriber identity 5G-S-TMSI, an inactive radio network temporary identifier I-RNTI, a globally unique temporary identity GUTI, a subscription concealed identifier SUCI, or a temporary mobile subscriber identity TMSI; and the identification information of the cell includes at least one of the following: a cell identity cell identity, a cell global identifier CGI, or a cell physical identifier PCI.

According to a fourth aspect, a paging method is provided. A terminal may receive paging from two networks, and actively send a request to a first cell. For example, the terminal sets up a connection to the first cell of a first network, and the terminal sends a first message to the first cell, where the first message is used to indicate that downlink data of a second network arrives. When UE is in RRC-inactive states of different networks, and when the different networks page the UE at the same time, after responding to one network, the UE notifies the network of paging-related information of another network, and the network assists the another network in preconfiguring a bearer resource or transmitting user plane data. In this way, the UE does not need to contact different networks to configure bearer resources, and a RAN may perform control plane signaling offloading and user plane data offloading, thereby balancing inter-cell load.

According to a fifth aspect, an apparatus is provided. The apparatus may be an access network device, for example, a first access network device, an apparatus (for example, a chip, a chip system, or a circuit) in the first access network device, or an apparatus that can be used in matching with the first access network device. In a design, the apparatus may include modules that are in a one-to-one correspondence with the methods/operations/steps/actions described in the first aspect. The modules may be hardware circuits or software, or may be implemented by the hardware circuits in combination with the software. In a design, the apparatus may include a processing module and a communications module. The processing module is configured to invoke the communications module to perform a receiving and/or sending function. The communications module includes a sending module and a receiving module. For example, the receiving module is configured to receive downlink data of a terminal from a first core network device, where the first access network device and the first core network device belong to a first network; and the sending module is configured to send a first message to a second access network device, where the second access network device belongs to a second network, and the first message is used to indicate the second access network device to assist in paging the terminal.

For another feature (for example, information included in the first message), refer to the description in the first aspect. Details are not described herein again.

According to a sixth aspect, an apparatus is provided. The apparatus may be applied to a CU in an access network device, and the access network device is a shared access network device which includes a CU-DU split architecture. The apparatus may be the CU or an apparatus (for example, a chip, a chip system, or a circuit) in the CU, or may be an apparatus that can be used in matching with the CU. In a design, the apparatus may include modules that are in a one-to-one correspondence with the methods/operations/steps/actions described in the second aspect. The modules may be hardware circuits or software, or may be implemented by the hardware circuits in combination with the software. In a design, the apparatus may include a processing module and a communications module. The processing module is configured to invoke the communications module to perform a receiving and/or sending function. The communications module includes a sending module and a receiving module. For example, the receiving module is configured to receive downlink data of a terminal from each of a first core network device and a second core network device, where the first core network device belongs to a first network, and the second core network device belongs to a second network; and the sending module is configured to send a first message to the DU, where the first message is used to indicate a paging policy for paging the terminal, and the paging policy includes: performing paging in a cell of the first network, performing paging in a cell of the second network, or performing paging in both a cell of the first network and a cell of the second network.

For another feature (for example, information included in the first message), refer to the description in the second aspect. Details are not described herein again.

According to a seventh aspect, an apparatus is provided. The apparatus may be applied to a terminal. The apparatus may be the terminal or an apparatus (for example, a chip, a chip system, or a circuit) in the terminal, or may be an apparatus that can be used in matching with the terminal. In a design, the apparatus may include modules that are in a one-to-one correspondence with the methods/operations/steps/actions described in the third aspect or the fourth aspect. The modules may be hardware circuits or software, or may be implemented by a combination of the hardware circuits and the software. In a design, the apparatus may include a processing module and a communications module. The processing module is configured to invoke the communications module to perform a receiving and/or sending function. The communications module includes a sending module and a receiving module. For example, the processing module is configured to set up a connection to a first cell of a first network; and the receiving module is configured to receive a first message from the first cell, where the first message is used to indicate that downlink data of a second network arrives; or the processing module is configured to set up a connection to a first cell of a first network; and the sending module is configured to send a first message to the first cell, where the first message is used to indicate that downlink data of a second network arrives.

For another feature (for example, information included in the first message), refer to the description in the third aspect. Details are not described herein again.

According to an eighth aspect, an embodiment of this application provides an apparatus. For example, the apparatus is a first access network device, and the apparatus includes a communications interface and a processor. The communications interface is used by the apparatus to communicate with another device, for example, to receive and send data or a signal. For example, the communications interface may be a transceiver, a circuit, a bus, a module, or a communications interface of another type, and the another device may be a second access network device. The processor is configured to invoke a set of programs, instructions, or data, to perform the method described in the first aspect. The apparatus may further include a memory, configured to store the programs, instructions, or data invoked by the processor. The memory is coupled to the processor, and the processor can implement the method described in the first aspect when executing the instructions or the data stored in the memory.

According to a ninth aspect, an embodiment of this application provides an apparatus. For example, the communications apparatus is a CU in a shared access network device. The shared access network device includes the CU and a DU. The apparatus includes a communications interface and a processor, and the communications interface is used by the apparatus to communicate with another device, for example, to receive and send data or a signal. For example, the communications interface may be a transceiver, a circuit, a bus, a module, or a communications interface of another type, and the another device may be the DU. The processor is configured to invoke a set of programs, instructions, or data, to perform the method described in the second aspect. The apparatus may further include a memory, configured to store the programs, instructions, or data invoked by the processor. The memory is coupled to the processor, and the processor can implement the method described in the second aspect when executing the instructions or the data stored in the memory.

According to a tenth aspect, an embodiment of this application provides an apparatus. For example, the apparatus is a terminal, and the communications apparatus includes a communications interface and a processor. The communications interface is used by the apparatus to communicate with another device, for example, to receive and send data or a signal. For example, the communications interface may be a transceiver, a circuit, a bus, a module, or a communications interface of another type, and the another device may be a first access network device, a second access network device, a CU, or a DU. The processor is configured to invoke a set of programs, instructions, or data, to perform the method described in the third aspect or the fourth aspect. The apparatus may further include a memory, configured to store the programs, instructions, or data invoked by the processor. The memory is coupled to the processor, and the processor can implement the method described in the third aspect or the fourth aspect when executing the instructions or the data stored in the memory.

According to an eleventh aspect, an embodiment of this application further provides a computer-readable storage medium. The computer-readable storage medium stores a computer-readable instruction, and when the computer-readable instruction is run on a computer, the computer is enabled to perform the method according to any one of the aspects or the possible designs of the aspects.

According to a twelfth aspect, an embodiment of this application provides a chip system. The chip system includes a processor, and may further include a memory, configured to implement the method according to any one of the first aspect or the possible designs of the first aspect. The chip system may include a chip, or may include the chip and another discrete component.

According to a thirteenth aspect, an embodiment of this application provides a chip system. The chip system includes a processor, and may further include a memory, to implement the method according to any one of the second aspect or the possible designs of the second aspect. The chip system may include a chip, or may include the chip and another discrete component.

According to a fourteenth aspect, an embodiment of this application provides a chip system. The chip system includes a processor, and may further include a memory, to implement the method according to the third aspect or the fourth aspect. The chip system may include a chip, or may include the chip and another discrete component.

According to a fifteenth aspect, an embodiment of this application provides a system. The system includes a first access network device and a second access network device, and the first access network device is configured to perform the method in any one of the first aspect or the possible designs.

In a possible design, the system further includes a terminal, and the terminal is configured to perform the method in any one of the third aspect, the fourth aspect, or the possible designs.

According to a sixteenth aspect, an embodiment of this application provides a shared access network device. The shared access network device includes a CU and a DU, and the CU is configured to perform the method in any one of the second aspect or the possible designs.

In a possible design, the system further includes a terminal, and the terminal is configured to perform the method in any one of the third aspect, the fourth aspect, or the possible designs.

According to a seventeenth aspect, an embodiment of this application further provides a computer program product, including an instruction. When the computer program product runs on a computer, the computer is enabled to perform the method according to any one of the aspects or the possible designs of the aspects.

DESCRIPTION OF EMBODIMENTS

Embodiments of this application provide a paging method and an apparatus, so that UE in an inactive state receives paging from a plurality of networks. The method and the apparatus are based on a same technical concept. Because a problem-resolving principle of the method is similar to that of the apparatus, implementations of the apparatus and the method may mutually refer to each other. No repeated description is provided. In descriptions of the embodiments of this application, the term "and/or" describes an association relationship for describing associated objects and represents that three relationships may exist. For example, A and/or B may represent the following three cases: Only A exists, both A and B exist, and only B exists. The character "I" generally indicates an "or" relationship between the associated objects. "At least one" in this application refers to one or more. "A plurality of" means two or more. In addition, it should be understood that, in descriptions of this application, the terms such as "first", "second", and "third" are merely used for differentiation and description, but cannot be understood as an indication or implication of relative importance or an indication or implication of an order.

The paging method provided in the embodiments of this application may be applied to a 5th generation (5th generation, 5G) communications system, for example, a 5G new radio (new radio, NR) system, or may be applied to various future communications systems.

Figure 1:
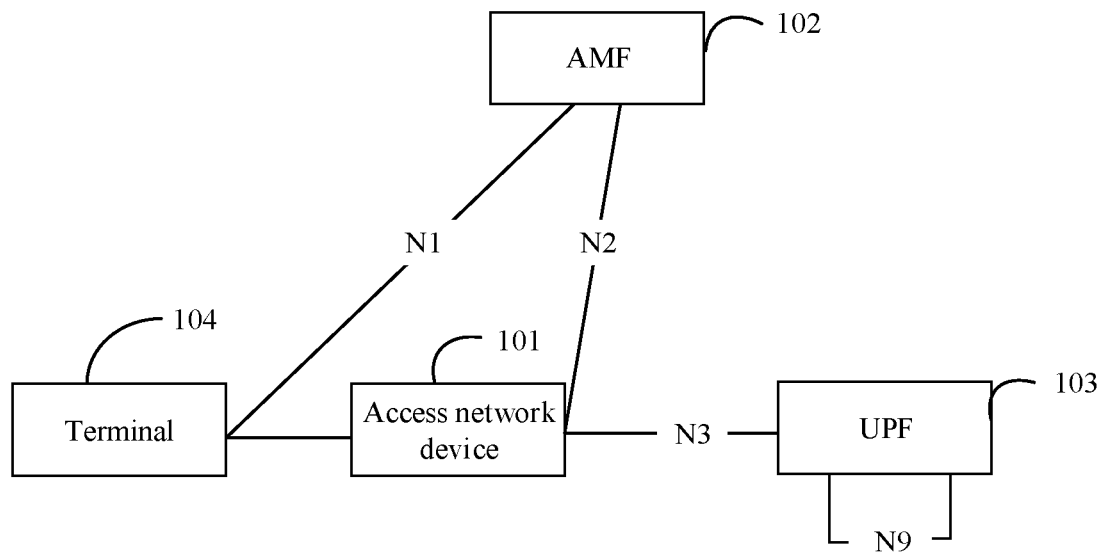
FIG. 1 is a schematic diagram of a communications system architecture according to an embodiment of this application.

The following describes a possible communications system architecture to which the method provided in the embodiments of this application is applicable. The communications system architecture includes one or more of a terminal, an access network device, or a core network device. There may be one or more terminals, access network devices, or core network devices. As shown in FIG. 1, the communications system architecture includes an access network device 101, an AMF 102, a UPF 103, and a terminal 104. The AMF 102 and the UPF 103 are core network devices.

It may be understood that FIG. 1 shows only several functions or devices related to the method in the embodiments of this application, and the communications system architecture may further include more or fewer functions or devices. For example, the communications system architecture may further include a session management function (session management function, SMF), unified data management (unified data management, UDM), a data network (data network, DN), or the like. In the communications system architecture shown in FIG. 1, the terminal 104 is connected to the AMF through an N1 interface, the access network device 101 is connected to the AMF through an N2 interface, and the access network device 101 is connected to the UPF through an N3 interface. UPFs are connected through an N9 interface.

A communications system architecture applicable to the embodiments of this application is not limited to that shown in FIG. 1, and any communications system architecture that can implement functions of devices is applicable to this application. The core network device is a collective name of all functions or devices of a core network. There may also be other names. For example, in some network architectures, a core network device such as an AMF or a UPF is referred to as a network function (network function, NF). Alternatively, in some other network architectures, a core network device such as an AMF or a UPF may be referred to as a control plane function or a control plane function network element.

The functions or devices in the core network may be network elements in a hardware device, or may be software functions running on dedicated hardware, or may be virtualization functions instantiated on a platform (such as a cloud platform). It may be understood that names of various core network devices are names in a 5G communications system. With evolution of the communications system, the names may be changed to other names with a same function.

The terminal 104 may also be referred to as user equipment (user equipment, UE), a terminal device, a mobile station (mobile station, MS), a mobile terminal (mobile terminal, MT), or the like, and is a device that provides voice or data connectivity for a user, or may be an internet of things device. For example, the terminal includes a handheld device or a vehicle-mounted device having a wireless connection function. Currently, the terminal may be a mobile phone (mobile phone), a tablet computer, a notebook computer, a palmtop computer, a mobile internet device (mobile internet device, MID), a wearable device (for example, a smartwatch, a smart band, or a pedometer), a vehicle-mounted device (for example, a vehicle-mounted device on an automobile, a bicycle, an electric vehicle, an aircraft, a ship, a train, or a high-speed train), a virtual reality (virtual reality, VR) device, an augmented reality (augmented reality, AR) device, a wireless terminal in industrial control (industrial control), a smart home device (for example, a refrigerator, a television, an air conditioner, or an electricity meter), an intelligent robot, a workshop device, a wireless terminal in self-driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a flight device (for example, an intelligent robot, a hot balloon, an unmanned aerial vehicle, or an aircraft), or the like. In the embodiments of this application, the solution is described by using UE or a terminal as an example.

The access network device 101 is a node in a radio access network (radio access network, RAN), and may also be referred to as a network device or a base station, or may also be referred to as a RAN node (or a device). Currently, for example, the access network device is a gNB/NR-NB, a transmission reception point (transmission reception point, TRP), an evolved NodeB (evolved Node B, eNB), a radio network controller (radio network controller, RNC), a NodeB (Node B, NB), a base station controller (base station controller, BSC), a base transceiver station (base transceiver station, BTS), a home base station (for example, a home evolved NodeB, or a home Node B, HNB), a baseband unit (base band unit, BBU), a wireless fidelity (wireless fidelity, Wi-Fi) access point (access point, AP), or an access network device in a possible future communications system. Alternatively, the access network device may be a gNB or a transmission point (a TRP or a TP) in a 5G system such as an NR system; may be an antenna panel or a group of antenna panels (including a plurality of antenna panels) of a base station in a 5G system; or may be a network node, such as a baseband unit (BBU) or a distributed unit (distributed unit, DU), that constitutes a gNB or a transmission point. In some deployments, the gNB may include a centralized unit (centralized unit, CU) and the DU.

Figure 2:
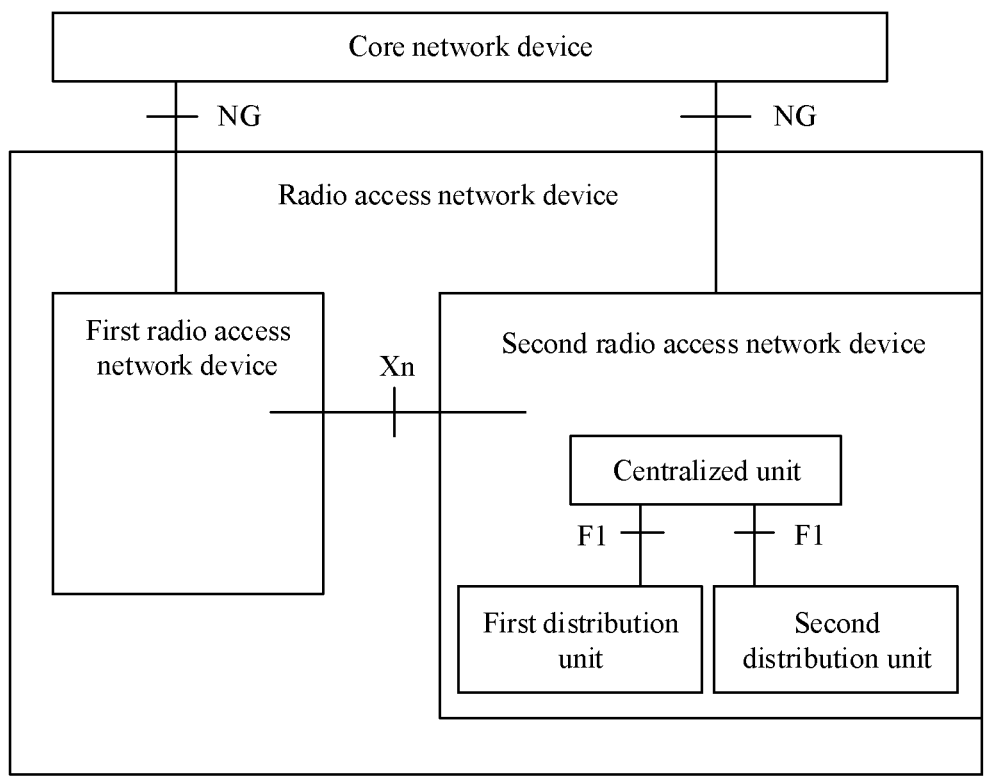
FIG. 2 is a schematic structural diagram of an access network device of a CU-DU architecture according to an embodiment of this application.

As shown in FIG. 2, an access network device in a CU-DU architecture is described. FIG. 2 is a schematic block diagram of another communications system applicable to an embodiment of this application. The communications system includes a core network device and radio access network devices. The radio access network device includes a centralized unit and a distributed unit.

The core network device shown in FIG. 2 in this embodiment of this application may be a core network device in different communications systems, for example, a core network device in a 5G communications system or a core network device in an LTE communications system. The radio access network devices include a first radio access network device and a second radio access network device.

Specifically, the first radio access network device in FIG. 2 may be a gNodeB (gNodeB, gNB) or an ng-eNodeB (ng-eNodeB, ng-eNB). The second radio access network device may also be a gNB or an ng-eNB. The gNB provides a user plane protocol and function and a control plane protocol and function of NR for a terminal device, and the ng-eNB provides a user plane protocol and function and a control plane protocol and function of evolved universal terrestrial radio access (evolved universal terrestrial radio access, E-UTRA) for the terminal device. All interfaces between the radio access network devices are Xn interfaces. An interface between the radio access network device and the core network device is referred to as an NG interface.

Specifically, the gNB or the ng-eNB may include a CU and a DU. Specifically, one radio access network device may include one centralized unit and one or more distributed units. In FIG. 2, the second radio access network device includes a first distributed unit and a second distributed unit.

The CU device has a (hosting) wireless high-layer protocol stack function. For example, the CU has a radio resource control (radio resource control, RRC) layer, a packet data convergence protocol (packet data convergence protocol, PDCP) layer, and the like. Moreover, the CU can support some core network functions being deployed in an access network, which is referred to as an edge computing network, so that a higher network latency requirement of an emerging service (for example, video, online shopping, and virtual/augmented reality) in a future communications network can be satisfied. The CU has a part of functions of a core network and higher layer protocol stacks of a radio access network, and main protocol layers involved include an RRC function, a service discovery application protocol (service discovery application protocol, SDAP) sublayer function, and a packet data convergence protocol (packet data convergence protocol, PDCP) sublayer function. The DU has a part of functions of a physical layer for baseband processing and a layer 2. Specifically, the DU implements a radio frequency processing function and baseband processing functions of layers such as a radio link control (radio link control, RLC) layer, a medium access control (medium access control, MAC) layer, and a physical layer (physical layer, PHY). CUs may be deployed in a centralized manner. Deployment of DUs depends on an actual network environment. In a core urban area with high traffic density, a small station spacing, and limited computer room resources, such as a university or a large-scale performance venue, the DUs may also be deployed in a centralized manner. However, in a region with sparse traffic, a relatively large station spacing, and the like, such as a suburban county or a mountainous area, the DUs may be deployed in a distributed manner.

The following describes paging and UE states.

Paging for UE may be classified into core network (core network, CN) triggered paging (CN paging) and access network device triggered paging (RAN paging).

For UE in a registration management-registered state (RM-registered) but in an RRC-idle (RRC-idle) state, when downlink data of the UE arrives at a UPF, the UPF triggers an SMF and an AMF to initiate the CN paging, and the AMF sends paging information to the access network device. After receiving the CN paging, the access network device initiates the RAN paging, and continues to page the UE in a corresponding cell through a Uu interface. The paging information at the Uu interface carries an identifier of the UE. After receiving a paging message, the UE in the RRC-idle state may initiate an RRC connection setup process to respond to the paging.

For user equipment (user equipment, UE) in a registration management-registered state (RM-registered) but in a radio resource control (radio resource control, RRC)-inactive (inactive) state, when downlink data arrives at a user plane management function (user plane function, UPF), the UPF sends the downlink data to the access network device, and the access network device triggers paging (paging). The paging message sent by the access network device carries an identifier of the UE. After receiving the paging message, the UE in the RRC-inactive state determines, based on the identifier of the UE in the paging message, that the UE is paged, sends a paging response message to the access network device, and accesses a corresponding cell. After that, the UE changes to an RRC-connected (connected) state.

The following describes several possible networks.

1. Public Land Mobile Network (Public Land Mobile Network, PLMN)

In a country or region, a cellular mobile communications network of an operator in a certain mode is referred to as a PLMN.

2. Non-Public Network (Non-Public Networks, NPN)

The NPN is a network under discussion in the third generation mobile communication standardization organization (3rd generation partnership project, 3GPP) standard. Different from a conventional cellular network, the NPN network allows access of only some users with specific permissions. For the NPN network, there are two networking manners: stand-alone networking (stand-alone non-public networks, SNPN) and non-standalone networking (public network integrated NPN, INPN). The non-standalone networking NPN may also be referred to as a (public network integrated NPN, PNI-NPN). For ease of description, the standalone networking NPN is denoted as an SNPN below, and the non-standalone networking NPN is denoted as a PNI-NPN below.

Figure 3:
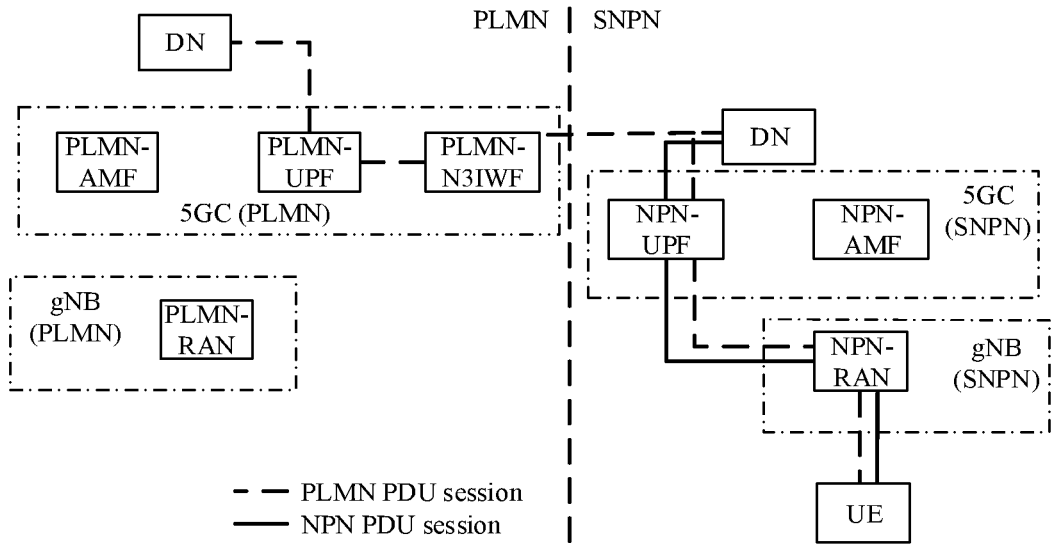
FIG. 3 is a schematic diagram of an SNPN and a PLMN according to an embodiment of this application.

FIG. 3 is a schematic diagram of an SNPN and a PLMN according to an embodiment of this application. The SNPN and the PLMN have independent RANs and core networks. The SNPN is considered as a non-3GPP network. The core networks of the SNPN and the PLMN are connected by using a non-3GPP interworking function (non-3GPP inter working function, N3IWF) network element. A user plane and a control plane can be interconnected by using the N3IWF network element. In the SNPN, a PLMN ID and/or a network identifier (network identifier, NID) jointly identify an SNPN. A cell identity (cell ID), a PLMN ID, and a NID may jointly identify a cell in the SNPN. For example, a first cell (whose cell ID is a first cell) may access a first network and a second network at the same time. A first standalone private network is deployed in the first network, and the first network is identified by a first PLMN ID and a first NID, and the second network is identified by a second PLMN ID. User equipment may access the first standalone private network by using a cell that broadcasts the first cell ID, the first PLMN ID, and the first NID.

It can be learned from FIG. 3 that a PLMN PDU session resource of the UE is carried on the UE, an NPN-RAN, an NPN-UPF, a DN, a PLMN-N3IWF, a PLMN-UPF, and a DN. It can be learned from FIG. 3 that an NPN PDU session resource of the UE is carried on the UE, the NPN-RAN, the NPN-UPF, and the DN. "Session resources are carried on" some devices or network elements described above may be understood as that "session resources" are provided by these devices or network elements. 5GC represents a 5G core network device.

Figure 4:
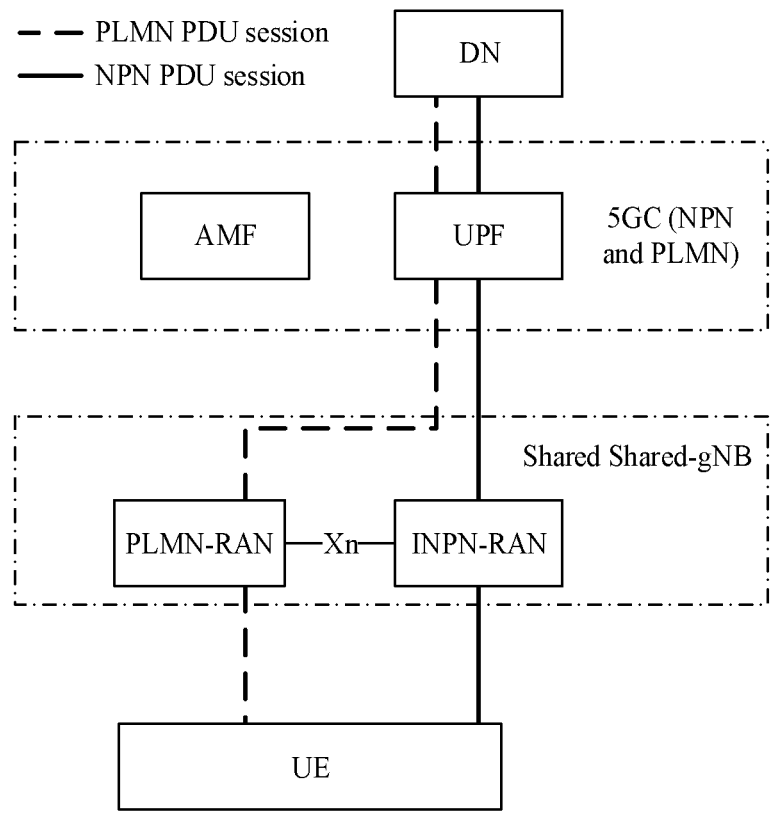
FIG. 4 is a schematic diagram of a PNI-NPN and a PLMN according to an embodiment of this application.

FIG. 4 is a schematic diagram of a PNI-NPN and a PLMN according to an embodiment of this application. The PNI-NPN and the PLMN share a core network or an access network. In the PNI-NPN, a user authorized to access the PNI-NPN is referred to as a user belonging to a closed access group (closed access group, CAG), and a cell in the PNI-NPN may be jointly identified by a PLMN ID, a CAG ID, and a Cell ID. As shown in FIG. 3, the PLMN and the PNI-NPN network share a core network (such as an AMF and a UPF), and are deployed with a PLMN-RAN and a PNI-NPN-RAN respectively. An Xn interface may exist between different RANs.

It can be learned from FIG. 4 that PLMN PDU session resources of the UE are carried on the UE, the PLMN-RAN, the UPF, and a DN. It can be learned from FIG. 4 that NPN PDU session resources of the UE are carried on the UE, an INPN-RAN, the UPF, and the DN.

Description of the CAG: If a network device or a cell belongs to the PNI-NPN, the network device or the cell broadcasts a CAG identifier, and only a registered terminal device in the closed access group can access the network. In other words, only a terminal device registered with the closed access group can be served by the cell. Different CAGs correspond to different CAG identifiers (identify, ID). In this application, the CAG identifier is described as identification information of a network.

The following describes a shared access network device (shared-RAN).

The shared-RAN means that a RAN may be configured with cells of different networks, and user equipment may access different networks (for example, access networks with different PLMN IDs) by using one RAN. The following briefly describes a relationship and a difference between an NPN and a PLMN in a shared-RAN scenario with reference to FIG. 5, FIG. 6a, and FIG. 6b.

Figure 5:
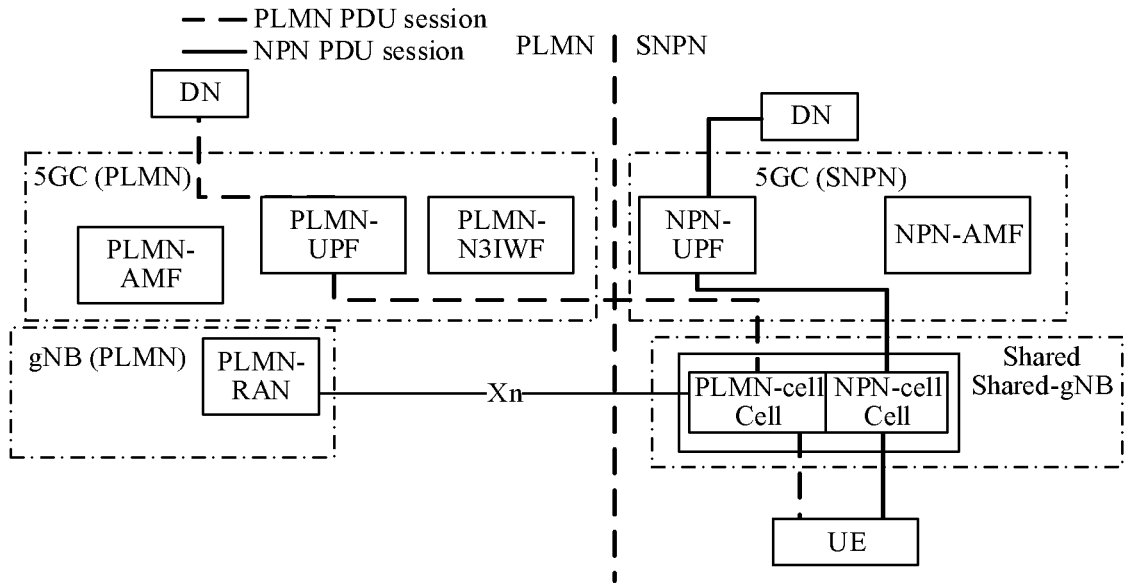
FIG. 5 is a schematic diagram of an SNPN and a PLMN in a shared-RAN scenario according to an embodiment of this application.

FIG. 5 is a schematic diagram of an SNPN and a PLMN in a shared-RAN scenario according to an embodiment of this application. In FIG. 5, an NPN-RAN is a shared-RAN, the shared-RAN is configured with a PLMN cell and an NPN cell, PLMN protocol data unit (protocol data unit, PDU) session (session) resources of user equipment may be directly set up by using the shared-RAN, and the PLMN PDU session resources of the UE are carried on the UE, the shared-RAN, a PLMN UPF, and a DN. NPN PDU session resources of the UE are carried on the UE, the shared-RAN, an NPN UPF, and the DN. There may be an Xn interface between the shared-RAN and a PLMN-RAN.

Figure 6A:
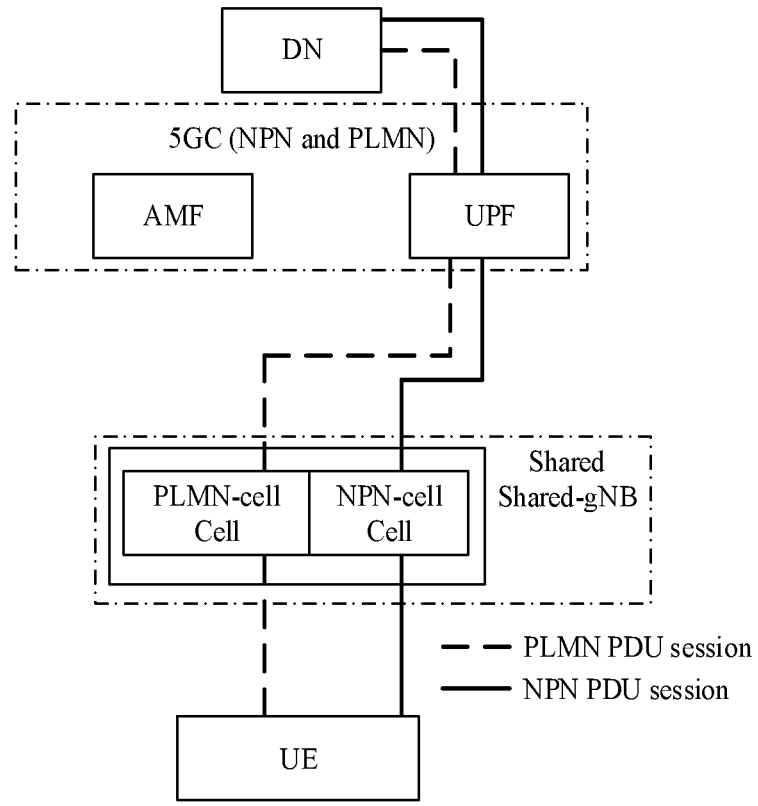
FIG. 6a is a first schematic diagram of a PNI-NPN and a PLMN in a shared-RAN scenario according to an embodiment of this application.
Figure 6B:
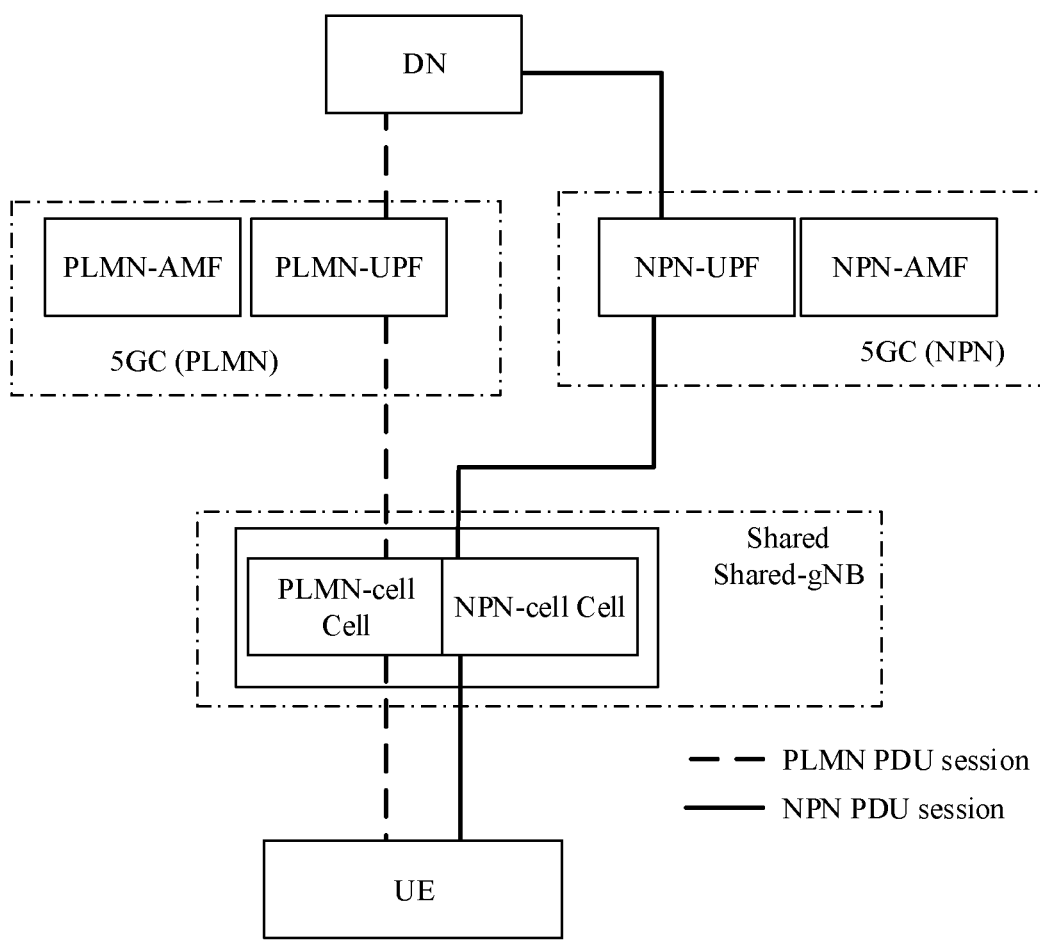
FIG. 6b is a second schematic diagram of a PNI-NPN and a PLMN in a shared-RAN scenario according to an embodiment of this application.

FIG. 6a and FIG. 6b are schematic diagrams of a PNI-NPN and a PLMN in a shared-RAN scenario according to an embodiment of this application. In the shared-RAN scenario, in comparison of FIG. 5, in FIG. 6a, the PNI-NPN and the PLMN share a core network and a RAN; and in FIG. 6b, the PNI-NPN and the PLMN share a RAN, and core networks are separately deployed. The shared-RAN is configured with a PLMN cell and a PNI-NPN cell. Specifically, it can be learned from FIG. 6a that the PNI-NPN and the PLMN share an AMF, a UPF, and a DN, and PLMN PDU session resources and NPN PDU session resources of the UE are carried on the UE, the shared-RAN, the UPF, and the DN. It can be learned from FIG. 6b that the PNI-NPN and the PLMN share a RAN and a DN, but the PNI-NPN and the PLMN each have an AMF and a UPF; and PLMN PDU session resources of the UE are carried on the UE, the shared-RAN, a PLMN UPF, and the DN, and NPN PDU session resources of the UE are carried on the UE, the shared-RAN, an NPN UPF, and the DN.

Figure 7:
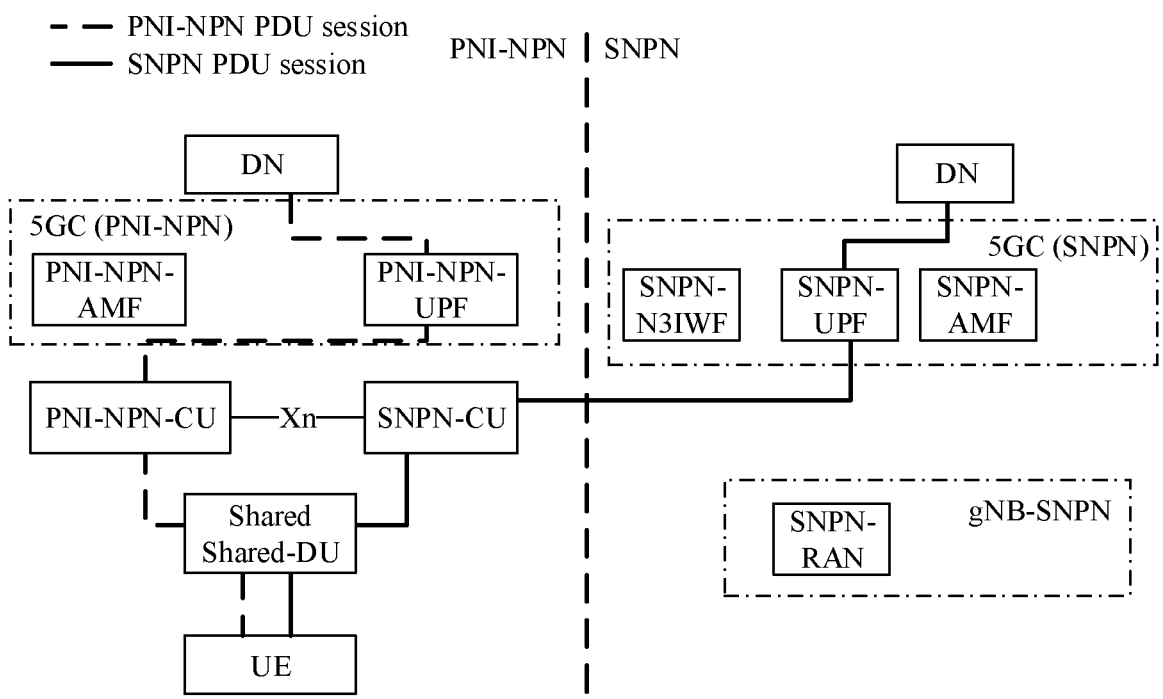
FIG. 7 is a schematic diagram of a PNI-NPN and an SNPN in a shared-RAN scenario according to an embodiment of this application.

Further, the shared-RAN may also be applicable to the CU-DU shown in FIG. 2. FIG. 7 is a schematic diagram of a PNI-NPN and an SNPN in a shared-RAN scenario according to an embodiment of this application, with the PNI-NPN and the SNPN used as an example in a CU-DU architecture. As shown in FIG. 7, the PLMN and the SNPN are connected to respective CUs or CU instances, a PNI-NPN-CU and an SNPN-CU share a shared-DU, and there may be an Xn interface between the PNI-NPN-CU and the SNPN-CU. It should be understood that there may be another derived scenario in which a CU or a DU is shared. Similarly, there may be a similar derived scenario for a PNI-NPN and an SNPN, a PNI-NPN and a PLMN, and a shared-CU. Details are not described again.

The following describes in detail the embodiments of this application with reference to the accompanying drawings.

The embodiments of this application relate to paging from a plurality of networks or a same network. For example, the plurality of networks are two networks, which are represented by, for example, a first network and a second network. There may be a plurality of cases for the first network and the second network. For example, the first network and the second network are any two types of networks of a PLMN, an SNPN, or a PNI-NPN; or the first network and the second network are any one type of network of a PLMN, an SNPN, or a PNI-NPN, but belong to two different networks, and are configured with different network identification information.

Paging from a same network may be paging from different network devices in the same network for a terminal device.

In a 5th generation (5th Generation, 5G) communications system, for user equipment (user equipment, UE) in a registration management-registered state (RM-registered) but in a radio resource control (radio resource control, RRC)-inactive (inactive) state, when downlink data arrives at a user plane management function (user plane function, UPF), the UPF sends the downlink data to an access network device, and the access network device triggers paging (paging). A paging message sent by the access network device carries an identifier of the UE.

After receiving the paging message, the UE in the RRC-inactive state determines, based on the identifier of the UE in the paging message, that the UE is paged, sends a paging response message to the access network device, and accesses a corresponding cell. After that, the UE changes to an RRC-connected (connected) state. Then, the UE no longer monitors or receives paging information from another cell, but receives paging information only in the accessed cell.

The UE may be registered with a plurality of networks. When the UE accesses a cell of one of the plurality of networks and is in the RRC-connected state, if another network triggers the access network device to page the UE, the UE cannot receive paging from the another network, and the another network cannot receive a paging response from the UE all the time.

Figure 8:
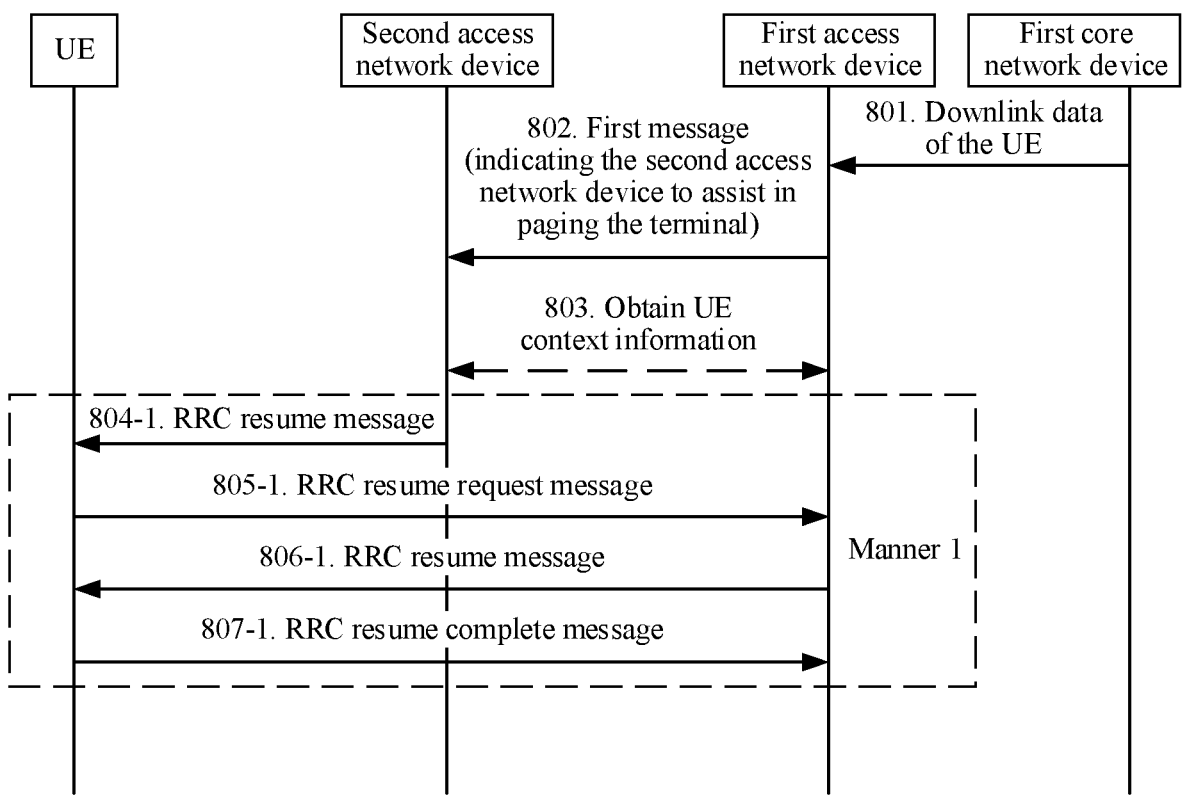
FIG. 8 is a first specific schematic flowchart of a paging method according to an embodiment of this application.

As shown in FIG. 8, a specific procedure of the paging method provided in the embodiments of this application is described below. This method is applicable to a plurality of networks or a same network. It is assumed that a communications system architecture includes a plurality of access network devices, for example, includes two access network devices, a first access network device and a second access network device that are used for description. The first access network device belongs to a first network, and the second access network device belongs to a second network. There may be an Xn interface between the first access network device and the second access network device. Alternatively, the first access network device belongs to a first network, and the second access network device belongs to the first network and a second network. It should be understood that when the first access network device belongs to the first network, and the second access network device belongs to the first network and the second network, both the first access network device and the second access network device belong to the first network, and the second access network device may assist, in a cell of the second network configured by the second access network device, the first access network device in paging the UE, or the second access network device may assist, in a cell of the first network configured by the second access network device, the first access network device in paging the UE.

The method provided in the embodiments of this application includes the following steps.

S801. A first core network device sends downlink data of a terminal to a first access network device, and the first access network device receives the downlink data of the terminal from the first core network device.

The UE is in an inactive state in a first network, and the terminal needs to be paged only in an access network, and does not need to be paged in a core network. When the downlink data of the UE arrives, the first core network device sends the downlink data of the UE to the first access network device, and the first access network device triggers paging.

For example, the first core network device is a UPF, and the downlink data of the terminal may include downlink control plane data or downlink user plane data.

S802. The first access network device sends a first message to a second access network device, and the second access network device receives the first message from the first access network device.

The first message is used to indicate the second access network device to assist in paging the terminal.

Optionally, after S801 and before S802, the method may further include the following operation: The first access network device triggers RAN paging. Because the UE is in an RRC connected state on the second access network device, the UE cannot receive the paging from the first access network device. The first access network device pages the UE, but cannot obtain a paging response.

When the first access network device cannot obtain the paging response, the first access network device sends the first message to the second access network device, and requests, by using the first message, the second access network device to assist in paging the UE.

Before accessing a cell of a second network, the UE may be in an inactive state or an idle state in the second network. When the downlink data of the UE arrives at the second network, paging may be triggered by a core network, or paging may be triggered by the second access network device. After receiving the paging, the UE returns a paging response, to access a cell served by the second access network device. The second access network device belongs to the second network, that is, the UE accesses the cell of the second network. Alternatively, the second access network device may be a shared access network device, and belongs to both the first network and the second network. In this case, the UE may access a cell of the first network, or may access a cell of the second network.

The first message is a message between the first access network device and the second access network device, and may be sent through an Xn interface between the two access network devices. The first message may also be referred to as a RAN paging message. The following describes in detail content carried in the first message and a function of the first message.

The first message is functionally used to indicate the second access network device to assist in paging the terminal (UE).

The first message may carry a UE identifier, and the UE identifier may be an identifier of the UE in the first network. For differentiation, the UE identifier in the first network may be denoted as a first identifier of the UE. The first identifier of the UE may be one or more of the following identifiers of the UE in the first network: a 5G S-temporary mobile subscriber identity (5G S-temporary mobile subscriber identity, 5G-S-TMSI), an inactive radio network temporary identifier (inactive radio network temporary identity, I-RNTI), a globally unique temporary identifier (globally unique temporary identity, GUTI), a subscription concealed identifier (subscription concealed identifier, SUCI), a temporary mobile subscriber identity (temporary mobile subscriber identity, TMSI), or the like.

The first message may further carry network identification information of the first network. The network identification information of the first network includes one or more of the following: a PLMN ID, a network identifier NID, a closed access group identifier CAG ID, a human readable network name (human readable network name, HRNN) corresponding to the NID, or a human-readable network name HRNN corresponding to the CAG ID. The network identification information of the first network may include one or more NIDs, for example, may include a NID list (NID list). The network identification information of the first network may include one or more CAG IDs, for example, may include a CAG ID list (CAG ID list).

When the first message carries the network identification information of the first network, the network identification information of the first network may be used to indicate specific cells of networks in which the second access network device should page the UE. In other words, the second access network device may determine, based on the network identification information of the first network, specific cells of networks in which the UE should be paged. For example, if the network identification information of the first network includes a network identifier NID, the second access network device determines, based on the network identifier NID, to page the UE in a cell that supports access to a network identified by the NID. For another example, if the network identification information of the first network includes a CAG ID, the second access network device determines, based on the CAG ID, to page the UE in a cell that supports access to a network identified by the CAG.

The first message may further carry identification information of one or more cells of the first network. Identification information of a cell includes at least one of the following: a cell identity (cell identity), for example, a cell identity list (cell ID list), a cell global identifier (cell global identify, CGI), or a cell physical identifier (physical cell ID, PCI). The identification information of the one or more cells of the first network may be used to indicate specific cells of the first network that are configured by the second access network device and in which the second access network device pages the UE. When receiving the first message, the second access network device may determine, based on the identification information of the one or more cells of the first network that is carried in the first message, to page the UE in cells corresponding to the identification information. Alternatively, the identification information of the one or more cells of the first network is used to indicate a cell of the first network that is configured by the first access network device and that can be selected by the UE for access, and then the second access network device may forward the identification information of the one or more cells of the first network to the UE.

In addition, after receiving the first message, the second access network device may further send, to the UE, the information carried in the first message. The first message carries the network identification information of the first network, and the second access network device sends the network identification information of the first network to the UE, to indicate a network that the UE can access. The first message carries the identification information of the one or more cells of the first network, and the second access network device sends the identification information of the one or more cells of the first network to the UE, to indicate a cell that is of the first network and that can be accessed by the UE.

The first message may further carry indication (indication) information, and the indication information may be denoted as first indication information. The first indication information is used to indicate the second access network device to page the UE in the cell of the second network. For example, the second access network device belongs to only the second network. When receiving the first message, the second access network device may page the UE in the cell of the second network based on the first indication information in the first message, to assist in paging triggered by the downlink data of the first network.

For example, the second access network device may belong to a plurality of networks, including a first network and a second network. The first message may further carry second indication information. The second indication information is used to indicate a paging policy used by the second access network device to page the UE. The paging policy includes:

Policy 1: Paging is performed only in the cell of the first network.

Some cells served by the second access network device may belong to the first network, and some cells served by the second access network device belong to the second network. According to the policy 1, after receiving the first message, the second access network device performs, based on the second indication information in the first message, paging in a cell that belongs to only the first network.

If a cell belongs to both the first network and the second network, the second access network device may perform paging in the cell according to the policy 1. Policy 2: Paging is performed only in the cell of the second network.

Some cells served by the second access network device may belong to the first network, and some cells served by the second access network device belong to the second network.

According to the policy 2, after receiving the first message, the second access network device performs, based on the second indication information in the first message, paging in a cell that belongs to only the second network.

If a cell belongs to both the first network and the second network, the second access network device may perform paging in the cell according to the policy 2.

Policy 3: Paging is performed in both the cell of the first network and the cell of the second network.

For example, the second indication information may be represented as "only CAG", "only NID", or "only PLMN", which instructs to page the UE only in a CAG cell, a NID cell, or a PLMN cell respectively.

The second indication information may alternatively be implicitly indicated. For example, a CAG-only indication information element is originally used in a mobility restriction list to indicate that the UE is allowed to access a 5GS only by using the CAG cell, and the CAG-only indication information element can be reused in a paging message to implicitly indicate that the UE is paged only in the CAG cell.

The first message may further carry network identification information of the second network, an identifier of the terminal in the second network, or identification information of one or more cells of the second network. Similarly, the identifier of the terminal in the second network may be denoted as a second identifier of the terminal. The second identifier of the terminal may be a 5G-S-TMSI, an I-RNTI, a GUTI, an SUCI, a TMSI, or the like of the terminal in the second network. For a type of the network identification information of the second network, refer to the description of the network identification information of the first network. Details are not described herein again.

The following lists some other information that may be further carried in the first message.

The first message may further carry a cause (cause) for sending the first message, and the cause is denoted as a first cause. The first cause is used to indicate a cause for current RAN paging. The second access network device that receives the first message can determine, based on the first cause, that the first message is used to assist in paging triggered by the downlink data of the first network. The first cause may be, for example, a PLMN character, an SNPN character, a PNI-NPN character, an NPN character, or a non-3GPP character, indicating paging initiated for a PLMN service, an SNPN service, a PNI-NPN service, an NPN service, or a non-3GPP service.

The first message may further carry an identifier of the second access network device, to indicate a receive end of the first message.

The first message may further carry a tracking area code (tracking area code, TAC) corresponding to the one or more cells of the first network. The TAC may be used to indicate a cell that can be accessed by the UE. The TAC may be further used to indicate the second access network device to page the UE only in a corresponding cell, and does not need to page the UE in another cell. In this way, overheads of paging the UE are reduced, and efficiency of paging the UE is improved.

The first message may further carry a radio network area code (RAN area code, RANAC) corresponding to the one or more cells of the first network. The RANAC may be used to indicate a cell that can be accessed by the UE. The RANAC may be further used to indicate the second access network device to page the UE only in a corresponding cell, and does not need to page the UE in another cell. In this way, overheads of paging the UE are reduced, and efficiency of paging the UE is improved.

The first message may further carry timer (timer) information used to indicate the terminal device to access the first network within a specified time.

The following describes how the second access network assists in paging the UE after the second access network device receives the first message from the first access network device in S802.

S803. The second access network device obtains context information of the UE from the first access network device.

For example, the second access network device sends a context request message (retrieve UE context request) to the first access network device, where the context request message carries the UE identifier. After receiving the context request message from the second access network device, the first access network device sends context of the UE to the second access network device (by using, for example, a retrieve UE context response message). The second access network device receives the context of the UE from the first access network device.

It can be learned from the foregoing description that the UE has accessed the second access network device and is in the RRC connected state. For example, the UE sets up a connection to the first cell of the second network. When downlink data of the UE arrives at the first core network device, the first core network device sends the downlink data to the first access network device, and the first access network device does not receive a paging response. The second access network device assists in paging the UE, so that the UE can access a cell of the first network of the first core network, to obtain downlink data of the first network.

Specifically, the first cell served by the second access network device sends a message to the UE, where the message is used to indicate that the downlink data of the first network arrives. After receiving the message sent by the first cell, the UE learns that the downlink data of the first network arrives, and triggers setup of a connection to the cell of the first network. The cell of the first network is denoted as a second cell.

S803 is an optional step, and may be omitted.

There are several optional manners below for the UE to set up a connection to the second cell of the first network.

Manner 1: After determining the second cell, the UE sets up a connection to the second cell. Details are as follows.

S804-1. The first cell served by the second access network device sends one of an RRC resume (RRC resume) message, an RRC reconfiguration (RRC reconfiguration) message, a paging (paging) message, another RRC message, a downlink control information (downlink control information, DCI) message, a MAC signaling message, or a user plane message to the UE, and the UE receives the one of the RRC resume message, the RRC reconfiguration (RRC reconfiguration) message, the paging (paging) message, the another RRC message, the downlink control information (downlink control information, DCI) message, the MAC signaling message, or the user plane message from the second access network device.

The following uses an RRC resume message as an example for description.

It should be noted that, after accessing the second access network device, the UE may still receive the paging message from the second access network device.

The RRC resume message may be sent after the UE enters the connected state after the UE accesses the first cell of the second access network device; or may be sent in a process in which the UE accesses the first cell of the second access network device.

Optionally, the RRC resume message carries some information, and the information may be from the first message that is received by the second access network device from the first access network device.

For example, the RRC resume message may carry a UE identifier, and the UE identifier may be an identifier of the UE in the first network.

The RRC message may further carry the network identification information of the first network, which may include, for example, a NID or a CAG ID.

The RRC resume message may carry the identification information of the one or more cells of the first network. The identification information of the one or more cells of the first network includes identification information that is of the one or more cells of the first network configured by the first access network device and that is transmitted in the first message, or identification information that is of the one or more cells of the first network configured by the second access network device and that is transmitted in the first message. The identification information is used to indicate a cell that can be accessed by the UE. The second cell accessed by the UE may be one of the one or more cells of the first network, or the second cell may be a cell of the first network other than the one or more cells. That is, the UE may select one cell from cells that are indicated in the RRC resume message and that can be selected by the UE, or may select another cell in the first network.

The RRC resume message may carry a TAC of each cell in the one or more cells of the first network.

The RRC resume message may carry a cause for sending the RRC resume message, and a cause value may be a character such as PLMN, SNPN, PNI-NPN, NPN, or non-3GPP, indicating a message sent for a PLMN network service, an SNPN network service, a PNI-NPN network service, an NPN network service, or a non-3GPP network service.

The RRC resume message may carry a PLMN ID list corresponding to each of the one or more cells of the first network.

The RRC resume message may carry a RAN Node ID to which each of the one or more cells of the first network belongs.

The RRC resume message may carry a radio network area code (RAN area code, RANAC) of each of the one or more cells of the first network.

The RRC resume message may carry timer (timer) information, and the timer information identifies that the UE needs to access a selectable cell within a period of time.

The RRC resume message may carry one or more of the following parameters of each of the one or more cells of the first network: a configuration parameter of a random access resource, a configuration parameter of a data radio bearer (data radio bearer, DRB), a configuration parameter of a signaling radio bearer (signaling radio bearer, SRB), context information of the UE, or security and integrity protection information of the UE.

The following uses an example in which the second cell is a cell configured by the first access network device.

S805-1. The UE sends an RRC resume request (RRC resume request) message to the second cell served by the first access network device, and the second cell served by the first access network device receives the RRC resume request message from the UE.

Specifically, the UE needs to determine a specific cell of the first network that needs to be accessed, and may select one cell from selectable cells sent by the first cell of the second access network device, or may select another cell of the first network.

S806-1. The second cell of the first access network device sends an RRC resume message to the UE, and the UE receives the RRC resume message from the second cell of the first access network device.

The RRC resume message may also be an RRC setup message.

S807-1. The UE sends an RRC resume complete (RRC resume complete) message to the second cell of the first access network device, and the second cell of the first access network device receives the RRC resume complete message from the UE.

Alternatively, if an RRC setup (RRC setup) message is sent in S806-1, the RRC resume complete message herein is replaced with an RRC setup complete (RRC setup complete) message.

In this step, the RRC resume complete message or the RRC setup complete message carries the following information: identification information of a cell selected by the UE for access, that is, identification information of the second cell, for example, a CGI, a PCI, or a cell identity; the network identification information of the first network, for example, a PLMN ID and a NID, a PLMN ID and a CAG ID, a CAG ID, a NID, a human readable network name corresponding to the NID, a human readable network name corresponding to the CAG ID, or other unified NIDs, for example, a common NID.

As described above, the second cell accessed by the UE may be one of cells that are indicated by a network side (for example, indicated by using a message such as the RRC resume message) and that can be selected by the UE, or may be another cell that is of the first network and that is selected by the UE.

A method for the UE to select the another cell in the first network may be as follows: The cell broadcasts, in system information, a network identifier of a network supported by the cell, where the network identifier includes one or more of the following: a CAG ID, a NID, a PLMN ID, a human readable network name of an SNPN network, or a human readable network name of a PNI-NPN network. The UE obtains, from the system information broadcast by the cell, the network to which the cell supports access. If the network to which the cell supports access is consistent with a network that the UE needs to access, the UE may select the cell for access. For example, in a system information type 1 (System Information Block Type 1, SIB1) of a cell, there is a PLMN ID of a network to which the cell supports access and a corresponding CAG ID and/or NID. Generally, the NID/CAG ID is unique in a range of the PLMN ID, an SNPN is identified by using a PLMN ID and a NID, and a PNI-NPN is identified by using a PLMN ID and a CAGID. For another example, each NID/CAG ID corresponding to the PLMN ID may further correspond to one HRNN, to identify a network name of the SNPN/a network name of the PNI-NPN. The HRNN is broadcast in one or more of the following manners: broadcasting the HRNN in SIB1, broadcasting the HRNN in other existing system information (for example, SIB2 and system information of a higher type) in the 3GPP standards, or broadcasting the HRNN in a dedicated SIB of a new type to be newly defined in the future. If the HRNN is broadcast in SIB1, the HRNN is added at a corresponding position of each NID/CAG ID corresponding to the PLMN ID. If the HRNN is broadcasted in the other existing system information (for example, SIB2 and the system information of a higher type) in the 3GPP standards, or is broadcasted in the dedicated SIB which is to be newly defined in the future, solutions may be as follows:

Solution 1: An HRNN and a corresponding PLMN ID and NID/CAG ID are entirely provided in the system information.

Solution 2: An HRNN is provided in the system information, and simplified information of a corresponding PLMN ID and NID/CAG ID is also provided.

In the solution 1, all PLMN IDs and NIDs/CAG IDs need to be provided, but the PLMN IDs and the NIDs/CAG IDs have been broadcast in the SIB1, that is, the PLMN IDs and the NIDs/CAG IDs are broadcast at least twice in different system information in the same cell. Because the PLMN IDs and the NIDs/CAG IDs are relatively long, information broadcasted in the different system information in the solution 1 is redundant, many resources are consumed for broadcasting, and costs are relatively high.

For the option 2, the simplified information of the PLMN ID and the NID/CAG ID may be index (index) information of the PLMN ID and the NID/CAG ID, or simplified information of only a part of the PLMN ID and the NID/CAG ID is provided, or only a part of the PLMN ID and/or the NID/CAG ID is provided, or only the HRNN but no PLMN ID and NID/CAG ID is provided. Although only the simplified information of the PLMN ID and the NID/CAG ID is broadcast, based on the simplified information of the PLMN ID and the NID/CAG ID and/or information broadcast in another piece of system information (for example, the SIB1), a correspondence between the HRNN and the PLMN ID and the NID/CAG ID of the HRNN may still be known, for example:

1. An index of a network identified by using a PLMN ID and a NID/CAG ID may be provided together with an HRNN of the network. For example, if a total quantity of networks that support access and that are broadcast in the SIB1 does not exceed 12, the index of the network identified by using the PLMN ID and the NID/CAG ID provided in the SIB1 may be implemented by using four or twelve bits. For example, 0010 indicates a network ranking second in networks provided in the SIB1. Four or twelve bits are far less than a quantity of bits occupied by the PLMN ID and the NID/CAG ID. For example, the SIB1 sequentially provides a network #1, a network #2, a network #3, and a network #4 that are sequentially identified by using a PLMN ID #1 and a CAG ID #1, a PLMN ID #2 and a CAG ID #2, a PLMN ID #3 and a NID #1, and the PLMN ID #2 and the CAG ID #3. The network #3 is not configured with an HRNN, and the network #1, the network #2, and the network #4 are respectively configured with an HRNN #1, an HRNN #2, and an HRNN #3. In this case, in the foregoing other SIBs (the SIB2, SIB of a higher type, or a newly defined SIB), 0001 and the HRNN #1 of the network #1, 0010 and the HRNN #2 of the network #2, and 0100 and the HRNN #3 of the network #4 may be sequentially provided; or 000000000001 and the HRNN #1 of the network #1, 000000000010 and the HRNN #2 of the network #2, and 000000001000 and the HRNN #3 of the network #4 may be sequentially provided; or 000000001011 is provided, and the HRNN #1, the HRNN #2, and the HRNN #3 are sequentially provided. It may be understood that if no HRNN is configured for the foregoing networks, index information of the networks may not be provided in the foregoing other SIBs (the SIB2, SIB of a higher type, or the newly defined SIB). Specific index information may be provided when the SIB1 provides the PLMN IDs and the NIDs/CAG IDs of the networks. The simplified information of the PLMN ID, the NID/CAG ID, or the network may be identified by using a ServCell index, a PLMN-ID index, a S Cell index, an SSB-index, a PCI-range index, or an RA-preamble index that is already provided in the existing 3GPP standards.

2. When a network to which a cell supports access is identified by using only one PLMN ID, that is, only one PLMN ID but no other PLMN ID appears in the SIB1, only an HRNN and a corresponding NID/CAG ID are provided in the foregoing other SIBs (the SIB2, SIB of a higher type, or the newly defined SIB). Similarly, if only one CAG ID/NID appears in the SIB1, only an HRNN and a corresponding PLMN ID are provided in the foregoing other SIBs (the SIB2, SIB of a higher type, or the newly defined SIB).

3. The other SIB (SIB2, SIB of a higher type, or the newly defined SIB) includes HRNNs, and an order of HRNNs included in this SIB is the same as the order of PLMN IDs and the NIDs/CAG IDs included in the SIB1. It is possible that one network, which is identified by PLMN ID and NID/CAG ID, is not configured with corresponding HRNNs. In this case, the corresponding entry in the aforementioned SIB is absent or a vacant location may be indicated by using an identifier, or a location lack of an HRNN in a corresponding network is indicated at another location or in another manner. For example, the SIB1 includes a network #1, a network #2, a network #3, and a network #4 that are respectively identified by using a PLMN ID #1 and a CAG ID #1, a PLMN ID #2 and a CAG ID #2, a PLMN ID #3 and a NID #1, and the PLMN ID #2 and the CAG ID #3. The network #3 is not configured with an HRNN, and the network #1, the network #2, and the network #4 are respectively configured with an HRNN #1, an HRNN #2, and an HRNN #3. In this case, the HRNN #1, the HRNN #2, 0, and the HRNN #3 are included in the aforementioned SIBs (the SIB2, SIB of a higher type, or the newly defined SIB). 0 is used to indicate that the network #3 is lack of an HRNN, that is, the network #3 is not configured with an HRNN.

When the UE selects a network and accesses the network, the UE reports, to a network side, network identification information of the network that the UE selects to access. For example, UE in an RRC-idle state reports, by using a message such as an RRC setup complete message, network identification information of a network selected by the UE to access. The network identification information may be one or more of the following: a CAG ID, a NID, a PLMN ID, a human readable network name of an SNPN network, or a human readable network name of a PNI-NPN network. For UE in an RRC-inactive state, the network identification information is reported to the network side by using a message such as an RRC resume complete message. For UE in an RRC-connected state, the network identification information may be reported to the network side by using a message such as a UL Information Transfer message. In the foregoing state, the network identification information may alternatively be reported in another manner, for example, by using an RRC reestablishment request message, or an RRC reestablishment complete message. Certainly, in the foregoing messages, the UE may further report cell identification information of a cell accessed by the UE, for example, one or more of the following: a CGI, a PCI, a cell identity, or the like. The network identification information and the cell identification information may be transmitted in the following manners:

1. An AS layer of the network side cannot parse the foregoing information, that is, the information is transmitted to the network side by using the foregoing message, and is included in a dedicated NAS-message (dedicated NAS-message) included in the foregoing message. If the UE takes measures such as NAS stratum encryption when transmitting the foregoing dedicated NAS-message, the AS layer of the network side cannot parse the foregoing message. For example, the access network device cannot parse the foregoing encrypted dedicated NAS-message, that is, the RAN cannot parse the foregoing identification information, but the core network device (for example, an AMF) can parse the foregoing identification information. The advantage of this manner is that security of transmission through a Uu interface is higher because of encryption. A disadvantage is that, if the network side needs to learn of the foregoing identification information, a core network device is required or the UE further notifies the access network device of the information by using another message. For example, the AMF sends the identification information to the access network device by using a message such as an initial context setup request, a UE context setup request message, or a PDU session resource setup request.

2. The AS layer of the network side can parse the foregoing information, that is, the information is transmitted to the network side by using the foregoing message, but the information is not included in a dedicated NAS-message (dedicated NAS-message) included in the foregoing message. An advantage of this manner is that in a process of transmitting the foregoing information to the core network device, the access network device can also learn of the foregoing information, and the access network side may perform access control, permission verification, and the like in advance. A disadvantage is that security is poorer than that of the method 1. However, the security can also be ensured through, for example, RRC encryption at the AS layer. After learning of the identification information, the access network device may notify the core network device by using another message. For example, the access network device adds the identification information to an initial UE message to notify the AMF.

The foregoing two manners can be used flexibly. For example, the UE may report the identification information to the network side in only one of the foregoing manners, or may report the identification information in both the two manners. For example, in the foregoing message (such as the RRC setup complete message), the foregoing identification information is not only included in the dedicated NAS-message (dedicated NAS-message) of the foregoing message, but also included in a non-dedicated NAS message (dedicated NAS-message) or non-dedicated NAS information of the foregoing message. The access network device may determine, depending on whether the identification information is parsed out from the AS message, whether to add the identification information to a message (for example, an initial UE message) to be sent to the core network device.

A specific manner used by the UE and whether the access network device adds the foregoing message to the foregoing message to be sent to the core network device may be determined in a default manner specified in a standard, or may be determined in a specific implementation of the foregoing network elements. For example:

1. Before the UE enters the RRC-idle, the RRC-inactive, or the RRC-connected state next time (for example, after the UE is registered or authenticated), the AMF notifies the UE by using a NAS message or the access network device notifies the UE by using an RRC message (or the AMF may first notify the access network device by using an NG interface message, and then the access network device notifies the UE by using an RRC message) of one or two of the foregoing manners that the UE should use (the AMF or the access network device may make a decision based on a factor such as network security) to transmit one or more pieces of the foregoing identification information, when the UE enters the RRC-idle, the RRC-inactive, or the RRC-connected state next time or several times later or within a specific time and sends the foregoing message (for example, RRC setup complete).

2. Before entering the RRC-idle, the RRC-inactive, or the RRC-connected state next time (for example, after the UE is registered or authenticated), the UE notifies the AMF by using a NAS message or notifies the access network device by using an RRC message (or the UE may first notify the access network device by using an RRC message, and the access network device further notifies the AMF) of one or two of the foregoing manners that the UE should use (the UE may make a decision based on a factor such as network security) to transmit one or more pieces of the foregoing identification information, when the UE enters the RRC-idle, the RRC-inactive, or the RRC-connected state next time or several times later or within a specific time and sends the foregoing message (for example, RRC setup complete).

3. The standard specifies that one or two of the foregoing manners are used by default.

4. In an attaching (attach) process, after receiving a CAG identifier, a network (for example, an AMF) may notify the UE whether to include the CAG identifier to NAS signaling during initial access next time or several times later or within a specific time. If the network considers that a privacy problem may be ignored, the UE is instructed to include the CAG identifier to MSG5 during next initial access; otherwise, the CAG identity is included in the NAS signaling during the next initial access. If the RAN receives the CAG identifier included in the AS, the RAN adds the CAG identifier to an initial UE message; otherwise, the RAN does not add the CAG identifier to the initial UE message.

It should be understood that the network identification information included in the foregoing message may alternatively be a CAG ID list, a NID list, a PLMN ID list, a human readable network name list of an SNPN network or a human readable network name list of a PNI-NPN network, a CGI list, a PCI list, a cell identity list, and the like. Carrying the foregoing list information (for example, the CAG ID list) may have the following applications and advantages compared with carrying only one identifier (for example, the CAG ID):

1. If local information of the UE includes IDs of a plurality of accessible CAGs (for example, an allowed CAG list indicates a CAG ID #1, a CAG ID #2, and a CAG ID #3 corresponding to an ID of a PLMN that the UE can access), if a cell broadcasts a PLMN ID and a CAG ID #1, a CAG ID #2, and a CAG ID #3 corresponding to the PLMN ID, and if the UE needs to access the cell, the UE reports, to the network side (the AMF or the access network device), only the CAG ID #1 of the cell selected to be accessed. In this case, due to a specific factor (the allowed CAG list on the AMF side is updated, and the allowed CAG list on the AMF side includes only the CAG ID #2 and the CAG ID #3; or an access network side access control policy does not accept access of a user with the CAG ID #1), the AMF or the access network no longer allows the UE to access the cell by using the CAG ID #1, and an access request of the UE is rejected by the AMF or the access network device. However, if the UE reports the CAG ID list (for example, reports the CAG ID #1, the CAG ID #2, and the CAG ID #3 to the AMF or the access network), because the local allowed CAG list on the AMF or access network device further includes the CAG ID #2 and the CAG ID #3, the UE is not rejected by the AMF or the access network device, and the UE can still access the cell. Certainly, in an implementation, the UE may carry only the CAG ID #1, and the AMF and the access network device may accept a request of the UE, because the UE further supports access to the CAG ID #2 and the CAG ID #3. In this case, behavior of the AMF or the access network device needs to be modified in the standard.

2. The access network device triggers paging for RRC-inactive UE, or the AMF triggers paging for RRC-idle UE. If the UE receives the paging in a cell that broadcasts the CAG ID #1, the UE may select to respond to the paging in another cell that broadcasts the CAG ID #1 and the CAG ID #2 and that has higher signal strength, and report the CAG ID #1 and the CAG ID #2 to the access network device or the AMF.

3. The access network device triggers paging for RRC-inactive UE, or the AMF triggers paging for RRC-idle UE. If the UE receives the paging in a cell that broadcasts a PLMN ID and a corresponding CAG ID #1, CAG ID #2, and CAG ID #3, and for some reason at this time (the allowed CAG list on the AMF side is updated, and the allowed CAG list on the AMF side includes only the CAG ID #2 and the CAG ID #3; or an access control policy on the access network side does not allow access of a user with the CAG ID #1), the AMF or the access network no longer allows the UE to access the cell by using the CAG ID #1. If the UE reports only the CAG ID #1 of the cell selected to be accessed to the network side (the AMF or the access network device) in a paging response process, the access request of the UE is rejected by the AMF or the access network device. However, if the UE reports the CAG ID list (for example, reports the CAG ID #1, the CAG ID #2, and the CAG ID #3 to the AMF or the access network), because the local allowed CAG list on the AMF or access network device further includes the CAG ID #2 and the CAG ID #3, the UE is not rejected by the AMF or the access network device, and the UE can still access the cell. Certainly, in an implementation, the UE may carry only the CAG ID #1, and the AMF and the access network device may accept a request of the UE, because the UE further supports access to the CAG ID #2 and the CAG ID #3. In this case, behavior of the AMF or the access network device needs to be modified in the standard.

The allowed CAG list on the AMF or the access network device is updated (as described above, the allowed CAG list including the original CAG ID #1, CAG ID #2, and CAG ID #3 is updated to an allowed CAG list including the CAG ID #2 and the CAG ID #3). In this case, the AMF or the access network device sends a message such as a paging message to the UE in the RRC-idle state or the RRC-inactive state to enable the UE to access the network, so that the UE updates the allowed CAG list. The message carries a cause value or an indication to notify the UE that a cause for sending the message is that the allowed CAG list is updated. After receiving the cause value or the indication, instead of carrying only the CAG ID #1, the UE reports, to the network side, the CAG ID #1, the CAG ID #2, and the CAG ID #3 that correspond to the cell that the UE is authorized to access. In this case, the UE may successfully access the cell to update the allowed CAG list, and is not rejected by the AMF or the access network device.

After S807-1, the second cell resumes or reconfigures UE related parameters according to a conventional procedure. It should be noted that, if the configuration parameter of the random access resource of the second cell is carried in S804-1, the UE may perform non-contention access to the third cell based on the configuration parameter of the random access resource, and initiate a resume process, thereby increasing a success probability of RRC resume. If S804-1 carries one or more of the configuration parameter of the data radio bearer (data radio bearer, DRB) of the second cell, the configuration parameter of the signaling radio bearer (signaling radio bearer, SRB), the context information of the UE, or the security and integrity protection information of the UE, time and steps of parameter configuration in steps 805-1 to 807-1 and subsequent processes can be reduced.

Figure 9A:
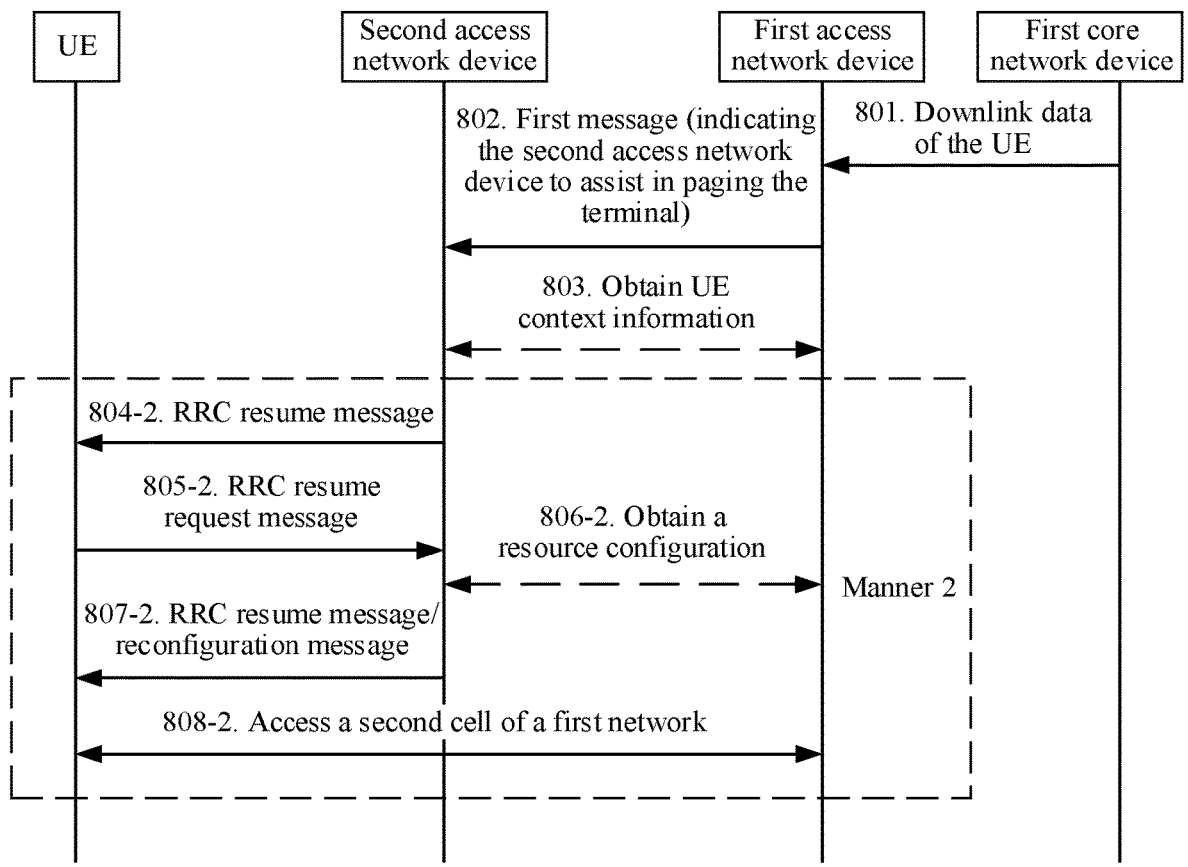
FIG. 9a is a second specific schematic flowchart of a paging method according to an embodiment of this application.
Figure 9B:
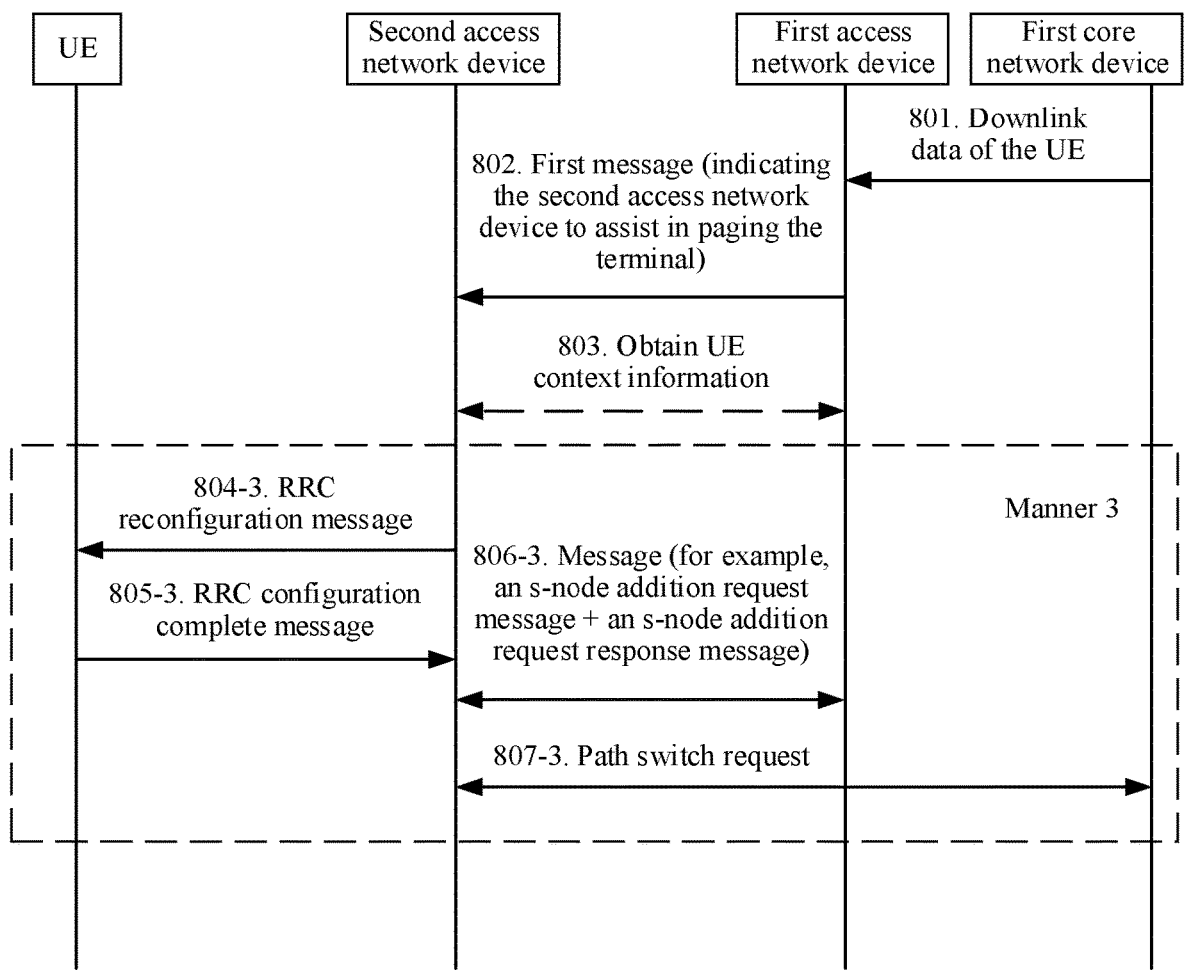
FIG. 9b is a third specific schematic flowchart of a paging method according to an embodiment of this application.

Manner 2 and manner 3 are shown in FIG. 9a and FIG. 9b.

Manner 2: After configuring the parameters of the second cell in the first cell, the UE sets up a connection to the second cell. Details are as follows.

S804-2. The first cell served by the second access network device sends one of an RRC resume (RRC resume) message, an RRC reconfiguration (RRC reconfiguration) message, a paging (paging) message, another RRC message, a downlink control information (downlink control information, DCI) message, a MAC signaling message, or a user plane message to the UE, and the UE receives the one of the RRC resume message, the RRC reconfiguration (RRC reconfiguration) message, the paging (paging) message, the another RRC message, the downlink control information (downlink control information, DCI) message, the MAC signaling message, or the user plane message from the second access network device.

For description of information carried in a specific message, refer to S804-1. Details are not described herein again.

The following uses an RRC resume message as an example for description.

S805-2. The UE sends an RRC resume request (RRC resume request) message to the first cell served by the second access network device, and the first cell served by the second access network device receives the RRC resume request message from the UE.

The RRC resume request message carries information about the second cell of the first network that the UE selects to access, for example, the identification information of the second cell, or the identification information of the first network (for example, a PLMN ID and a NID, a PLMN ID and a CAG ID, a CAG ID, a NID, a human readable network name corresponding to the NID, a human readable network name corresponding to the CAG ID, or other unified NIDs, for example, common NIDs). The RRC resume request message may further carry the identification information of the UE in the first network. The second cell may be configured to be served by the first access network device, or may be configured to be served by the second access network device. The following uses an example in which the second cell is configured to be served by the first access network device.

The RRC resume request message may be sent after the UE enters the connected state after the UE accesses the first cell of the second access network device. The RRC resume request message may be an RRC resume request message sent in a process in which the UE accesses the first cell of the second access network device.

S806-2. The first cell of the second access network device obtains a resource configuration parameter from the second cell of the first network.

The resource configuration parameter includes at least one of the following information: a configuration parameter of a random access resource, a configuration parameter of a DRB, a configuration parameter of an SRB, context information of the UE, or security and integrity protection information of the UE. If the resource configuration parameters have been obtained in the foregoing steps, this step is omitted. For example, the foregoing resource configuration parameters may be obtained in step 803. A manner of obtaining the foregoing parameters in S806-2 may be the same as that in S803, and details are not described again.

S807-2. The first cell of the second access network device sends an RRC resume/RRC reconfiguration message to the UE, and the UE receives the RRC resume/RRC reconfiguration message from the first cell of the second access network device.

The RRC resume/RRC reconfiguration message carries the resource configuration parameter of the second cell.

The RRC resume/RRC reconfiguration message may further carry the identification information of the second cell.

The RRC resume/RRC reconfiguration message may further carry the identification information of the first network.

The RRC resume/RRC reconfiguration message may further carry the cause. A cause value is used to indicate the first cell to assist the second cell in transmitting a related configuration parameter. For example, the cause value is assistant or the like, or the cause value is a character such as SNPN, PNI-NPN, or non-3GPP, indicating a message sent for an SNPN network service, a PNI-NPN network service, a non-3GPP network service, or the like.

The parameter of the second cell carried in the RRC resume/RRC reconfiguration message may be sent by the second cell to the first cell, that is, sent by the first access network device to the second access network device, or may be generated by the first cell. For example, a parameter of the first cell is reused to configure the parameter of the second cell, and the first cell sends the parameter that has been configured in the first cell to the UE as the parameter of the second cell.

S808-2. The UE accesses the second cell of the first access network device.

For example, the UE sends an RRC resume request (RRC resume request) message or a non-contention based random access process to the second cell of the first access network device, and the second cell of the first access network device receives the RRC resume request message from the UE or performs the random access process of the UE.

Manner 3: The UE does not set up a connection to the second cell of the first network, but receives or sends data of the second cell by using the first cell of the second access network device.

S804-3. The first cell served by the second access network device sends one of an RRC reconfiguration (RRC reconfiguration) message, a paging (paging) message, another RRC message, a downlink control information (downlink control information, DCI) message, a MAC signaling message, or a user plane message to the UE, and the UE receives the one of the RRC reconfiguration (RRC reconfiguration) message, the paging (paging) message, the another RRC message, the downlink control information (downlink control information, DCI) message, the MAC signaling message, or the user plane message from the second access network device.

An RRC reconfiguration (RRC reconfiguration) message is used as an example for description.

The RRC reconfiguration (RRC reconfiguration) message includes a resource configuration parameter of the first cell, where the resource configuration parameter of the first cell is used to configure a resource of the first cell, and the resource of the first cell is used to transmit data of the first network in the first cell of the second network. The resource configuration parameter of the first cell may include one or more of the following: a configuration parameter of a random access resource, a configuration parameter of a DRB, a configuration parameter of an SRB, context information of the terminal, or security and integrity protection information of the terminal.

The RRC reconfiguration message may further carry any one or more of the following information: the identification information of the second cell, the identification information of the first network, identification information of the cell (which may include the first cell) in the second network, the identification information of the second network, and a cause value. The identification information of the second cell, the identification information of the first network, the identification information of the cell in the second network, and the identification information of the second network are used to notify the UE that the cell of the second network assists the first network in transmitting data, or are used to notify the UE that the cell of the second network assists the second cell of the first network in transmitting data. The cause value may be assistant, indicating a message sent for assistance in transmission, or the cause value is the foregoing character such as SNPN, PNI-NPN, or non-3GPP, indicating a message sent for an SNPN network service, a PNI-NPN network service, and a non-3GPP network service.

S805-3. The UE sends an RRC configuration complete (RRC reconfiguration complete) message to the first cell served by the second access network device.

S806-3. The second access network device sends a message to the first access network device. The first access network device receives the message from the second access network device.

For example, the message may be an s-node addition request (s-node addition request) message, an s-node modification request (s-node modification request) message, an s-node modification required (s-node modification required) message, or an s-node change required (s-node change required) message. The message is used to configure dual connectivity (dual connectivity, DC), so that the second access network device assists the first access network in transmitting data. The message may carry any one or more of the following information: the cause value, the identification information of the second cell, the identification information of the first network, the identification information of the cell (which may include the first cell) in the second network, or the identification information of the second network.

The message is used to notify the first access network device that the cell of the second network assists the first network in transmitting data, or is used to notify the first access network device that the cell of the second network assists the second cell of the first network in transmitting data, or is used to notify the first access network device of a network identifier of a network accessed by the UE, for example, a network identifier NID of an SNPN accessed by the UE. The cause value may be assistant, indicating dual connectivity setup due to assistance in transmission.

In addition, the first access network device feeds back a response message to the second access network device, and the second access network device receives the response message from the first access network device.

For example, the response message may be an s-node addition request acknowledge (s-node addition request acknowledge) message, an s-node modification request acknowledge (s-node modification request acknowledge) message, or an s-node modification confirm (s-node modification confirm) message, an s node change confirm (s-node change confirm) message, or an s node reconfiguration complete (s-node reconfiguration complete) message.

The response message may carry any one or more of the following information: the cause value, the identification information of the second cell, the identification information of the first network, the identification information of the cell (which may include the first cell) in the second network, or the identification information of the second network. The response message is used to notify the second access network device that the cell of the second network assists the first network in transmitting data, or is used to notify the second access network device that the cell of the second network assists the second cell of the first network in transmitting data, or is used to notify the second access network device of a network identifier of a network accessed by the UE, for example, a network identifier NID of an SNPN accessed by the UE. The cause value may be assistant, indicating a path change of data transmission due to assistance in transmission.

In addition, the message fed back by the first access network device to the second access network device may also indicate rejection of a dual-connectivity request of the second access network device. For example, the message may be an s-node addition request reject (s-node addition request reject) message, an s-node modification request reject (s-node modification request reject) message, an s-node modification refuse (s-node modification refuse) message, an s-node change refuse (s-node change refuse) message, an s-node release request (s-node release request) message, or an s-node release required (s-node release required) message. The response message may carry a cause value. The cause value may be an invalid NID or an invalid CAG ID, to indicate that the first access network device does not support the network accessed by the UE.

S807-3. The second access network device sends a path switch request (path switch request) message to the first core network device. The first core network device receives the path switch request message from the second access network device.

The path switch request may carry the cause value. The cause value may be assistant, indicating a path change of data transmission due to assistance in transmission. The path switch request may further carry any one or more of the following information: the identification information of the second cell, the identification information of the first network, the identification information of the cell (which may include the first cell) in the second network, and the identification information of the second network, to notify the AMF that the cell in the second network assists the first network in transmitting data, or notify the AMF that the cell of the second network assists the second cell of the first network in transmitting data, or notify the AMF of a network identifier of a network accessed by the UE.

In addition, a path switch request response (path switch request acknowledge) message fed back by the AMF to the second access network device may also carry a cause value. The cause value may be assistant, indicating a path change of data transmission due to assistance in transmission. The path switch request response message may further carry any one or more of the following information: the identification information of the second cell, the identification information of the first network, the identification information of the cell (which may include the first cell) in the second network, and the identification information of the second network, to notify the second access network device that the cell in the second network assists the first network in transmitting data, or notify the second access network device that the cell of the second network assists the second cell of the first network in transmitting data, or notify the second access network device of a network identifier of a network accessed by the UE.

In conclusion, the first access network device may assist in paging the UE by using the second access network device. Specifically, it is assumed that the UE is already in the RRC-connected (RRC-connected) state in the second network of the second access network device, but for the first network of the first core network device, the UE is in the inactive (inactive) state. It should be noted that the UE needs to retain the context information of the first network. Because the UE in the RRC connected state does not listen to a paging message of the first access network device, when downlink data of the first network arrives, the first access network device cannot page the UE. In addition, it should be noted that when the second access network device assists, in the cell of the first network configured by the second access network device, the first access network device in paging the UE, the UE may not be in the RRC-connected (RRC-connected) state of the second network of the second access network device, the UE is in the RRC-inactive state in the first network. Because the UE is not in the coverage of the first access network device, the UE cannot receive the paging from the first access network device, and cannot respond to the paging. Consequently, the first access network device cannot page the UE. According to the foregoing method provided in this application, the first access network device sends the first message to the second access network device, and requests, by using the first message, the second access network device to assist in paging the UE.

Figure 10:
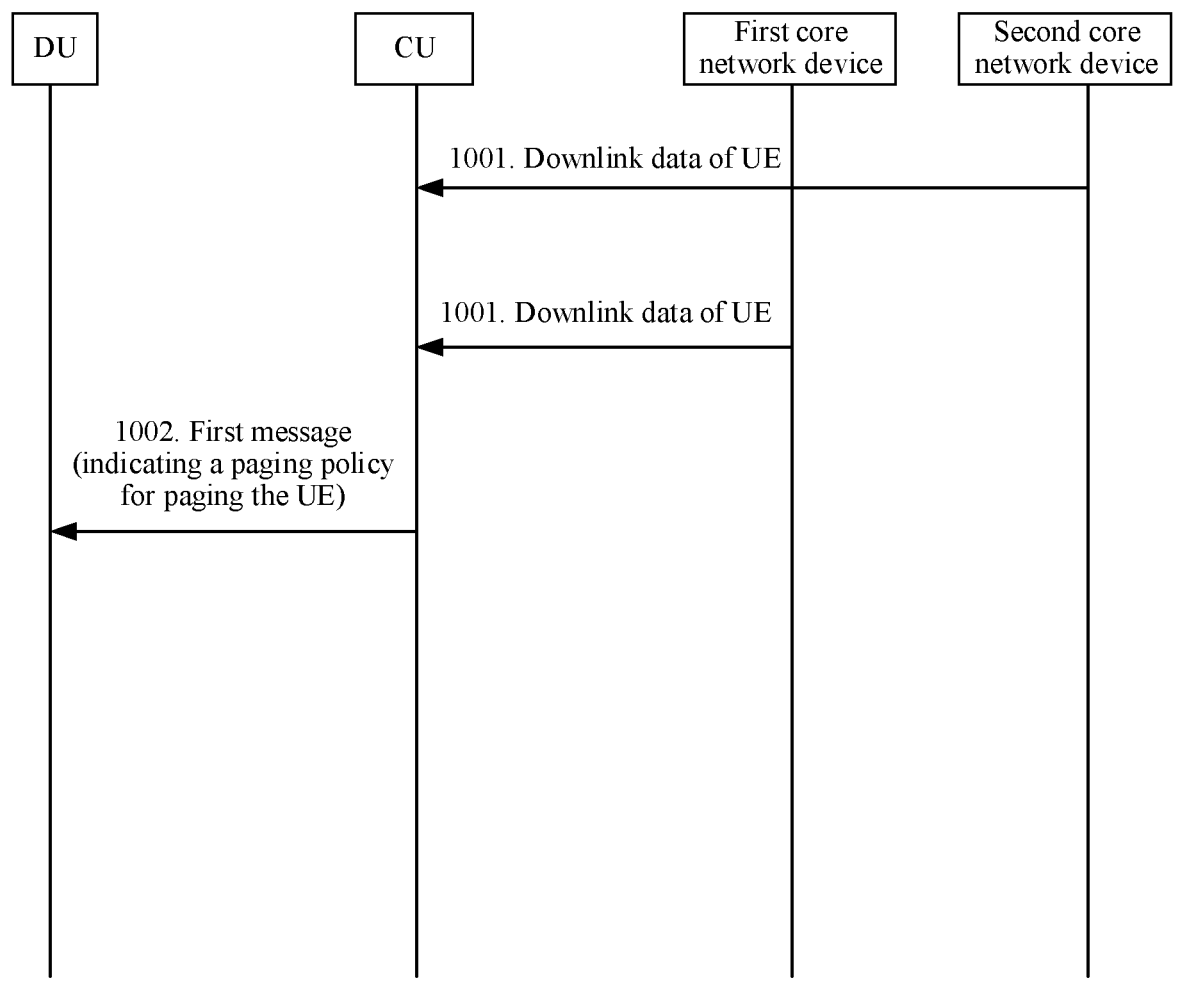
FIG. 10 is a fourth specific schematic flowchart of a paging method according to an embodiment of this application.

The foregoing describes the paging method for a system architecture including two access network devices. As described above, different networks may share an access network device. In addition, the shared access network device may have a CU-DU split architecture. The following describes a paging method in this application scenario. It is assumed that the shared access network device belongs to a first network and a second network. A cell of the first network and a cell of the second network are configured to be served by the shared access network device. UE is in an RRC-inactive state in both the first network and the second network. A specific process is shown in FIG. 10.

S1001. A first core network device and a second core network device send downlink data of a terminal to a CU, and the CU receives the downlink data of the terminal from the first core network device and the second core network device.

The terminal may also be represented by UE in the following description.

The first core network device belongs to the first network, and the second core network device belongs to the second network.

S1002. The CU sends a first message to a DU, and the DU receives the first message from the CU.

The first message is used to indicate a paging policy for paging the UE.

The paging policy includes:

Policy 1: Paging is performed only in the cell of the first network.

Some cells served by the shared access network device may belong to the first network, and some cells served by the shared access network device belong to the second network. According to the policy 1, after receiving the first message, the DU performs, based on second indication information in the first message, paging in a cell that belongs to only the first network.

If a cell belongs to both the first network and the second network, the DU may perform paging in the cell according to the policy 1.

When indicating the policy 1, the first message may carry network identification information of the first network, an identifier of the UE in the first network, or identification information of one or more cells of the first network.

Policy 2: Paging is performed only in the cell of the second network.

Some cells served by the shared access network device may belong to the first network, and some cells served by the shared access network device belong to the second network. According to the policy 2, after receiving the first message, the DU performs, based on second indication information in the first message, paging in a cell that belongs to only the second network.

If a cell belongs to both the first network and the second network, the second access network device may perform paging in the cell according to the policy 2.

When indicating the policy 2, the first message may carry network identification information of the second network, an identifier of the UE in the first network, or identification information of one or more cells of the second network.

Policy 3: Paging is performed in both the cell of the first network and the cell of the second network.

When indicating the policy 3, the first message may carry network identification information of the first network, an identifier of the UE in the first network, identification information of one or more cells of the first network, network identification information of the second network, an identifier of the UE in the second network, or identification information of one or more cells of the second network.

Policy 4: Paging is performed in both the cell of the first network and the cell of the second network.

When indicating the policy 4, the first message may carry network identification information of the first network, an identifier of the UE in the first network, identification information of one or more cells of the first network, network identification information of the second network, or identification information of one or more cells of the second network.

The policy 4 is different from the policy 3. In the policy 3, the first message may carry both the identifier of the UE in the first network and the identifier of the UE in the second network, but in the policy 4, the first message may carry only the identifier of the UE in the first network. That is, in the policy 3, the DU may add both the identifier of the UE in the first network and the identifier of the UE in the second network to paging information (or other messages) sent in the cell of the first network and the cell of the second network, to initiate paging for the UE from two networks in cells of one type of networks. However, in the policy 4, the DU may add only the identifier of the UE in the first network to paging information (or other messages) sent in the cell of the first network and the cell of the second network, to initiate paging for the UE from a same network in cells of two types of networks. Optionally, the first message may carry one piece of indication (indication) information, and the indication information is used to indicate the paging policy.

For example, the indication information may be represented as "only CAG", "only NID", or "only PLMN", which instructs to page the UE only in a CAG cell, a NID cell, or a PLMN cell respectively.

The indication information may alternatively be implicitly indicated. For example, "only CAG allowed" is originally used to identify that the UE is allowed to access a 5GS only by using the CAG cell, and "only CAG allowed" may be used to implicitly indicate that the UE is paged only in the CAG cell.

The network identification information of the first network or the second network may be a public land mobile network identifier PLMN ID, a network identifier NID, a closed access group identifier CAG ID, a human readable network name HRNN corresponding to the NID, or an HRNN corresponding to the CAG ID.

The identification information of the UE in the first network or the identification information of the UE in the second network includes at least one of the following: a 5G S-temporary mobile subscriber identity 5G-S-TMSI, an inactive radio network temporary identifier I-RNTI, a globally unique temporary identity GUTI, a subscription concealed identifier SUCI, or a temporary mobile subscriber identity TMSI.

For specific descriptions of the network identification information and the identification information of the UE, refer to the foregoing related descriptions.

The first message is a message between the CU and the DU, and may be sent through an F1 interface between the CU and the DU. The first message may also be referred to as F1 interface paging. The following describes in detail content that may be further carried in the first message and a function of the first message.

The first message may carry a cause for sending the first message.

The first message may carry a tracking area code corresponding to one or more cells of the first network.

The first message may carry a radio network area code corresponding to one or more cells of the first network.

The first message may carry timer information used to indicate the UE to access the first network within a specified time.

The first message may carry a tracking area code corresponding to one or more cells of the second network.

The first message may carry a radio network area code corresponding to one or more cells of the second network.

The first message may carry timer information used to indicate the UE to access the second network within a specified time.

Based on the content carried in the first message above, the following provides some possible cases in which the first message carries information by using an IE. Descriptions are separately provided based on that the first message is a RAN paging message sent by a first access network device to a second access network device and that the first message is an F1 interface paging message sent by a shared CU to a shared DU.

1. The first message is a RAN paging message. Table 1 shows a possible representation form of information carried in the RAN paging message.

IEs in bold are newly added IEs in the RAN paging message in this application.

TABLE 1

| Information element name (IE/Group Name) | Description (semantics description) |
|---|---|
| Information type Message Type | Information type |
| CHOICE UE identity index value parameter CHOICE UE Identity Index Value parameter | CHOICE UE identity index value parameter |
| >Length-10 | Length |
| >>Index value length Index Length-10 | Index value length |
| UE RAN paging identifier Paging Identity | UE RAN paging identifier |

TABLE 1-continued

| Information element name (IE/Group Name) | Description (semantics description) |
|---|---|
| Access network device paging area RAN Paging Area | Access network device paging area |
| Paging priority Paging Priority | Paging priority |
| ... | |
| NID list List | NID list |
| > NID | NID |
| CAG list List | CAG list |
| > CAG ID | CAG ID |
| Indication Indication | Indication information |

2. The first message is a RAN paging message. The information carried in the RAN paging message may also be represented in a form shown in Table 2. The information carried in the RAN paging message is a new IE added at the level of the IE: access network device paging area RAN Paging Area. IEs in bold are newly added IEs.

TABLE 2

| Information element name (IE/Group Name) | Description (semantics description) |
|---|---|
| PLMN Identity | PLMN ID |
| NID List | NID list |
| > NID | NID |
| CAG List | CAG list |
| > CAG ID | CAG ID |
| Indication | Indication information |
| CHOICE RAN Paging Area Choice | Optional RAN paging cell |
| >Cell List (cell list) | Cell list |
| >>Cell List Item (cell list item) | Cell list item |
| ... | |
| >RAN Area ID List | RAN area ID list |
| >>RAN Area ID List Item | RAN area ID list item |

3. The first message is a RAN paging message. The information carried in the RAN paging message may also be represented in a form shown in Table 3. The information carried in the RAN paging message is a new IE added at the level of the IE: RAN Area ID list of the IE: access network device paging area RAN Paging Area. IEs in bold are newly added IEs.

TABLE 3

| Information element name (IE/Group Name) | Description (semantics description) |
|---|---|
| PLMN Identity | PLMN ID |
| CHOICE RAN Paging Area Choice | Optional RAN paging cell |
| >Cell List (cell list) | cell list |
| >>Cell List Item (cell list item) | Cell list item |
| ... | |
| >RAN Area ID List (RAN area identifier list) | RAN area identifier list |
| >>RAN Area ID List Item (RAN area identifier list item) | RAN area identifier list item |
| >>>RAN Area ID (RAN area identifier) | RAN area identifier |
| >>>NID List | NID list |
| >>>> NID | NID |
| >>>CAG List | CAG list |
| >>>>CAG ID | CAG ID |
| >>>Indication | Indication information |
| >RAN Area ID List | RAN area ID list |
| >>RAN Area ID List Item | RAN area ID list item |

In Table 3, the added information elements may also be included in the information element: RAN Area ID (RAN area identifier).

4. The first message is an F1 interface paging message. Table 4 shows a possible representation form of information carried in the F1 interface paging message.

IEs in bold are IEs newly added in the F1 interface paging message in this application.

TABLE 4

| Information element name (IE/Group Name) | Range (range) | Description (semantics description) |
|---|---|---|
| Information type Message Type | | |
| UE identifier index value UE Identity Index value | | |
| CHOICE paging identity list (CHOICE Paging Identity List) | 1 ... max | |
| >CHOICE paging identity list | | |
| CHOICE Paging Identity Item IEs | | |
| >>RAN UE paging identifier Paging identity | | |
| >>CN UE paging identifier Paging identity | | |
| ... | | |
| Paging cell list Paging Cell List | | |
| >Paging cell list Paging Cell Item IEs | | |
| >>NR CGI | | |
| >>NID list List | | |
| >>> NID | | |
| >>CAG List | | |
| >>>CAG ID | | |
| >>Indication | (CAG only, NID Only, PLMN only, both PLMN and PNI-NPN, both PLMN and SNPN, both SNPN and PNI-NPN, All ...) | |
| Paging Origin | | |
| Indication | (CAG only, NID Only, PLMN only, both PLMN and PNI-NPN, both PLMN and SNPN, both SNPN and PNI-NPN, All ...) | |

It should be understood that the range of the indication in the foregoing table is not only applicable to the foregoing table, but also applicable to other tables.

If the UE is in an RM-registered state but is in an RRC-idle state, when downlink data arrives at a core network, paging CN paging from the core network is triggered. The CN paging is from an AMF to an access network device. The CN paging may be referred to as NG interface paging. The following uses Table 5 to Table 7 to indicate a possible representation form of information carried in an NG interface paging message. In Table 5 to Table 7, M indicates mandatory, and O indicates optional.

5. The information carried in the NG interface paging message may be represented in a form shown in Table 5. IEs in bold are newly added IEs.

TABLE 5

| Information element name (IE/Group Name) | Semantics description (Term description) |
|---|---|
| Information type Message Type | Information type |
| UE paging identifier UE Paging Identity | UE paging identifier |
| TAI list for paging TAI List for Paging | TAI list for paging |
| >TAI list for paging item TAI List for Paging Item | TAI list for paging |

TABLE 5-continued

| Information element name (IE/Group Name) | Semantics description (Term description) |
|---|---|
| >>TAI | Tracking area identifier |
| >>NID List | NID list |
| >>> NID | NID |
| >>CAG List | CAG list |
| >>>CAG ID | CAG ID |
| >>Indication Indication | Indication information |
| Paging priority Paging Priority | Paging priority |
| ... | |
| Assistance data for paging Assistance Data for Paging | Assistance data for paging |

6. The information carried in the NG interface paging message may be represented in a form shown in Table 6. IEs in bold are newly added IEs.

TABLE 6

| Information element name (IE/Group Name) | Term description (Semantics description) |
|---|---|
| Information type Message Type | Information type |
| UE paging identifier UE Paging Identity | UE paging identifier |
| TAI list for paging TAI List for Paging | TAI list for paging |
| >TAI list for paging item TAI List for Paging Item | TAI list for paging |
| >>TAI | Tracking area identifier |
| Indication Indication | Indication information |
| Paging priority Paging Priority | Paging priority |
| ... | |
| Assistance data for paging Assistance Data for Paging | Assistance data for paging |
| NID List | NID list |
| > NID | NID |
| CAG List | CAG list |
| > CAG ID | CAG ID |

7. The information carried in the NG interface paging message may be represented in a form shown in Table 7. The information carried in the NG interface paging message is a new IE added to the level of IE: recommended cells for paging. IEs in bold are newly added IEs.

TABLE 7

| Information element name (IE/Group Name) | Description (semantics description) |
|---|---|
| Recommended cell Recommended Cell List | |
| >Recommended cell Recommended Cell Item | Including accessed cells and cells not accessed, where the accessed cells are listed in a sequence in which the UE accesses the cells, and a nearest cell is the first one in the list. The cells not accessed are included behind the accessed cells associated with the cells not accessed. |
| >>NG-RAN CGI | |
| >>NID List | NID list |
| >>> NID | NID |
| >>CAG List | CAG list |
| >>>CAG ID | CAG ID |
| >>Indication Indication | Indication information Indication information |
| ... | |

In addition, in Table 1 to Table 7, the CAG list may further be an allowed CAG list (allowed CAG list). The allowed CAG list is a parameter that is specified in the 3GPP standard TS 23.501 and that is used to describe whether the UE can access a corresponding PNI-NPN network, and is used to indicate a CAG identifier list that the UE is allowed to access. The AMF stores an allowed CAG list of specific UE. When the UE successfully accesses the network, the AMF includes the allowed CAG list in a mobility restriction list (mobility restriction list) and sends the mobility restriction list to an access network device. When the user is handed over, a source access network device may also include the allowed CAG list in the mobility restriction list (mobility restriction list) and send the mobility restriction list to a target access network device. Therefore, when the first access network device sends a RAN paging message to request the second access network device to assist in paging the UE, the first access network device may notify the second access network device that the second access network device needs to paging the UE only in a cell (a cell granularity) or an area (a TAI granularity or the like) or a PLMN ID (a PLMN ID granularity) corresponding to the CAG list (allowed CAG list) that the UE is allowed to access, to reduce paging overheads of the second access network device, and improve paging efficiency. Specifically, whether the first access network sends the allowed CAG list to the second access network device through RAN paging, or whether the AMF sends the allowed CAG list to the access network device through CN paging may be determined depending on whether the UE is allowed to access a 5GS (CAG only Indication) only by using a CAG cell. If the UE is allowed to access the 5GS only by using the CAG cell, the first access network device sends the allowed CAG list and a CAG ID included in the allowed CAG list to the second access network device, or the AMF sends the allowed CAG list and a CAG ID included in the allowed CAG list to the access network device. Otherwise, the access network device or the AMF does not include the allowed CAG list in the paging message. A cause why the paging message carries the allowed CAG list instead of carrying a specific CAG ID accessed by the UE previously by using the first access network device, or instead of carrying a CAG ID list supported by the first access network device, or instead of carrying a CAG ID list supported by the second access network device is as follows: On one hand, the first access network device may be unaware of a CAG ID specifically accessed by the UE. On the other hand, not only a CAG ID list supported by the first access network device is sent to the second access network device, so that it can be avoided that the UE is missed to be paged when the UE is in another CAG ID cell or area of the second access network device. In addition, if only the CAG ID list supported by the second access network device is carried, when the second access network device continues to seek assistance from a third access network device in paging the UE, when the UE is in another CAG ID cell or area of the third access network device, the UE may be missed to be paged, and so on.

The indication in Table 1 to Table 7 may be a CAG only indication, and is specified in the 3GPP standard TS 23.501 to describe whether the UE is allowed to access the 5GS only by using the CAG cell. The AMF stores a CAG only indication of specific UE, and when the UE successfully accesses the network, the AMF includes the CAG only indication in a mobility restriction (mobility restriction) list and sends the mobility restriction list to the access network device. When the user is handed over, a source access network device may also include the CAG only indication in a mobility restriction (mobility restriction) list and send the mobility restriction list to a target access network device. Therefore, when the first access network device sends a RAN paging message to request the second access network device to assist in paging the UE, the first access network device may notify the second access network device that the second access network device needs to paging the UE only in a cell (a cell granularity) or an area (a TAI granularity or the like) or a PLMN ID (a PLMN ID granularity) corresponding to the CAG list (CAG only Indication), to reduce paging overheads of the second access network device, and improve paging efficiency. Similarly, when sending CN paging to the access network device to page the UE, the AMF may notify the access network device that the access network device needs to page the UE only in a cell (a cell granularity) or an area (a TAI granularity or the like) or a PLMN ID (a PLMN ID granularity) corresponding to a CAG list (CAG only Indication).

The NID list in Table 1 to Table 7 may not be included, and only the NID is included. For example, when cross-SNPN handover or roaming is not supported, even if the UE is paged in the NID #2, the UE cannot respond to paging from the NID #1 even if the UE accesses a cell of the NID #2 where the UE is paged. Therefore, when a network corresponding to the NID #1 pages the UE, the first access network device only needs to transmit the NID #1 to the second access network device, or the AMF only needs to transmit the NID #1 to the access network device, and does not need to send all subscribed NID lists of the UE at the AMF to the access network device.

It should be understood that existing or newly added cells in Table 1 to Table 7 may not coexist, and may be selectively sent.

The embodiment shown in FIG. 8 describes the paging method for the communications system architecture including a plurality of access network devices. Based on the foregoing embodiment, the following describes a paging method for a shared access network device (shared-RAN). It is assumed that the shared access network device belongs to a first network and a second network. A cell of the first network and a cell of the second network are configured to be served by the shared access network device. UE is in an RRC-inactive state in both the first network and the second network. It is assumed that the first network is represented by a PLMN1, and the second network is represented by a PLMN2. A combination of the PLMN1 and the PLMN2 may be: a PNI-NPN and an SNPN, an SNPN and a PLMN, a PNI-NPN and a PLMN, an SNPN 1 and an SNPN 2, a PNI-NPN 1 and a PNI-NPN 2, and a PLMN1 and a PLMN2. The PNI-NPN and the PLMN may share an AMF and a UPF.

In this embodiment, the UE is already in the PLMN1 network and the PLMN2 network. The RAN is a shared-RAN and is shared by the first network and the second network. The UE is in the RRC-inactive state in the two networks. At a moment, data of the PLMN1 network arrives at a PLMN1-UPF, and data of the PLMN2 network arrives at a PLMN2-UPF. The PLMN1-UPF and the PLMN2-UPF separately send the data to the shared-RAN, to trigger the shared-RAN to perform paging. After receiving paging from a network, the UE accesses the corresponding network and enters a connected state. In this case, the UE cannot continue to listen to or receive paging from another network. To resolve this problem, in this embodiment, after the UE responds to paging from a network (for example, the first network) and accesses the shared-RAN, the shared-RAN assists the second network in continuing paging the UE, and resumes or preconfigures the following parameters by using RRC signaling of the accessed first network:

A first parameter includes a parameter, such as a RACH, a PRACH, or a preamble, that indicates random access to a third cell in the second network.

A second parameter includes resources such as an SRB and a DRB in the third cell.

A third parameter includes resources such as an SRB and a DRB in the first network.

A fourth parameter includes context information of the user equipment in the second network.

A fifth parameter includes security and integrity protection information of the user equipment in the second network.

It should be noted that after the UE is in an inactive state in two networks and is first connected to one network (the UE changes to an RRC-connected state), the UE still needs to retain context of the UE in the other network.

A cell that is of the first network and that is first accessed by the UE is referred to as a first cell, a cell that is selected to be accessed by the UE is referred to as a second cell, and a cell that is of the second network and that is finally selected to be accessed by the UE is referred to as a third cell. The third cell may be the second cell or may be another cell.

Parameters of the third cell may be sent to the UE by using the first cell. The parameters of the third cell may be sent by the third cell to the first cell, or may be generated by the first cell. For example, a parameter of the first cell is reused to configure the parameter of the third cell, and the first cell sends, to the UE, the parameter that has been configured in the first cell as the parameter of the third cell.

Figure 11:
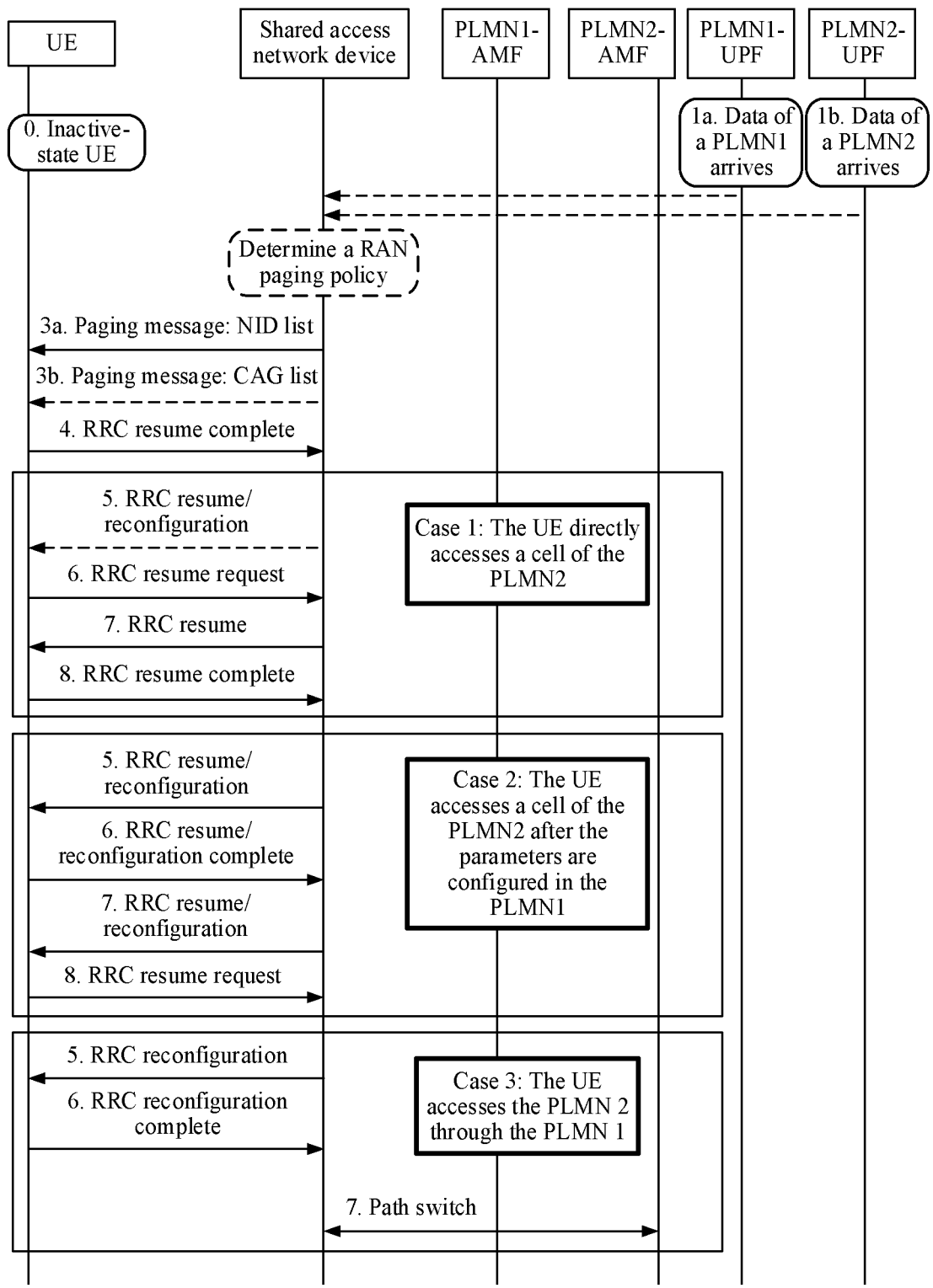
FIG. 11 is a fifth specific schematic flowchart of a paging method according to an embodiment of this application.
Figure 12A:
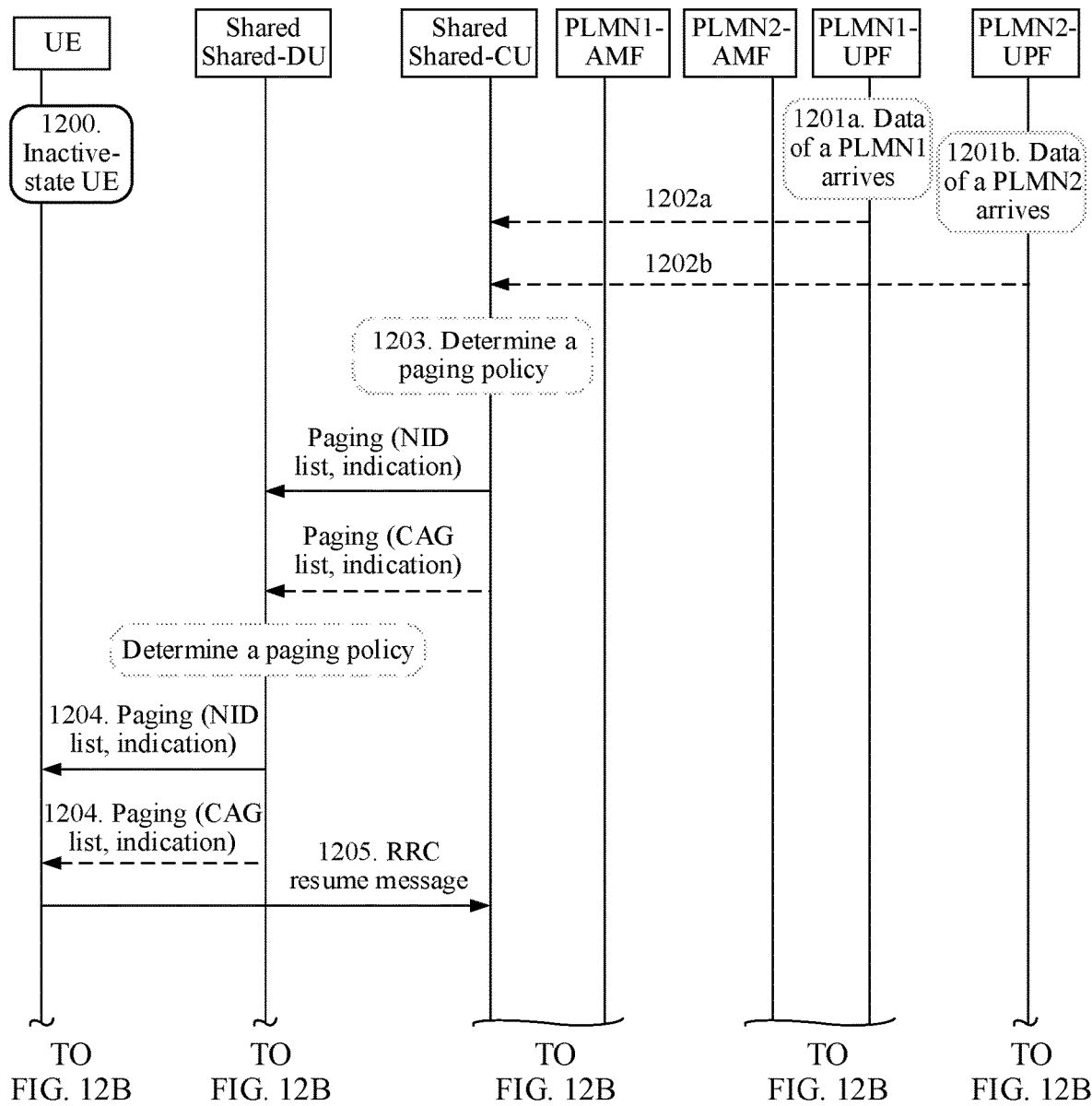
FIG. 12A, FIG. 12B, FIG. 12C, and FIG. 12D are a sixth specific schematic flowchart of a paging method according to an embodiment of this application.
Figure 12B:
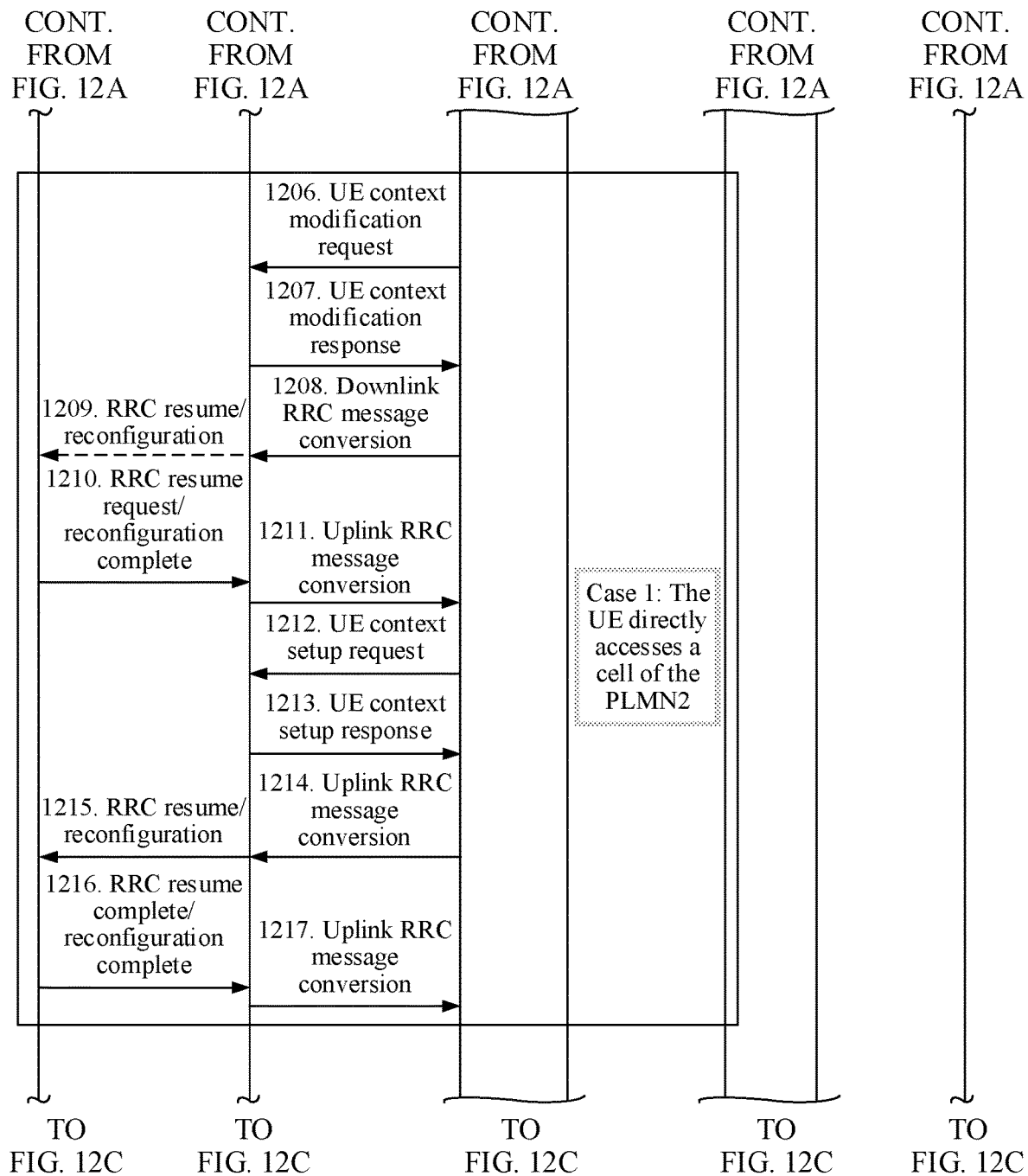
Figure 12C:
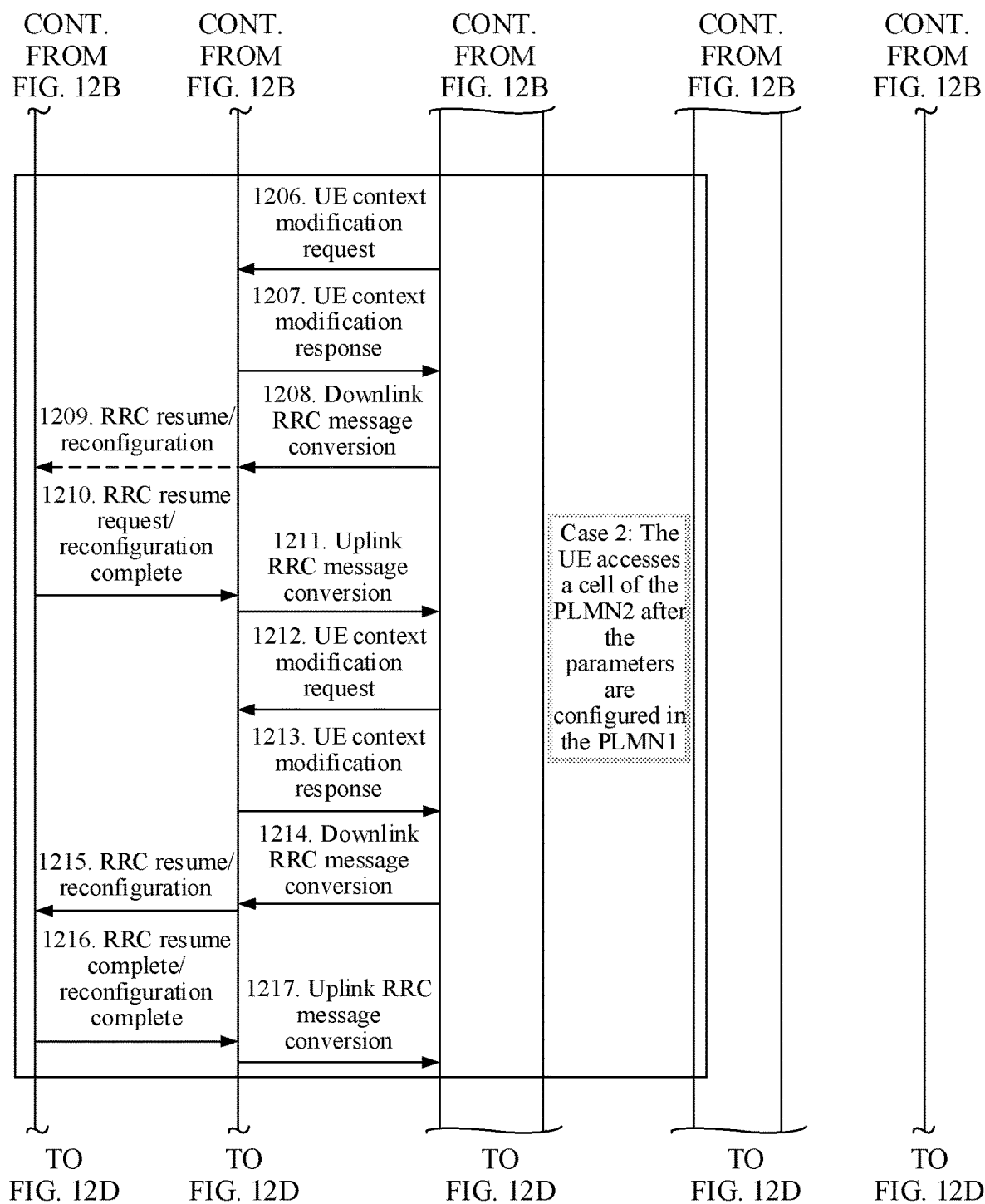
Figure 12D:
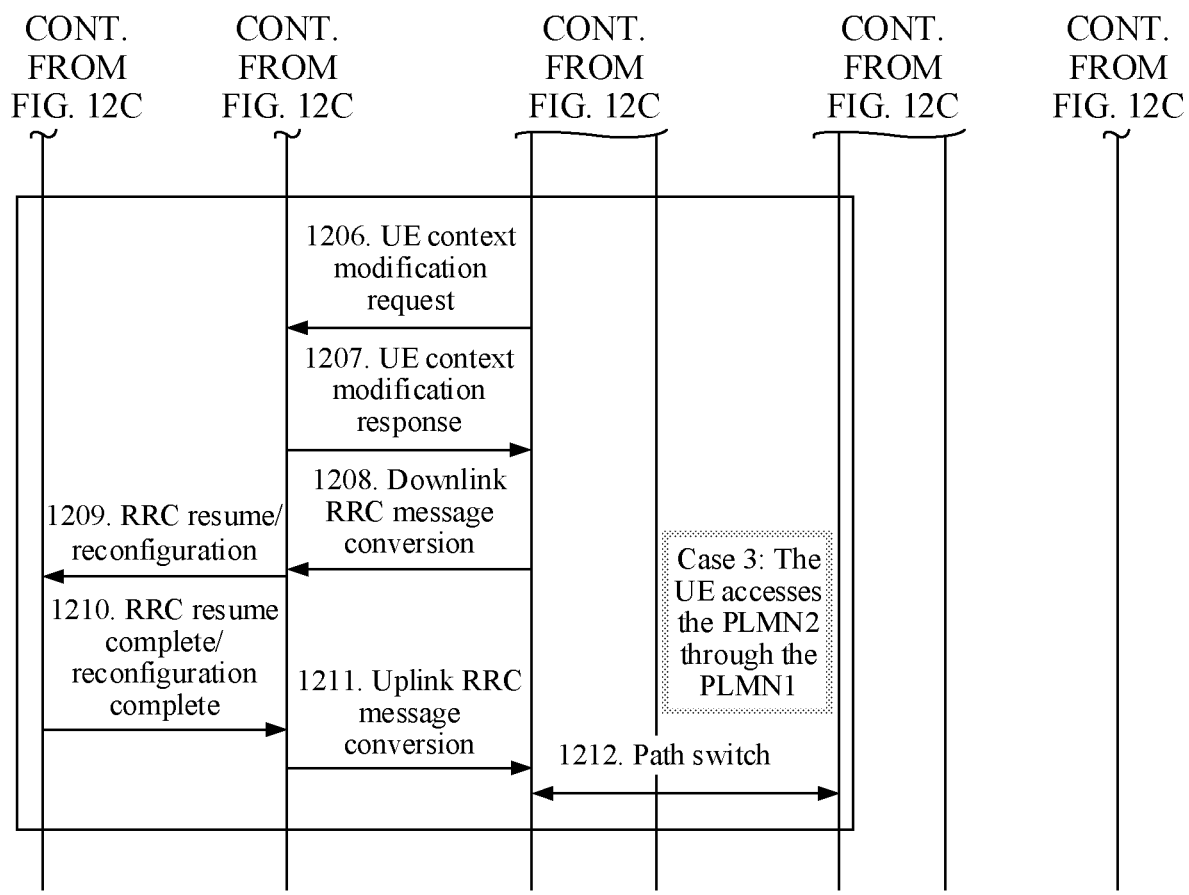

The following describes a specific process according to FIG. 11.

Step 0: UE is in an RRC-inactive state in a PLMN1 network, the UE is also in the RRC-inactive state in a PLMN2 network, and a shared-RAN is shared by the PLMN1 and the PLMN2, and is configured with a PLMN1 cell and a PLMN2 cell.

Steps 1a and 1b: Data of the PLMN2 and data of the PLMN1 arrive at a PLMN2-UPF and a PLMN1-UPF respectively.

Step 2a and step 2b: The data of the PLMN2 and the data of the PLMN1 arrive at the shared-RAN.

Step 3: The shared-RAN determines a paging policy on a RAN side. The paging policy is, for example, simultaneously paging the UE in a NID cell and a CAG cell that are served by the shared-RAN, or paging the UE only in a NID cell or a CAG cell, and if the paging fails, paging the UE in another cell. The paging policy on the RAN side may be determined by the shared-RAN, or a core network element: an AMF side or a UPF side may assist the RAN in making a decision. For example, the core network element such as the AMF or the UFP sends indication information to notify the RAN that paging can be performed only in the PLMN2 or the PLMN1 or paging can be performed in both the PLMN2 and the PLMN1, or sends paging priorities of different networks. A cell paging priority may be determined based on information such as a timer time and QoS provided by the AMF or the UPF. Paging with a short timer time or with a requirement of a short delay in QoS is first performed.

Paging policy 1: Paging is performed in both the NID cell and the CAG cell: The shared RAN simultaneously pages the UE in both the NID cell and the CAG cell, and it is assumed that the UE receives paging from the CAG cell.

Paging policy 2: The UE is paged only in either the NID network cell or the CAG network cell (taking paging from the CAG cell as an example): It is assumed that the UE receives the paging from the CAG cell. A paging message carries only a network identifier of a network (for example, for the PLMN1, the network identifier includes a PLMN ID and a CAG ID), or a UE identifier (for example, an I-RNTI 1) of the UE in a network.

Paging policy 3: The UE is paged only in either the NID network cell or the CAG network cell (taking paging from the CAG cell as an example): It is assumed that the UE receives the paging from the CAG cell. However, different from that in the policy 2, the paging in the policy 3 carries network identifiers (PLMN IDs, NIDs, CAG IDs) of two networks or identifiers (for example, I-RNTIs 1 and I-RNTIs 2) of the UE in the two networks.

Paging policy 4: Paging is performed in cells of both networks, and information carried in a paging message is the same as that in the paging policy 3.

Optionally, the paging message may further carry a UE identifier (for example, a UE identifier such as an I-RNTI), carry a cause cause for sending the message (for example, carry a PLMN2 character, indicating paging initiated for a PLMN2 service), and carry a cell identity list Cell ID List of cells of a network that can be accessed by the UE, and a PLMN ID list, a tracking area code (tracking area code, TAC), a RAN Node ID, a NID List, a CAG ID list, a radio network area code (RAN area code, RANAC), or timer information corresponding to each cell. The timer information indicates that the UE needs to access an optional cell within a specific time. Optionally, parameters such as the first, second, fourth, and fifth parameters that are required for accessing each cell may be further carried.

It should be noted that, in step 3, after data arrives at the shared-RAN, because the user equipment has different identities in the first network and the second network, the shared-RAN may not be aware that the data from two core network UPFs is data of a same user, because a first identifier of the UE may be different from a second identifier of the user equipment. The first identifier of the user equipment is used to indicate an identifier of the user equipment in the first network, and the second identifier of the user equipment is used to indicate an identifier of the user equipment in the second network. However, in this embodiment, the shared access network device may determine, based on the first identifier of the user equipment and the second identifier of the user equipment, that both the first identifier and the second identifier identify the same user equipment. For example, before entering the inactive state, the UE sends the first identifier of the UE and the second identifier of the UE to the shared access network device. Optionally, the first identifier of the UE may be a first 5G 5-temporary mobile subscriber identity (5G S-temporary mobile subscriber identity, 5G-S-TMSI) of the UE in the first network, a first inactive radio network temporary identifier (inactive radio network temporary identity, I-RNTI), a first globally unique temporary identity (globally unique temporary identity, GUTI), a first subscription concealed identifier (subscription concealed identifier, SUCI), a first temporary mobile subscriber identity (temporary mobile subscriber identity, TMSI), or the like. Similarly, the second identifier of the user equipment may be a second 5G-S-TMSI, a second I-RNTI, a second GUTI, a second SUCI, a second TMSI, or the like of the user equipment in the second network. "First" and "second" are merely identifiers of the user equipment in different networks, and do not constitute any limitation on the protection scope of this application. For example, when the UE is in a cell of the first network, the UE reports the first identifier and the second identifier to the shared-RAN by using the cell of the first network, and the shared-RAN may learn that the two identifiers point to the same UE.

Step 4: The UE responds to the paging from PLMN1 and accesses the CAG cell from the shared-RAN.

That is, after an information interaction process such as sending an RRC resume request, RRC resume, and RRCResumeComplete, an identifier Cell ID of the cell (that is, the first cell) selected to be accessed or network identification information (a PLMN ID, a CAG ID, or a human readable network name corresponding to a CAG) is added to the RRCResumeComplete signaling and reported to the shared-RAN. (For the PLMN2, the network identifier is a PLMN ID, a NID, or a human readable network name corresponding to the NID).

Then, the shared-RAN helps the PLMN2 network continue to perform paging by using an established SRB of the PLMN1 network and by using an RRC message, and resumes or preconfigures the first, second, third, fourth, and fifth parameters for the UE.

Case 1: The first cell notifies the UE that the second network is paging the UE, and the UE directly sends RRC Resume request information to a third cell of the second network, to resume to the connected state.

Step 5: The shared-RAN sends an RRC Resume message (which may also be an RRCReconfiguration message, a paging message in the first cell (the UE in the connected state may further receive paging information from a cell in which the UE is located, that is, the UE accessed the first cell may further receive paging information from the first cell), or the like) to the UE. The RRC Resume message herein may be an RRC Resume message retransmitted after step 4, or may be the RRC Resume message in step 4. Optionally, the message carries a UE identifier (for example, a UE identifier such as an I-RNTI), carries a cause cause for sending the message (for example, carries a PLMN2 character, indicating paging initiated for a PLMN2 service), and carries a cell identity list Cell ID List of cells (that is, the second cell) of the PLMN2 network that can be accessed by the UE, and a PLMN ID list, a tracking area code (tracking area code, TAC), a RAN Node ID, a NID List, a radio network area code (RAN area code, RANAC), or timer information corresponding to each cell. The timer information indicates that the UE needs to access an optional cell within a specific time. Optionally, parameters such as the first, second, fourth, and fifth parameters that are required for accessing each cell may be further carried. (If the paging policy 3 is used, step 5 is not required.)

Step 6: After receiving the message in step 5, the UE sends RRC Resume request information to the third cell based on the carried information, to access the third cell of the second network.

That is, the information exchange process such as sending the RRC resume request, RRC resume, and RRCResume-Complete is performed. Identification information (a CGI, a PCI, or a cell identity) of a cell (that is, the third cell) selected to be accessed, or network identification information (where the network identification information includes: a PLMN ID, a NID (for the PLMN1: a PLMN ID, and a CAG ID), a human readable network name corresponding to the NID, or another unified NID (common NID, C-NID)) is reported to the third cell by using RRCResumeComplete signaling. The third cell may be a cell in the second cell list in step 5, or may be another cell of the second network that the UE decides to access. Next, the third cell resumes or reconfigures the related parameter of the UE according to a conventional procedure.

It should be noted that, different from a conventional resume process, if first parameter information of the third cell is carried in step 5, the UE may perform non-contention based access to the third cell based on the first parameter, and initiate the resume process, thereby increasing a success probability of RRC resume.

Case 2: The first cell notifies the UE that the second network is paging the UE, and the UE directly sends RRC Resume request information to the first cell, where the message carries information about the third cell of the second network that the UE selects to access. The UE accesses the third cell and resumes to the connected state, after the first cell assists the third cell in configuring the related parameters.

Step 5: The shared-RAN sends an RRC Resume message to the UE. The UE receives the RRC Resume message from the shared RAN.

The RRC Resume message may be an RRCReconfiguration message or a paging message in the first cell. The UE in the connected state may further receive paging information from a cell in which the UE is located, that is, the UE accessing the first cell may further receive paging information from the first cell.

The RRC resume message herein may be RRC resume sent again after step 4, or may be the RRC resume in step 4. Optionally, the message carries a UE identifier (for example, an I-RNTI), carries a cause cause for sending the message, where a cause value is a character such as PLMN2, PLMN1, or non-3GPP, indicating a message sent for a PLMN2 network service, a PLMN1 network service, or a non-3GPP network service, and carries a cell identity list Cell ID List of cells (that is, the second cell) of the PLMN2 network that can be accessed by the UE, and a PLMN ID list, a tracking area code (tracking area code, TAC), a RAN Node ID, a NID List, a radio network area code (RAN area code, RANAC), or timer information corresponding to each cell. The timer information indicates that the UE needs to access an optional cell within a specific time. Optionally, parameters such as the first, second, fourth, and fifth parameters that are required for accessing each cell may be further carried. (If the paging policy 3 is used, step 5 is not required.)

Step 6: After receiving the message in step 5, the UE sends the RRC resume request information to the first cell based on the carried information.

The RRC resume request message is sent or an RRC reconfiguration complete message is sent.

The first cell is notified of information about the third cell selected to be accessed. The information about the third cell includes identification information (for example, a CGI, a PCI, or a cell identity) of the third cell, network identification information (a PLMN ID, a NID, or a human readable network name corresponding to the NID), or UE identification information of the UE in the second network. Note: Step 6 may also be performed synchronously with step 4, or the signaling in step 4 may be reused, for example, when the paging policy 3 is used.

Step 7: The first cell sends a message, for example, an RRC Resume/RRC Reconfiguration message, to the UE, and the first cell sends the first, second, fourth, and fifth parameters of the third cell to the UE.

The RRC Resume/RRC Reconfiguration message includes at least one of the following: the identification information of the third cell, the identification information of the second network, the cause value, and first, second, fourth, and fifth parameter values. A parameter of the third cell may be sent by the third cell to the first cell, or may be generated by the first cell (for example, a parameter of the first cell is reused to configure the parameter of the third cell, and the first cell sends, to the UE, the parameter that has been configured in the first cell as the parameter of the third cell). The cause value is used to indicate that the first cell assists the third cell in transmitting a related configuration parameter. For example, the cause value is Assistant, or the cause value is a character such as PLMN2, PLMN1, or non-3GPP, indicating a message sent for a PLMN2 network service, a PLMN1 network service, or a non-3GPP network service.

Step 8: After receiving the configuration parameters in step 7, the UE accesses the third cell.

For example, the UE sends an RRC Resume Request message to the third cell, or performs the non-contention based random access process, and directly receives and sends data after performing the first two steps of the random access process.

Case 3: The first network configures resources such as an SRB and a DRB in a local network (for example, the first cell), to assist the second network in transmitting data.

Step 5: The first cell sends a message, for example, RRC Reconfiguration, to the UE, where the message is used to configure a third parameter.

The RRC Reconfiguration message carries at least one of the following: the third parameter, identification information of the third cell, the identification information of the second network, identification information of a fourth cell (where the fourth cell is a cell of the first network, and may be the first cell), identification information of first network, and a cause value. The identification information of the second network, the identification information of the fourth cell, or the identification information of the first network is used to notify the UE that the fourth cell of the first network assists the second network in transmitting data, or is used to notify the UE that the fourth cell of the first network assists the third cell of the second network in transmitting data. The cause value may be Assistant, indicating a message sent due to assistance in transmission, or the cause value is a character such as PLMN2, PLMN1, or non-3GPP, indicating a message sent for a PLMN2 network service, a PLMN1 network service, or a non-3GPP network service.

Step 6: The UE sends a configuration complete message (RRC Reconfiguration Complete) to the first cell.

Step 7: The shared-RAN sends a path switch request (Path Switch request) message to a PLMN-AMF.

The path switch request message carries a cause value. The cause value may be assistant, indicating a path change of data transmission due to assistance in transmission. The following parameters may be further carried: identification information of the first cell, and the identification information of the first network (a PLMN ID, a CAG ID, and a NID). In addition, a message fed back by the AMF to the shared-RAN (Path Switch request Acknowledge) may also carry the cause, the identification information of the first cell, and the identification information of the first network (the PLMN ID, the CAG ID, and the NID).

It should be noted that there is a hybrid scenario in this embodiment. For example, the UE is in the RRC-inactive state of a network, and is in the RRC-connected state of another network; or the UE is in an RRC-inactive state of a network, and is in an RRC-idle state of another network.

When the shared access network has a CU-DU split architecture, it is assumed that the shared access network device belongs to the first network and the second network. A CU in the shared access network device is denoted as a shared-CU, and a DU in the shared access network device is denoted as a shared-DU. The shared access network device is configured with a cell of a first network and a cell of a second network, and the UE is in the RRC-inactive state in both the first network and the second network. It is assumed that the first network is represented by PLMN1, and the second network is represented by PLMN2. A combination of the PLMN1 and the PLMN2 may be: INPN and PLMN2, PLMN2 and PLMN, and INPN and PLMN. The INPN and the PLMN may share an AMF and a UPF. A PLMN1-AMF and a PLMN2-AMF may be same AMFs.

With reference to the embodiments shown in FIG. 10 and FIG. 11, as shown in FIG. 12A, FIG. 12B, FIG. 12C, and FIG. 12D, a paging method in this scenario is described in detail.

Step 1200: UE is in an RRC-inactive state in a PLMN1 network, the UE is also in the RRC-inactive state in a PLMN2 network, a shared-CU and a shared-DU are shared by the PLMN1 and the PLMN2, and the shared-DU is configured with a PLMN1 cell and a PLMN2 cell.

Steps 1201a and 1201b: Data of the PLMN2 and data of the PLMN1 arrive at a PLMN2-UPF and a PLMN1-UPF respectively.

Steps 1202a and 1202b: The data of the PLMN2 and the data of the PLMN1 arrive at the shared-CU.

Step 1203: The shared-CU determines a paging policy on a RAN side.

The paging policy is simultaneously paging the UE in a NID cell and a CAG cell that are served by the shared-CU, or paging the UE only in a NID cell or a CAG cell, and if the paging fails, paging the UE in another cell. The paging policy on the RAN side may be determined by the shared-CU, or a core network element: an AMF side or a UPF side may assist the RAN in making a decision. For example, the core network element such as the AMF or the UFP sends indication information to notify the RAN that paging can be performed only in the PLMN2 or the PLMN1 or paging can be performed in both the PLMN2 and the PLMN1, or sends paging priorities of different networks. A cell paging priority may be determined based on information such as a timer time and QoS provided by the AMF or the UPF. Paging with a short timer time or with a requirement of a short delay in QoS is first performed.

Paging policy 1: Paging is performed in both the NID cell and the CAG cell: The shared-CU instructs, through an F1 interface, the shared-DU to page the UE in both the NID cell and the CAG cell, and it is assumed that the UE receives paging from the CAG cell. Two paging messages sent by the shared-CU to the shared-DU through the F1 interface each carry corresponding UE identifiers (for example, one paging message carries a UE identifier such as a 5G-S-TMSI 1, an I-RNTI 1, or a GUTI 1, and the other paging message carries a UE identifier such as a 5G-S-TMSI 2, an I-RNTI 2, or a GUTI 2), and each carry network identifiers of the first network and the second network.

Paging policy 2: The UE is paged only in either the NID network cell or the CAG network cell (taking paging from the CAG cell as an example): It is assumed that the UE receives the paging from the CAG cell. A paging message carries only a network identifier of a network (for example, for the PLMN1, the network identifier includes a PLMN ID and a CAG ID), or a UE identifier (for example, a 5G-S-TMSI, an I-RNTI, or a GUTI) of the UE in a network.

Paging policy 3: The UE is paged only in either the NID network cell or the CAG network cell (taking paging from the CAG cell as an example): It is assumed that the UE receives the paging from the CAG cell. However, different from that in the policy 2, the paging in the policy 3 carries network identifiers (PLMN IDs, NIDs, CAG IDs) of two networks or identifiers (for example, 5G-S-TMSIs, I-RNTIs, and GUTIs) of the UE in the two networks.

Paging policy 4: A difference between the paging policy 4 and the paging policy 3 is that: paging is performed in cells of both networks, and information carried in a paging message is the same as that in the paging policy 3.

Optionally, the paging message may further carry the UE identifier (for example, the 5G-S-TMSI, the I-RNTI, or the GUTI). The paging message may further carry a cause cause for sending the message (for example, a cause value is a character such as PLMN2, PLMN1, or non-3GPP, indicating a message sent for a PLMN2 network service, a PLMN1 network service, or a non-3GPP network service. The paging message may further carry a cell identity list Cell ID List of cells of a network that can be accessed by the UE, and a PLMN ID list, a tracking area code (tracking area code, TAC), a RAN Node ID, a NID List, a CAG ID list, a radio network area code (RAN area code, RANAC), or timer information corresponding to each cell. The timer information indicates that the UE needs to access an optional cell within a specific time.

Optionally, the paging message may further carry parameters such as first, second, fourth, and fifth parameters that are required for accessing each cell. In addition, the carried cell identity list Cell ID List, and the PLMN ID List, the tracking area code (tracking area code, TAC), the RAN Node ID, the NID List, the CAG ID List, and the radio network area code (RAN area code, RANAC) corresponding to each cell may further be used to notify a PNI-RAN to page the UE only in the corresponding NID or CAG cell, instead of paging the UE in other cells. In addition, an F1 interface paging message may also carry indication information, to indicate whether to page the UE only in a cell of an NPN network or only in a cell of a PLMN network. For example, an indication may be only CAG, only NID, only PLMN, or the like, respectively indicating to page the UE only in the CAG cell, the NID cell, or the PLMN cell. It should be understood that the foregoing information is not only applicable to paging through an Xn interface, but also applicable to paging through an NG interface and the F1 interface. The foregoing information is not only applicable to paging for the UE in an inactive state, but also applicable to paging for the UE in an idle state. The indication may alternatively be an implicit expression method. For example, only CAG allowed is used to indicate that the UE is allowed to access a 5GS only by using the CAG cell, and implicitly indicate to page the UE only in the CAG cell.

The shared-CU sends, to the shared-DU based on the foregoing paging policies, the information that needs to be carried in the corresponding F1 interface paging message. It should be understood that UE identifiers carried in paging 1 and paging 2 may be different, and the shared-DU may fail to identify, based on different UE identifiers from different paging, that the shared-DU is paging the same UE.

Step 1204: The shared-DU pages the UE in the NID cell and the CAG cell based on the information in step 1203: The shared-DU pages the UE in the NID cell and the CAG cell, or pages the UE in only one type of cell.

Step 1205: The UE responds to the paging from the PLMN1 and accesses the CAG cell.

That is, after an information interaction process such as sending an RRC resume request, RRC resume, and RRCResumeComplete, an identifier Cell ID of the cell (that is, the first cell) selected to be accessed or network identification information (a PLMN ID, a CAG ID, or a human readable network name corresponding to a CAG) is added to the RRCResumeComplete signaling and reported to the shared-DU and the shared-CU.

When the PLMN2 is an SNPN, the network identifier is a PLMN ID, a NID, or a human readable network name corresponding to the NID.

Then, the shared-CU and the shared-DU help the PLMN2 network continue to perform paging by using an established SRB of the PLMN1 network and by using an RRC message, and resumes or preconfigures the first, second, third, fourth, and fifth parameters for the UE.

Case 1: The first cell notifies the UE that the second network is paging the UE, and the UE directly sends RRC Resume request information to a third cell of the second network, to resume to the connected state.

Step 1206: The CU sends a message (a UE context modification request, or a paging message) to the DU.

The message includes at least one of the following: carrying a UE identifier, for example, a UE F1AP ID and an I-RNTI.

The message may further carry a cause cause for sending the message, where a cause value is a character such as PLMN, PLMN2, PLMN1, or non-3GPP, indicating a message sent for a PLMN network service, a PLMN2 network service, a PLMN1 network service, or a non-3GPP network service, and carries a cell identity list Cell ID List of cells (that is, the second cell) of the PLMN2 network that can be accessed by the UE, and a PLMN ID list, a tracking area code (tracking area code, TAC), a RAN Node ID, a NID List, a radio network area code (RAN area code, RANAC), or timer information corresponding to each cell. The timer information indicates that the UE needs to access an optional cell within a specific time. Optionally, parameters such as the first, second, fourth, and fifth parameters that are required for accessing each cell may be further carried.

Step 1207: After receiving the message, the DU may configure a local parameter based on the parameters such as the first, second, fourth, and fifth parameters, and the DU sends a response message, namely, a UE context modification response, to the CU, where the message may carry the foregoing information and parameters.

Step 1208: The CU sends a message (DL RRC Message Transfer) to the DU, where the message includes the foregoing information.

Step 1209: After receiving the message, the DU sends a message (RRC Resume or RRC Reconfiguration) to the UE in the first cell of the first network.

The message includes at least one of the following: carrying a UE identifier (for example, a UE F1AP ID and an I-RNTI), carrying a cause cause for sending the message, where a cause value is a character such as PLMN, PLMN2, PLMN1, or non-3GPP, indicating a message sent for a PLMN network service, a PLMN2 network service, a PLMN1 network service, or a non-3GPP network service, and carrying a cell identity list Cell ID List of cells (that is, the second cell) of the PLMN2 network that can be accessed by the UE, and a PLMN ID list, a tracking area code (tracking area code, TAC), a RAN Node ID, a NID List, a radio network area code (RAN area code, RANAC), or timer information corresponding to each cell. The timer information indicates that the UE needs to access an optional cell within a specific time. Optionally, parameters such as the first, second, fourth, and fifth parameters that are required for accessing each cell may be further carried.

Step 1210: The UE sends a request message (RRC Resume request, or RRC Reconfiguration Complete) to the third cell of the second network. The message includes at least one of the following: identification information (a CGI, a PCI, or a cell identity) of a cell (that is, the third cell) selected to be accessed, or network identification information (where the network identification information includes: a PLMN ID, a NID (for the PLMN1: a PLMN ID, and a CAG ID), a human readable network name corresponding to the NID, or another unified NID (common NID, C-NID)), which is reported to the third cell. The third cell may be a cell in the second cell list in step 1209, or may be another cell of the second network that the UE decides to access.

Step 1211: The DU sends a message (UL RRC Message Transfer) to the CU, and forwards the information in step 1210. Optionally, the message may include identification information of the third cell, identification information of the second network, and identification information of the UE.

Step 1212: The CU sends a message (a UE context setup request, or a paging message) to the DU, to configure a parameter of the third cell.

The message includes at least one of the following: the identification information of the third cell (the identification information Cell ID of the third cell, and a tracking area code (tracking area code, TAC), a RAN node ID, and a radio network area code (RAN area code, RANAC) that correspond to the cell), the identification information of the second network, the cause information, the timer, and the first, second, fourth, and fifth parameters.

Optionally, if the first, second, fourth, and fifth parameters are already included in steps 1206, 1207, 1208, and 1209, this step is not required.

Step 1213: After receiving the message, the DU may configure a local parameter based on the parameters such as the first, second, fourth, and fifth parameters, and the DU sends a response message (UE context setup response) to the CU, where the message may carry the foregoing information and parameters.

Optionally, if the first, second, fourth, and fifth parameters are already included in steps 1206, 1207, 1208, and 1209, this step is not required.

Step 1214: The CU sends a message (DL RRC Message Transfer) to the DU, where the message includes the foregoing information.

Optionally, if the first, second, fourth, and fifth parameters are already included in steps 1206, 1207, 1208, and 1209, this step is not required.

Step 1215: After receiving the message, the DU sends a message (RRC Resume or RRC Reconfiguration) to the UE.

The message includes at least one of the following: the identification information of the third cell (the identification information Cell ID of the third cell, and a tracking area code (tracking area code, TAC), a RAN node ID, and a radio network area code (RAN area code, RANAC) that correspond to the cell), the identification information of the second network, the cause information, the timer, and the first, second, fourth, and fifth parameters.

Optionally, if the first, second, fourth, and fifth parameters are already included in steps 1206, 1207, 1208, and 1209, this step is not required.

Step 1216: The UE sends a request message (RRC Resume complete, or RRC Reconfiguration Complete) to the third cell of the second network.

The message includes at least one of the following: identification information (a CGI, a PCI, or a cell identity) of a cell (that is, the third cell) selected to be accessed, or network identification information (where the network identification information includes: a PLMN ID, a NID (for the PLMN1: a PLMN ID, and a CAG ID), a human readable network name corresponding to the NID, or another unified NID (common NID, C-NID)), which is reported to the third cell.

Optionally, if the first, second, fourth, and fifth parameters are already included in steps 1206, 1207, 1208, and 1209, this step is not required.

Step 1217: The DU sends a message (UL RRC Message Transfer) to the CU, and forwards the information in step

1216. Optionally, the message may include identification information of the third cell, identification information of the second network, and identification information of the UE.

Optionally, if the first, second, fourth, and fifth parameters are already included in steps 1206, 1207, 1208, and 1209, this step is not required.

Case 2: The first cell notifies the UE that the second network is paging the UE, and the UE directly sends RRC Resume request information to the first cell, where the message carries information about the third cell of the second network that the UE selects to access. The UE accesses the third cell and resumes to the connected state, after the first cell assists the third cell in configuring the related parameters.

Step 1206: The CU sends a message (a UE context modification request, or a paging message) to the DU.

The message includes at least one of the following: carrying a UE identifier (for example, a UE F1AP ID and an I-RNTI), carrying a cause cause for sending the message, where a cause value is a character such as PLMN, PLMN2, PLMN1, or non-3GPP, indicating a message sent for a PLMN network service, a PLMN2 network service, a PLMN1 network service, or a non-3GPP network service, and carrying a cell identity list Cell ID List of cells (that is, the second cell) of the PLMN2 network that can be accessed by the UE, and a PLMN ID list, a tracking area code (tracking area code, TAC), a RAN Node ID, a NID List, a radio network area code (RAN area code, RANAC), or timer information corresponding to each cell. The timer information indicates that the UE needs to access an optional cell within a specific time. Optionally, parameters such as the first, second, fourth, and fifth parameters that are required for accessing each cell may be further carried.

Step 1207: After receiving the message, the DU may configure a local parameter based on the parameters such as the first, second, fourth, and fifth parameters, and the DU sends a response message (UE context modification response) to the CU, where the message may carry the foregoing information and parameters.

Step 1208: The CU sends a message (DL RRC Message Transfer) to the DU, where the message includes the foregoing information.

Step 1209: After receiving the message, the DU sends a message (RRC Resume or RRC Reconfiguration) to the UE in the first cell of the first network.

The message includes at least one of the following: carrying a UE identifier (for example, a UE F1AP ID and an I-RNTI), carrying a cause cause for sending the message, where a cause value is a character such as PLMN, PLMN2, PLMN1, or non-3GPP, indicating a message sent for a PLMN network service, a PLMN2 network service, a PLMN1 network service, or a non-3GPP network service, and carrying a cell identity list Cell ID List of cells (that is, the second cell) of the PLMN2 network that can be accessed by the UE, and a PLMN ID list, a tracking area code (tracking area code, TAC), a RAN Node ID, a NID List, a radio network area code (RAN area code, RANAC), or timer information corresponding to each cell. The timer information indicates that the UE needs to access an optional cell within a specific time. Optionally, parameters such as the first, second, fourth, and fifth parameters that are required for accessing each cell may be further carried.

Step 1210: The UE sends a request message (RRC Resume request, or RRC Reconfiguration Complete) to the first cell of the first network.

The message includes at least one of the following: identification information (a CGI, a PCI, or a cell identity) of a cell (that is, the third cell) selected to be accessed, or network identification information (where the network identification information includes: a PLMN ID, a NID (for the PLMN1: a PLMN ID, and a CAG ID), a human readable network name corresponding to the NID, or another unified NID (common NID, C-NID)), which is reported to the third cell. The third cell may be a cell in the second cell list in step 1209, or may be another cell of the second network that the UE decides to access.

Step 1211: The DU sends a message (UL RRC Message Transfer) to the CU, and forwards the information in step 1210. Optionally, the message may include identification information of the third cell, identification information of the second network, and identification information of the UE.

Step 1212: The CU sends a message (UE context modification request, or a paging message) to the DU, to configure a parameter of the third cell. The message includes at least one of the following: the identification information of the third cell (the identification information Cell ID of the third cell, and a tracking area code (tracking area code, TAC), a RAN node ID, and a radio network area code (RAN area code, RANAC) that correspond to the cell), the identification information of the second network, the cause information, the timer, and the first, second, fourth, and fifth parameters. (Optionally) If the first, second, fourth, and fifth parameters are already included in steps 1206, 1207, 1208, and 1209, this step is not required.

Step 1213: After receiving the message, the DU may configure a local parameter based on the parameters such as the first, second, fourth, and fifth parameters, and the DU sends a response message (UE context modification response) to the CU, where the message may carry the foregoing information and parameters.

Optionally, if the first, second, fourth, and fifth parameters are already included in steps 1206, 1207, 1208, and 1209, this step is not required.

Step 1214: The CU sends a message (DL RRC Message Transfer) to the DU, where the message includes the foregoing information.

Optionally, if the first, second, fourth, and fifth parameters are already included in steps 1206, 1207, 1208, and 1209, this step is not required.

Step 1215: After receiving the message, the DU sends a message (RRC Resume or RRC Reconfiguration) to the UE in the first cell of the first network.

The message includes at least one of the following: the identification information of the third cell (the identification information Cell ID of the third cell, and a tracking area code (tracking area code, TAC), a RAN node ID, and a radio network area code (RAN area code, RANAC) that correspond to the cell), the identification information of the second network, the cause information, the timer, and the first, second, fourth, and fifth parameters.

Optionally, if the first, second, fourth, and fifth parameters are already included in steps 1206, 1207, 1208, and 1209, this step is not required.

Step 1216: The UE sends a request message (RRC Resume complete, or RRC Reconfiguration Complete) to the third cell of the second network, to access the third cell.

The message includes at least one of the following: identification information (a CGI, a PCI, or a cell identity) of a cell (that is, the third cell) selected to be accessed, or network identification information (where the network identification information includes: a PLMN ID, a NID (for the PLMN1: a PLMN ID, and a CAG ID), a human readable network name corresponding to the NID, or another unified NID (common NID, C-NID)), which is reported to the third cell.

Optionally, if the first, second, fourth, and fifth parameters are already included in steps 1206, 1207, 1208, and 1209, this step is not required.

Step 1217: The DU sends a message (UL RRC Message Transfer) to the CU, and forwards the information in step 1216.

Optionally, the message may include identification information of the third cell, identification information of the second network, and identification information of the UE.

Optionally, if the first, second, fourth, and fifth parameters are already included in steps 1206, 1207, 1208, and 1209, this step is not required.

Case 3: The first network configures resources such as an SRB and a DRB in a local network (for example, the first cell), to assist the second network in transmitting data.

Step 1206: The CU sends a message (UE context modification request, or a paging message) to the DU, to configure a new parameter of the first cell.

The message includes at least one of the following: the identification information of the first cell (the identification information Cell ID of the first cell, and a tracking area code (tracking area code, TAC), a RAN node ID, and a radio network area code (RAN area code, RANAC) that correspond to the cell), the identification information of the first network, the cause information, the timer, and the first, second, fourth, and fifth parameters.

Step 1207: After receiving the message, the DU may configure a local parameter based on the parameters such as the first, second, fourth, and fifth parameters, and the DU sends a response message (UE context modification response) to the CU, where the message may carry the foregoing information and parameters.

Step 1208: The CU sends a message (DL RRC Message Transfer) to the DU, where the message includes the foregoing information.

Step 1209: After receiving the message, the DU sends a message (RRC Resume or RRC Reconfiguration) to the UE in the first cell of the first network.

The message includes at least one of the following: the identification information of the first cell (the identification information Cell ID of the first cell, and a tracking area code (tracking area code, TAC), a RAN node ID, and a radio network area code (RAN area code, RANAC) that correspond to the cell), the identification information of the first network, the cause information, the timer, and the first, second, fourth, and fifth parameters.

Step 1210: The UE sends a request message (RRC Resume complete, or RRC Reconfiguration Complete) to the first cell of the first network.

The message includes at least one of the following: identification information (a CGI, a PCI, or a cell identity) of a cell (that is, the first cell) selected to be accessed, or network identification information (where the network identification information includes: a PLMN ID, a NID (for the PLMN1: a PLMN ID, and a CAG ID), a human readable network name corresponding to the NID, or another unified NID (common NID, C-NID)), which is reported to the first cell.

Step 1211: The DU sends a message (UL RRC Message Transfer) to the CU, and forwards the information in step 1216. Optionally, the message may include identification information of the first cell, the identification information of the first network, and identification information of the UE.

Step 1212: The shared-CU sends a Path Switch request message to a PLMN-AMF.

The Path Switch request message may carry a cause value. The cause value may be Assistant, and indicates a path change of data transmission due to assistance in transmission. The following parameters may be further carried: identification information of the first cell, and the identification information of the first network (a PLMN ID, a CAG ID, and a NID). In addition, a message (Path Switch request Acknowledge) fed back by the AMF to the shared-CU may also carry the cause, the identification information of the first cell, and the identification information of the first network (the PLMN ID, the CAG ID, and the NID).

It should be noted that, in this embodiment, for a non-split RAN architecture, that is, when there is a PLMN1-RAN and a PLMN2-RAN, if an Xn interface exists between the PLMN1-RAN and the PLMN2-RAN, after receiving paging from the two RANs, the UE selects to respond to the paging from one RAN. After accessing a corresponding cell, the UE notifies the accessed cell of paging cell information of the other network. The RAN serving the accessed cell preconfigures a corresponding resource such as an SRB and a DRB of a cell that is not accessed by the UE (an accessed base station may need to interact with another base station through the Xn interface to obtain configuration parameters, because the cell not accessed belongs to another RAN.) For a non-split RAN architecture, that is, when there is a PLMN1-RAN and a PLMN2-RAN, if an Xn interface exists between the PLMN1-RAN and the PLMN2-RAN, and if one RAN cannot obtain a paging response all the time, the RAN may actively request assistance in paging, from a neighboring RAN through the Xn interface, and send related information of to-be-paged UE to the neighboring RAN.

Figure 13:
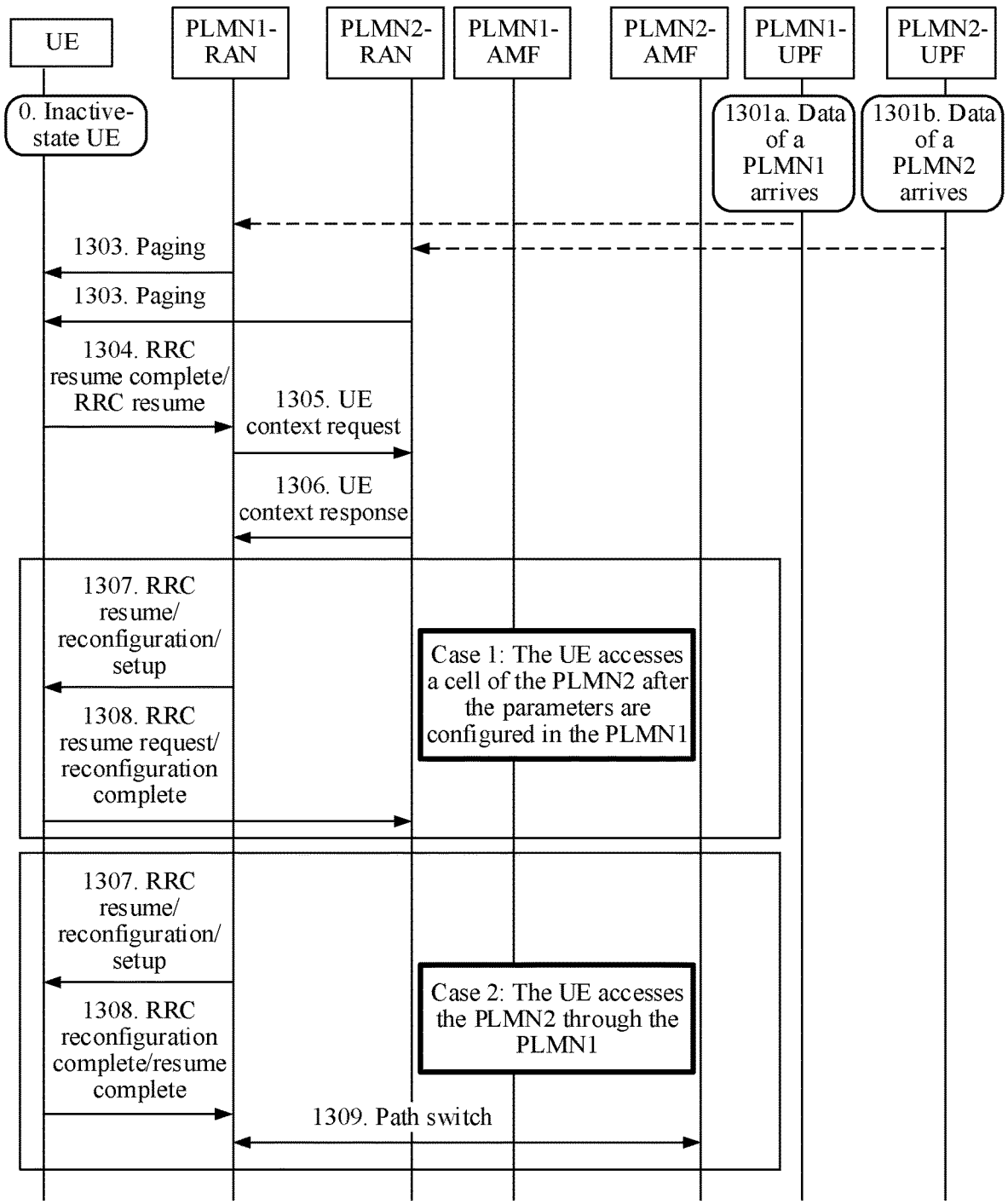
FIG. 13 is a seventh specific schematic flowchart of a paging method according to an embodiment of this application.

As shown in FIG. 13, if UE can receive paging from two networks, a paging method provided in an embodiment of this application is described as follows:

In this embodiment, it is assumed that a first network is represented by PLMN1, and a second network is represented by PLMN2. A combination of the PLMN1 and the PLMN2 may be: a PNI-NPN and an SNPN, an SNPN and a PLMN, or a PNI-NPN and a PLMN. The PNI-NPN and the PLMN may share an AMF and a UPF.

After the UE is in an inactive state in two networks and is first connected to one network (the UE changes to an RRC-connected state), the UE still needs to retain context of the UE in the other network.

The UE connected to an access network device may be the UE in a dual radio (dual radio) state, or may be the UE having a plurality of SIM cards. For the UE in the dual radio (dual radio) state, the UE may have two Uu interfaces, and a set of resources such as SRBs and DRBs may be configured at each Uu interface, that is, the UE may be configured with two sets of resources such as SRBs and DRBs. A Uu interface between the UE and a first network is a first Uu interface, and a Uu interface between the UE and a second network is a second Uu interface. The method in this application can resolve a problem how the first Uu interface assists the second Uu interface in paging the UE and assists the second Uu interface in configuring parameters related to the SRBs and the DRBs.

For the UE having a plurality of SIM cards, a user identifier of the UE in the first network may be an identifier of a first SIM card, and a user identifier of the UE in a second network may be an identifier of a second SIM card. That is, this application can resolve a problem how the second SIM card assists in paging the first SIM card and assists the first SIM card in configuring a related parameter, for example, when the first SIM card and the second SIM card in the UE share an antenna device. When the UE includes the first SIM card and the second SIM card, the first network and the second network may be a same network or different networks.

When the UE has the first SIM card and the second SIM card, different networks page different SIM cards of the UE. For example, the first network sends a first identifier to page the first SIM card of the UE, and the second network sends a second identifier to page the second SIM card of the UE. Alternatively, a same network pages different SIM cards of the UE. For example, the first network sends a first identifier and a fourth identifier to page the first SIM card and the second SIM card of the UE, or the second network sends a third identifier and a second identifier to page the first SIM card and the second SIM card of the UE. Alternatively, different networks page a same SIM card of the UE. For example, the first network sends a first identifier to page the first SIM card of the UE, and the second network sends a third identifier to page the first SIM card of the UE.

Based on the foregoing technical solution, the UE may notify an access apparatus in advance of identifiers of a same SIM card of the UE in different networks, identifiers of different SIM cards of the UE in a same network, or identifiers of different SIM cards of the UE in different networks. In this way, when receiving data from different networks or a same network, the access apparatus can determine, based on different identifiers of the UE, that the different data belongs to the same UE, so as to formulate an appropriate paging policy.

Step 1300: UE is in an RRC-inactive state in a PLMN1 network, and the UE is also in the RRC-inactive state in a PLMN2 network.

Steps 1301*a* and 1301*b*: Data of the PLMN2 and data of the PLMN1 arrive at a PLMN2-UPF and a PLMN1-UPF respectively.

Steps 1302*a* and 1302*b*: The data of the PLMN1 and the data of the PLMN arrive at a PLMN1-RAN and a PLMN-RAN respectively.

Step 1303: The PLMN1-RAN and the PLMN2-RAN separately page the UE.

Step 1304: The UE responds to the paging from the first network-RAN, accesses a first cell, and reports a network identifier (a PLMN ID, a CAG ID, a NID, and the like) of the first network to the first cell of the first network by using RRCResumeComplete signaling; and the UE sends an identifier (such as an I-RNTI) of the UE in the second network, an identifier of the second network, or a cell identity of a third cell of the second network to the first cell of the first network.

Alternatively, the UE identifier of the UE in the first network, the UE identifier of the UE in the second network, the identifier of the second network, or the cell identity of the third cell of the second network may be sent to the first cell of the first network by using RRCResumeRequest (not RRCResumeComplete) signaling. After receiving the information, the first cell may learn that the UE also responds to the paging from the second network while responding to the paging from the first network. Optionally, a cause cause for sending the message may also be carried. A cause value is a character such as PLMN, PLMN2, PLMN1, or non-3GPP, indicating a message sent for a PLMN network service, a PLMN2 network service, a PLMN1 network service, or a non-3GPP network service.

Case 1: The first cell obtains first, second, fourth, and fifth parameters from the third cell of the second network, and sends the first, second, fourth, and fifth parameters to the UE. After receiving the parameters, the UE accesses the third cell.

Step 1305: The first RAN requests to obtain the first, second, fourth, and fifth parameters (retrieve UE context request) of the UE from the second RAN.

The message includes at least one of the following: the identifier (such as the I-RNTI) of the UE in the second network, the identifier of the second network, or the cell identity of the third cell of the second network. A cause cause for sending the message may also be carried. A cause value is a character such as PLMN, PLMN2, PLMN1, or non-3GPP, indicating a message sent for a PLMN network service, a PLMN2 network service, a PLMN1 network service, or a non-3GPP network service.

Step 1306: The second RAN sends the first, second, fourth, and fifth parameters of the UE to the first RAN (retrieve UE context response). The message includes at least one of the following: the first, second, fourth, and fifth parameters, the identifier (such as the I-RNTI) of the UE in the second network, the identifier of the second network, or the cell identity of the third cell of the second network. A cause cause for sending the message may also be carried. A cause value is a character such as PLMN, PLMN2, PLMN1, or non-3GPP, indicating a message sent for a PLMN network service, a PLMN2 network service, a PLMN1 network service, or a non-3GPP network service.

Step 1307: The first RAN sends the first, second, fourth, and fifth parameters of the UE to the UE in the first cell (RRC resume, RRC Reconfiguration, or RRC Setup). The message includes at least one of the following: the first, second, fourth, and fifth parameters, the identifier (such as the I-RNTI) of the UE in the second network, the identifier of the second network, or the cell identity of the third cell of the second network. A cause cause for sending the message may also be carried. A cause value is a character such as PLMN, PLMN2, PLMN1, or non-3GPP, indicating a message sent for a PLMN network service, a PLMN2 network service, a PLMN1 network service, or a non-3GPP network service.

Step 1308: The UE accesses the third cell of the second network (where the UE may access the third cell by using an RRC Resume request, RRCReconfigurationComplete, or RRC Resume Complete; or because the parameter has been configured, the UE may directly access the third cell through a non-contention based random access process (MSG1, MSG2), and then directly send and receive data).

Case 2: The first cell obtains the first, second, fourth, and fifth parameters (optional) from the third cell of the second network, generates a third parameter with reference to the foregoing parameters, and sends the third parameter to the UE. After receiving the parameter, the UE receives a service of the second network by using the first cell.

Step 1305: (Optional) The first RAN requests to obtain the first, second, fourth, and fifth parameters of the UE from the second RAN (RETRIEVE UE CONTEXT REQUEST).

The message includes at least one of the following: the identifier (such as the I-RNTI) of the UE in the second network, the identifier of the second network, or the cell identity of the third cell of the second network. A cause cause for sending the message may also be carried. A cause value is a character such as PLMN, PLMN2, PLMN1, or non-3GPP, indicating a message sent for a PLMN network service, a PLMN2 network service, a PLMN1 network service, or a non-3GPP network service.

Step 1306: (Optional) The second RAN sends the first, second, fourth, and fifth parameters of the UE to the first RAN (RETRIEVE UE CONTEXT RESPONSE). The message includes at least one of the following: the first, second, fourth, and fifth parameters, the identifier (such as the I-RNTI) of the UE in the second network, the identifier of the second network, or the cell identity of the third cell of the second network. A cause cause for sending the message may also be carried. A cause value is a character such as PLMN, PLMN2, PLMN1, or non-3GPP, indicating a message sent for a PLMN network service, a PLMN2 network service, a PLMN1 network service, or a non-3GPP network service.

Step 1307: The first RAN sends the third parameter to the UE (RRC setup, RRC Reconfiguration, or RRC Resume), where the third parameter may be configured by the first cell, or may be configured based on the first, second, fourth, and fifth parameters in step 1305 and step 1306. The message includes at least one of the following: the third parameter, the identifier (such as the I-RNTI) of the UE in the second network, the identifier of the second network, or the cell identity of the third cell of the second network. A cause cause for sending the message may also be carried. A cause value is a character such as PLMN, PLMN2, PLMN1, or non-3GPP, indicating a message sent for a PLMN network service, a PLMN2 network service, a PLMN1 network service, or a non-3GPP network service.

Step 1308: The UE completes configuration of the third parameter, and receives data of the second network by using the first cell (where the UE may receive the data of the second network by using RRC Resume complete, or RRCReconfigurationComplete; or because the parameter has been configured, the UE may directly access the third cell through a non-contention based random access process (MSG1, MSG2), and then directly send and receive data).

Step 1309: The first network-RAN sends a Path Switch request message to an AMF of the second network, where the Path Switch request message carries a cause value, which may be Assistant and indicates a path change of data transmission due to assistance in transmission. The following parameters may be further carried: identification information of the first cell, and the identification information of the first network (a PLMN ID, a CAG ID, and a NID). In addition, a message (Path Switch request Acknowledge) fed back by the AMF to the first network-RAN may also carry the cause, the identification information of the first cell, and the identification information of the first network (the PLMN ID, the CAG ID, and the NID).

According to the method shown in FIG. 13, when the UE is in the RRC-inactive state in different networks and the different networks simultaneously page the UE, after responding to one network, the UE notifies the network of paging-related information of another network, and the network assists the another network in preconfiguring a bearer resource or transmitting user plane data. In this way, the UE does not need to contact different networks to configure bearer resources, and the RAN may perform control plane signaling offloading and user plane data offloading, thereby balancing inter-cell load.

It should be noted that examples in the application scenarios in this application merely show some possible implementations, to help better understand and describe the method in this application. A person skilled in the art may obtain examples of some evolution forms according to the reference signal indication method provided in this application.

In the foregoing embodiments provided in this application, the methods provided in the embodiments of this application are described from perspectives of the first access network device, the second access network device, the CU and the DU in the shared access network device, or the terminal, and interaction between the devices. To implement functions in the methods provided in the embodiments of this application, the foregoing devices may include a hardware structure and/or a software module, and implement the functions in a form of a hardware structure, a software module, or a combination of the hardware structure and the software module. Whether a function of the foregoing functions is performed by the hardware structure, the software module, or the combination of the hardware structure and the software module depends on specific application and a design constraint of the technical solution.

Figure 14:
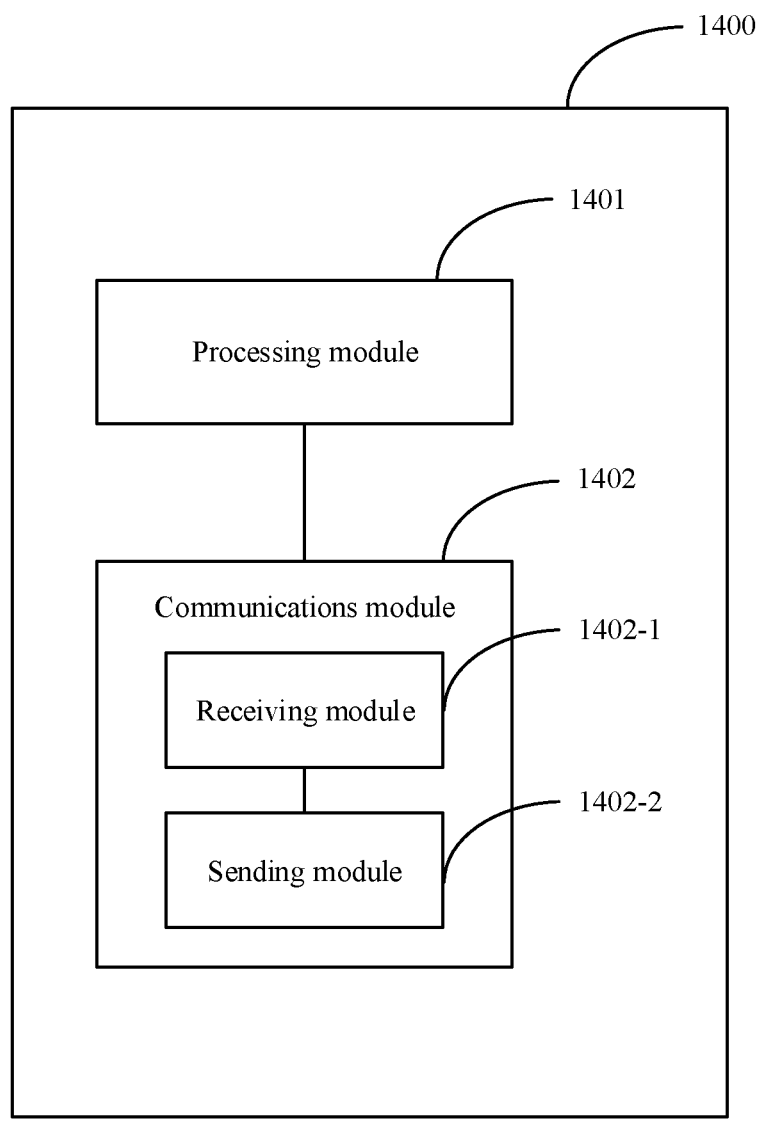
FIG. 14 is a first schematic structural diagram of an apparatus according to an embodiment of this application.

As shown in FIG. 14, based on a same technical concept, an embodiment of this application further provides an apparatus 1400. The apparatus 1400 may be a terminal, an access network device, or a CU in the access network device. The access network device includes a first access network device, a second access network device, or a shared access network device. The apparatus 1400 may alternatively be an apparatus in the terminal, in the access network device or in the CU, or an apparatus that can be used in matching with the terminal, the access network device, or the CU. In a design, the apparatus 1400 may include modules that are in a one-to-one correspondence with the methods/operations/steps/actions performed by the terminal, the access network device, or the CU in the foregoing method embodiments. The modules may be hardware circuits or software, or may be implemented by the hardware circuit in combination with the software. In a design, the apparatus 1400 may include a processing module 1401 and a communications module 1402. The processing module 1401 is configured to invoke the communications module 1402 to perform a receiving and/or sending function. The communications module 1402 includes a receiving module 1402-1 and a sending module 1402-2.

When the apparatus 700 is configured to perform the method performed by the first access network device, the receiving module 1402-1 is configured to receive downlink data of a terminal from a first core network device, where the first access network device and the first core network device belong to a first network; and the sending module 1402-2 is configured to send a first message to a second access network device, where the second access network device belongs to a second network, and the first message is used to indicate the second access network device to assist in paging the terminal.

When the apparatus 1400 is configured to perform the method performed by the CU in the shared access network device, the receiving module 1402-1 is configured to receive downlink data of a terminal from each of a first core network device and a second core network device, where the first core network device belongs to the first network, and the second core network device belongs to the second network; and the sending module 1402-2 is configured to send a first message to the DU, where the first message is used to indicate a paging policy for paging the terminal, and the paging policy includes: performing paging in a cell of the first network, performing paging in a cell of the second network, or performing paging in both a cell of the first network and a cell of the second network.

When the apparatus 1400 is configured to perform the method performed by the terminal, the processing module 1401 is configured to set up a connection to a first cell of the first network;

the receiving module 1402-1 is configured to receive the first message from the first cell, where the first message is used to indicate that downlink data of the second network arrives; or the processing module 1401 is configured to set up a connection to a first cell of a first network; and the sending module 1402-2 is configured to send the first message to the first cell, where the first message is used to indicate that downlink data of the second network arrives.

The processing module 1401, the receiving module 1402-1, and the sending module 1402-2 may be further configured to perform other corresponding steps or operations performed by the devices in the foregoing method embodiments, and details are not described herein again.

In the embodiments of this application, division into modules is an example and is merely logical function division. In actual implementation, another division manner may be used. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 15:
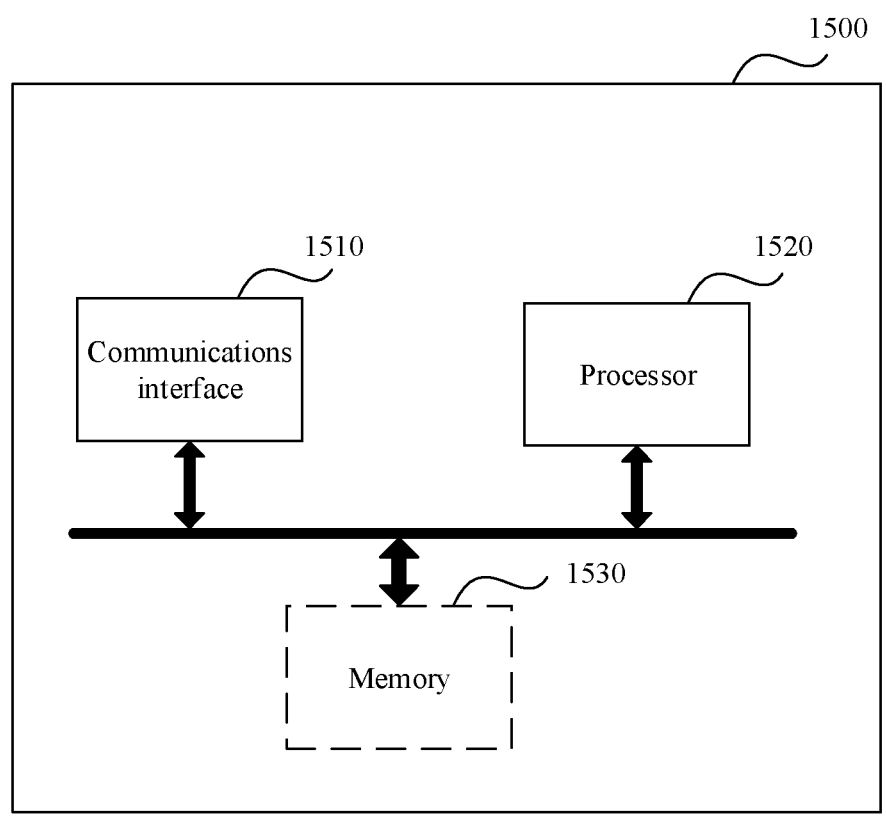
FIG. 15 is a second schematic structural diagram of an apparatus according to an embodiment of this application.

FIG. 15 shows an apparatus 1500 according to an embodiment of this application. The apparatus 1500 is configured to implement functions of the terminal device or the network device in the foregoing method. The network device includes a terminal, an access network device, or a CU in an access network device, and the access network device includes a first access network device, a second access network device, or a shared access network device. When a function of the first access network device is implemented, the apparatus may be the first access network device, an apparatus in the first access network device, or an apparatus that can be used in matching with the first access network device. When a function of the terminal is implemented, the apparatus may be a terminal, an apparatus in the terminal, or an apparatus that can be used in matching with the terminal. When a function of the CU is implemented, the apparatus may be the CU, an apparatus in the CU, or an apparatus that can be used in matching with the CU.

The apparatus may be a chip system. In this embodiment of this application, the chip system may include a chip, or may include the chip and another discrete component. The apparatus 1500 includes at least one processor 1520, configured to implement functions of the terminal, the access network device, or the CU in the access network device in the method provided in the embodiments of this application. The apparatus 1500 may further include a communications interface 1510. In this embodiment of this application, the communications interface may be a transceiver, a circuit, a bus, a module, or another type of communications interface, and is configured to communicate with another device by using a transmission medium. For example, the communications interface 1510 is used by an apparatus in the apparatus 1500 to communicate with another device. For example, when the apparatus 1500 is the first access network device, the another device may be the second access network device or the terminal. When the apparatus 1500 is the CU, the another device may be the DU or the terminal. The processor 1520 receives and sends data by using the communications interface 1510, and is configured to implement the method in the foregoing method embodiments. For example, when a function of the first access network device is implemented, the communications interface 1510 is configured to receive downlink data of the terminal from a first core network device, where the first access network device and the first core network device belong to a first network, and send a first message to the second access network device, where the second access network device belongs to a second network, and the first message is used to indicate the second access network device to assist in paging the terminal. When a function of the CU in the shared access network device is implemented, the communications interface 1510 is configured to receive downlink data of the terminal from each of a first core network device and a second core network device, where the first core network device belongs to the first network, and the second core network device belongs to the second network, and send a first message to the DU, where the first message is used to indicate a paging policy for paging the terminal, and the paging policy includes: performing paging in a cell of the first network, performing paging in a cell of the second network, or performing paging in both a cell of the first network and a cell of the second network. When a function of the terminal is implemented, the processor 1520 is configured to set up a connection to a first cell of the first network, and the communications interface 1510 is configured to receive the first message from the first cell, where the first message is used to indicate that downlink data of the second network arrives.

The processor 1520 and the communications interface 1510 may be further configured to perform other corresponding steps or operations performed by the terminal, the first access network device, the CU in the shared access network device, or another device in the foregoing method embodiments. Details are not described herein again.

The apparatus 1500 may further include at least one memory 1530, configured to store a program instruction and/or data. The memory 1530 is coupled to the processor 1520. Coupling in this embodiment of this application is an indirect coupling or a communication connection between apparatuses, units, or modules, may be in an electrical form, a mechanical form, or another form, and is used for information exchange between the apparatuses, the units, or the modules. The processor 1520 may operate in collaboration with the memory 1530. The processor 1520 may execute the program instruction stored in the memory 1530. At least one of the at least one memory may be included in the processor.

In this embodiment of this application, a specific connection medium between the communications interface 1510, the processor 1520, and the memory 1530 is not limited. In this embodiment of this application, in FIG. 15, the memory 1530, the processor 1520, and the communications interface 1510 are connected through a bus 1540. The bus is represented by a bold line in FIG. 15. A connection manner between other components is merely an example for description, and is not limited thereto. The bus may be classified into an address bus, a data bus, a control bus, and the like. For ease of representation, only one thick line is used to represent the bus in FIG. 15, but this does not mean that there is only one bus or only one type of bus.

When the apparatus 1400 and the apparatus 1500 are specifically chips or chip systems, the receiving module 1402-1, the sending module 1402-2, and the communications interface 1510 may output or receive baseband signals. When the apparatus 1400 and the apparatus 1500 are specifically devices, the receiving module 1402-1, the sending module 1402-2, and the communications interface 1510 may output or receive a radio frequency signal. In the embodiments of this application, the processor may be a general processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module.

In the embodiments of this application, the memory may be a nonvolatile memory, such as a hard disk drive (hard disk drive, HDD) or a solid-state drive (solid-state drive, SSD), or may be a volatile memory (volatile memory), such as a random access memory (random-access memory, RAM). The memory is any other medium that can be used to carry or store expected program code in a form of an instruction or a data structure and that can be accessed by a computer, but is not limited thereto. The memory in the embodiments of this application may alternatively be a circuit or any other apparatus that can implement a storage function, and is configured to store the program instruction and/or the data.

An embodiment of this application provides a computer storage medium that stores a computer-readable instruction. When the computer-readable instruction is run on a communications apparatus, the communications apparatus is enabled to perform the foregoing method embodiments.

An embodiment of this application provides a computer program product including an instruction. When the computer program product runs on a communications apparatus, the communications apparatus is enabled to perform the foregoing method embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A communication method comprising:
receiving, by a user equipment (UE), system information broadcast by a cell of a radio access network device, wherein the system information comprises a human readable network name (HRNN) of a stand-alone non-public networks (SNPN) network, or a HRNN of a public network integrated non-public networks (PNI-NPN) network, and wherein an order of HRNNs in the system information is the same as an order of public land mobile network identifiers (PLMN IDs) and network identifiers (NIDs) in a system information block 1 (SIB1) or the order of the HRNNs in the system information is the same as the order of PLMN IDs and closed access group identifiers (CAG IDs) in the SIB1; and
obtaining, by the UE from the system information, information of a network to which the cell supports access.

2. The communication method of claim 1, wherein in a case that a network identified by a PLMN ID and an NID/CAG ID is not configured with a corresponding HRNN, a corresponding entry is absent.

3. The communication method of claim 1, wherein the method further comprises:
reporting, by the UE to the radio access network device, network identification information of a network that the UE selects to access.

4. The communication method of claim 1, wherein the method further comprises:
sending, by the UE to the radio access network device, a radio resource control (RRC) setup complete message, wherein the RRC setup complete message comprises network identification information of a network selected by the UE to access.

5. The communication method of claim 4, wherein the network identification information of the network selected by the UE to access comprises a PLMN ID and an NID.

6. The communication method of claim 1, wherein the system information is a newly defined System Information Block (SIB); or wherein the system information is a dedicated SIB which is different from the SIB1.

7. A communication apparatus for a user equipment (UE), comprising:
at least one processor; and
a non-transitory computer-readable medium including computer-executable instructions that, when executed by the at least one processor, cause the apparatus to perform operations including:
receiving system information broadcast by a cell of a radio access network device, wherein the system information comprises a human readable network name (HRNN) of a stand-alone non-public networks (SNPN) network, or a HRNN of a public network integrated non-public networks (PNI-NPN) network, and wherein an order of HRNNs in the system information is the same as an order of public land mobile network identifiers (PLMN IDs) and network identifiers (NIDs) in a system information block 1 (SIB1) or the order of the HRNNs in the system information is the same as the order of PLMN IDs and closed access group identifiers (CAG IDs) in the SIB1; and
obtaining, from the system information, information of a network to which the cell supports access.

8. The communication apparatus of claim 7, wherein in a case that a network identified by a PLMN ID and an NID/CAG ID is not configured with a corresponding HRNN, a corresponding entry is absent.

9. The communication apparatus of claim 7, wherein the operations further comprise:
reporting to the radio access network device network identification information of a network that the UE selects to access.

10. The communication apparatus of claim 7, wherein the operations further comprise:
sending to the radio access network device a radio resource control (RRC) setup complete message, wherein the RRC setup complete message comprises network identification information of a network selected by the UE to access.

11. The communication apparatus of claim 10, wherein the network identification information of the network selected by the UE to access comprises a PLMN ID and an NID.

12. The communication apparatus of claim 7, wherein the system information is a newly defined System Information Block (SIB); or
wherein the system information is a dedicated SIB which is different from the SIB1.

13. A non-transitory computer-readable storage medium, wherein the computer-readable storage medium stores a computer-readable instruction which, when run on a communication apparatus for a user equipment (UE), cause the communication apparatus to perform operations comprising:
receiving system information broadcast by a cell of a radio access network device, wherein the system information comprises a human readable network name (HRNN) of a stand-alone non-public networks (SNPN) network, or a HRNN of a public network integrated non-public networks (PNI-NPN) network, and wherein an order of HRNNs in the system information is the same as an order of public land mobile network identifiers (PLMN IDs) and network identifiers (NIDs) in a system information block 1 (SIB1) or the order of the HRNNs in the system information is the same as the order of PLMN IDs and closed access group identifiers (CAG IDs) in the SIB1; and
obtaining, from the system information, information of a network to which the cell supports access.

14. The non-transitory computer-readable storage medium of claim 13, wherein in a case that a network identified by a PLMN ID and an NID/CAG ID is not configured with a corresponding HRNN, a corresponding entry is absent.

15. The non-transitory computer-readable storage medium of claim 13, wherein the operations further comprise:
reporting, to the radio access network device, network identification information of a network that the UE selects to access.

16. The non-transitory computer-readable storage medium of claim 13, wherein the operations further comprise:
sending, to the radio access network device, a radio resource control (RRC) setup complete message, wherein the RRC setup complete message comprises network identification information of a network selected by the UE to access.

17. The non-transitory computer-readable storage medium of claim 16, wherein the network identification information of the network selected by the UE to access comprises a PLMN ID and an NID.

18. The communication method according to claim 1, wherein the system information does not comprise PLMN IDs and NIDs, or PLMN IDs and CAG IDs.

19. The communication apparatus according to claim 7, wherein the system information does not comprise PLMN IDs and NIDs, or PLMN IDs and CAG IDs.

20. The non-transitory computer-readable storage medium of claim 13, wherein the system information does not comprise PLMN IDs and NIDs, or PLMN IDs and CAG IDs.

* * * * *